US012514441B2

(12) United States Patent
Chan et al.

(10) Patent No.: US 12,514,441 B2
(45) Date of Patent: Jan. 6, 2026

(54) IMAGING CATHETER, IMAGING SYSTEM, AND METHODS OF OPERATION THEREOF

(71) Applicants: Kin F Chan, Campbell, CA (US); John B. Simpson, Campbell, CA (US)

(72) Inventors: Kin F Chan, Campbell, CA (US); John B. Simpson, Campbell, CA (US)

( * ) Notice: Subject to any disclaimer, the term of this patent is extended or adjusted under 35 U.S.C. 154(b) by 719 days.

(21) Appl. No.: 17/763,527

(22) PCT Filed: Sep. 25, 2020

(86) PCT No.: PCT/US2020/052942
§ 371 (c)(1),
(2) Date: Mar. 24, 2022

(87) PCT Pub. No.: WO2021/062322
PCT Pub. Date: Apr. 1, 2021

(65) Prior Publication Data
US 2022/0361743 A1    Nov. 17, 2022

Related U.S. Application Data

(60) Provisional application No. 62/905,941, filed on Sep. 25, 2019, provisional application No. 62/905,937, filed on Sep. 25, 2019.

(51) Int. Cl.
*A61B 1/313*    (2006.01)
*A61B 1/00*    (2006.01)
(Continued)

(52) U.S. Cl.
CPC ........ *A61B 1/3137* (2013.01); *A61B 1/00096* (2013.01); *A61B 1/018* (2013.01); *A61B 5/0066* (2013.01)

(58) Field of Classification Search
CPC . A61B 1/3137; A61B 5/0066; A61B 1/00082; A61B 1/00183; A61B 1/01; A61B 1/0676; A61B 5/0084
See application file for complete search history.

(56) References Cited

U.S. PATENT DOCUMENTS 4,445,892 A * 5/1984 Hussein ............. A61B 1/00082
606/7
5,092,873 A * 3/1992 Simpson ............... B29C 65/305
606/159
(Continued)

FOREIGN PATENT DOCUMENTS

CN    108685556 A    10/2018
EP    0964636 A1    12/1999
(Continued)

OTHER PUBLICATIONS

Extended European Search Report issued in European Application No. 20869299.6, mailed on Sep. 4, 2023, 10 pages.
(Continued)

*Primary Examiner* — Anh T Nguyen
*Assistant Examiner* — Shankar Raj Ghimire
(74) *Attorney, Agent, or Firm* — Dorsey & Whitney LLP

(57) ABSTRACT

Imaging apparatus, atherectomy devices, systems, and methods of operation thereof are disclosed. The imaging apparatus further comprises one or more light transmittable windows defined along the dividing layer and a catheter outlet port defined along a ventral side of the catheter body. The catheter outlet port allows the guidewire to advance out of the second catheter lumen and the catheter outlet port is aligned with at least one of the light transmittable windows such that the guidewire is within a field of view of the imaging component when the guidewire extends partially though the catheter outlet port. The atherectomy device can comprise a tubular housing and an inflatable balloon coupled to an exterior side of the tubular housing. The tubular housing includes a cutting window and a rotatable cutter configured to debulk the atherosclerotic material extending into the cutting window. The inflatable balloon can comprise a lumen in fluid communication with the housing lumen
(Continued)

such that fluid introduced into the housing lumen via the catheter lumen inflates the inflatable balloon.

16 Claims, 26 Drawing Sheets

(51) Int. Cl.
*A61B 1/018* (2006.01)
*A61B 5/00* (2006.01)

(56) References Cited

U.S. PATENT DOCUMENTS

| | | | | |
|---|---|---|---|---|
| 5,263,928 A | * | 11/1993 | Trauthen | A61M 25/01 604/509 |
| 5,464,395 A | * | 11/1995 | Faxon | A61M 25/104 604/103.02 |
| 5,531,700 A | * | 7/1996 | Moore | A61M 25/01 604/164.13 |
| 5,830,222 A | * | 11/1998 | Makower | A61B 17/1219 623/1.11 |
| 6,190,353 B1 | | 2/2001 | Makower et al. | |
| 7,134,438 B2 | * | 11/2006 | Makower | A61F 2/95 128/898 |
| 7,670,329 B2 | * | 3/2010 | Flaherty | A61M 5/46 604/164.11 |
| 10,231,613 B2 | | 3/2019 | Wilson et al. | |
| 2001/0047165 A1 | | 11/2001 | Makower et al. | |
| 2004/0059280 A1 | * | 3/2004 | Makower | A61B 17/12136 606/108 |
| 2006/0189959 A1 | * | 8/2006 | Schneiter | A61M 27/002 604/523 |
| 2008/0177139 A1 | * | 7/2008 | Courtney | A61B 5/742 600/109 |
| 2009/0054727 A1 | | 2/2009 | Yamaya | |
| 2009/0275878 A1 | * | 11/2009 | Cambier | A61M 25/0147 604/21 |
| 2010/0041990 A1 | * | 2/2010 | Schlitt | A61B 17/3403 600/461 |
| 2010/0081965 A1 | | 4/2010 | Mugan et al. | |
| 2013/0228179 A1 | * | 9/2013 | Fischer, Jr. | A61M 16/0484 128/207.14 |
| 2014/0073926 A1 | * | 3/2014 | Rajendran | A61M 5/142 600/478 |
| 2016/0022244 A1 | * | 1/2016 | Courtney | A61B 8/4416 600/407 |
| 2020/0315639 A1 | * | 10/2020 | Nicholson | A61F 2/958 |

FOREIGN PATENT DOCUMENTS

| | | |
|---|---|---|
| EP | 1820436 B1 | 12/2010 |
| JP | 2006181370 A | 7/2006 |
| JP | 2012029912 A | 2/2012 |
| WO | 9713463 A1 | 4/1997 |
| WO | 2021062322 A1 | 4/2021 |

OTHER PUBLICATIONS

International Preliminary Report on Patentability issued in International Application No. PCT/US2020/052942, mailed on Apr. 7, 2022, 14 pages.

International Search Report and Written Opinion for PCT Application No. PCT/US2020/052942, dated Feb. 26, 2021.

Office Action issued in Chinese Patent Application No. 202080081742.5, mailed on Aug. 18, 2025, 14 pages including 6 pages of English translation,.

* cited by examiner

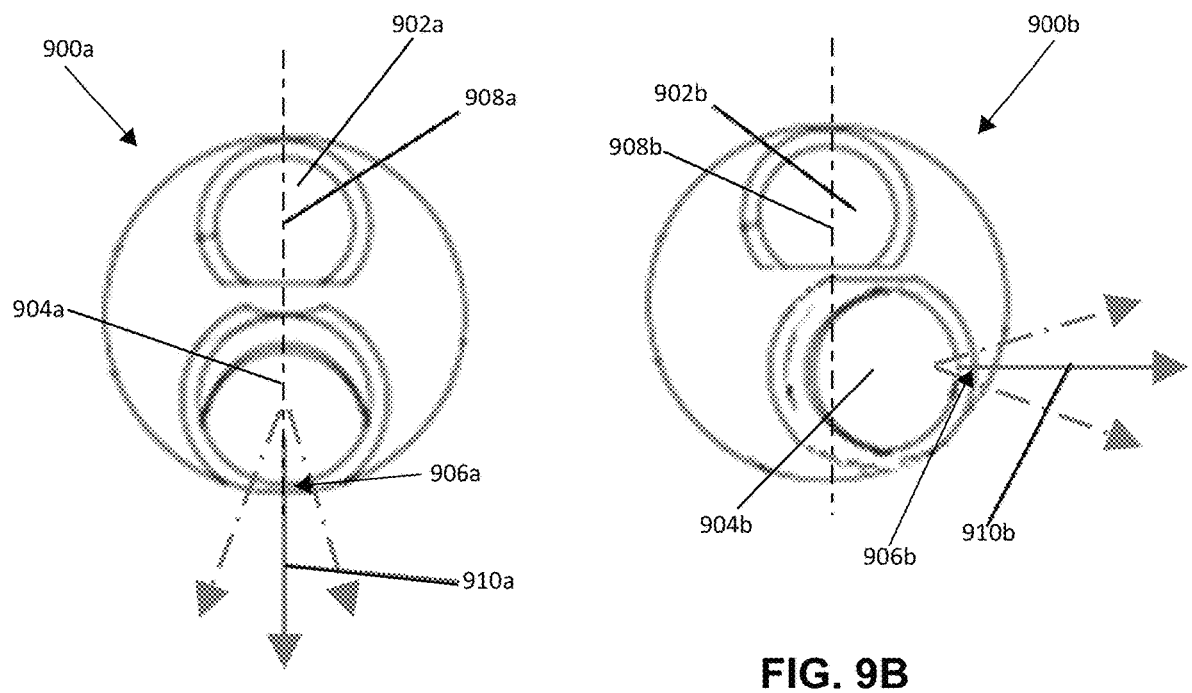
FIG. 9A
FIG. 9B
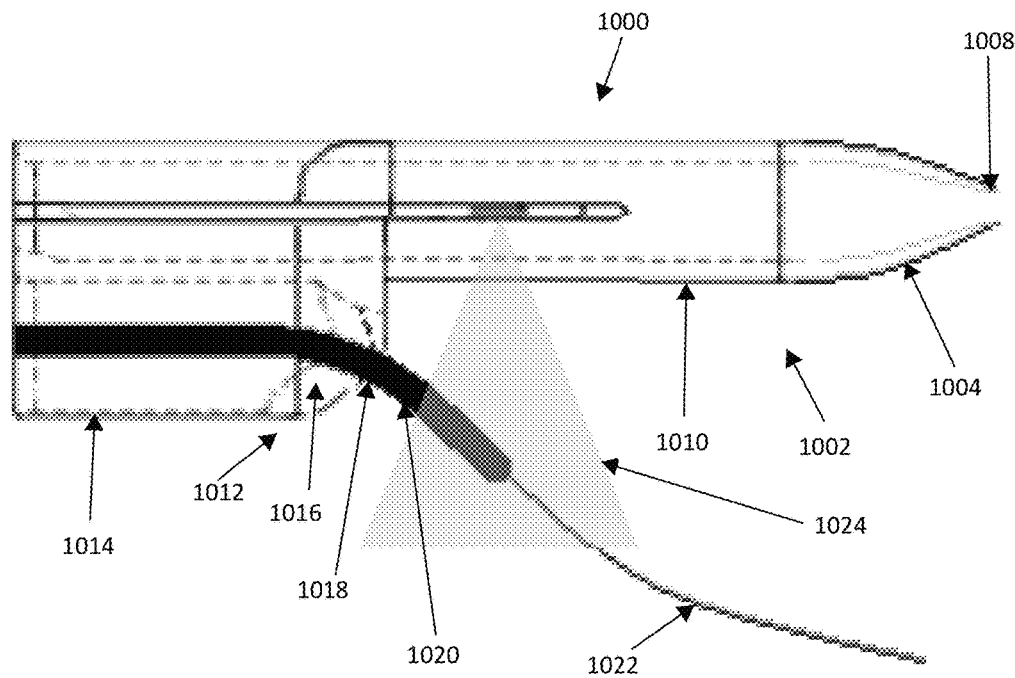
FIG. 10A

NORMAL

CONCENTRIC

ECCENTRIC

IMAGING CATHETER, IMAGING SYSTEM, AND METHODS OF OPERATION THEREOF

CROSS-REFERENCE TO RELATED APPLICATIONS

This application claims the benefit of priority under 35 U.S.C. 371 of International Application No. PCT/US2020/052942 filed on Sep. 25, 2020 which in turn claims priority to U.S. Provisional Patent Application No. 62/905,937, filed Sep. 25, 2019, entitled "IMAGING CATHETER, IMAGING SYSTEM, AND METHODS OF OPERATION THEREOF," and U.S. Provisional Patent Application No. 62/905,941, filed Sep. 25, 2019, entitled "IMAGING CATHETER, IMAGING SYSTEM, AND METHODS OF OPERATION THEREOF", each of which is incorporated by reference herein, in the entirety and for all purposes.

TECHNICAL FIELD

This disclosure relates generally to the field of endovascular imaging, crossing and/or debulking, more specifically, to imaging catheters, re-entry devices and/or atherectomy devices, systems, and methods of operation thereof.

BACKGROUND

Minimally invasive surgical interventions have consistently shown to be of equivalent or greater efficacy and offer lower mortality rates than traditional open surgical interventions. For many such minimally invasive procedures, being able to accurately track the positioning of instruments inserted into the vasculature of the patient is of the utmost importance for surgeons and other medical professionals undertaking such interventions. A majority of minimally invasive procedures involve the use of a flexible guidewire and catheters that are directed to a target vessel site using the guidewire. However, properly steering the guidewire to the target vessel site can be challenging, time consuming and fraught with risks. For example, an improperly maneuvered guidewire can cause harmful vascular dissection, perforation, or thrombosis; and excessive systemic anesthesia exposure to the patient. While some of these risks can be offset by heparinization, the increased use of such anti-coagulants can increase the risk of procedural hemorrhage.

Moreover, most guidewire navigation is currently done under X-ray fluoroscopic imaging. However, X-ray imaging often requires the surgeon or other medical professionals and the patient to be subjected to long bouts of radiation.

Therefore, improved devices, systems, and methods for endovascular imaging are needed which address the challenges faced by current devices on the market. Such a solution should lower the risk of complications for patients and reduce the risk of radiation exposure for operators and patients. Moreover, such a solution should be compatible or easily adapted for use with other minimally invasive surgical devices such as atherectomy catheters and catheters for stent apposition. Furthermore, such a solution should reduce the complexity of current devices and be cost-effective to manufacture.

Atherosclerosis is characterized by the buildup of plaque and other fatty material within a patient's blood vessels. Initial deposits of relatively soft cholesterol-rich atheromatous hardens into calcified atherosclerotic plaque that restricts the flow of blood and can eventually cause hypertension, angina, stroke, and myocardial infarction. Atherectomies are minimally invasive endovascular procedures to remove such plaque and other fatty buildup from the arteries.

Traditional atherectomy devices often include a catheter designed for lesion cutting having an opening defined along a portion of the catheter. A low-pressure balloon is often attached to the catheter on a side opposite the opening such that inflation of the balloon occludes the blood vessel and biases the opening closer to the atherosclerotic plaque and portions of the plaque extends into or are positioned closer to the opening. A cutting tool within the catheter then cuts the plaque and masticated or ground-up plaque is stored within a collection chamber attached to the catheter. A flushing media or other type of liquid can also be delivered into the blood vessel during the atherectomy procedure to facilitate with imaging of the treatment area (e.g., using optical coherent tomography (OCT)) by clearing blood from the imaging field of view. However, all such atherectomy devices are beset with shortcomings that have heretofore not been addressed by the makers of such devices.

For example, the balloons attached to such devices are often inflated with air and can be susceptible to rupture, thereby raising the risk for an air embolism, balloon entrapment, or vessel perforation. Moreover, the flushing media or other fluid delivered into the blood vessel to facilitate with imaging is often delivered through a separate fluid delivery lumen that adds to the complexity of the device and impedes the movement of the cutting tool. Furthermore, inflation of the balloon is often done through an inflation lumen separate from the fluid delivery lumen, furthering crowding the interior of the catheter. In addition, inflation of the balloon is often poorly coordinated with the delivery of the flushing media such that the blood vessel is not occluded in time for the flushing media to take effect.

Therefore, improved devices, systems, and methods for endovascular debulking are needed which address the challenges faced by atherectomy devices. In addition, such a solution should reduce the complexity of traditional atherectomy devices and be cost-effective to manufacture.

Blood vessels that are completely blocked by atherosclerosis is characterized by chronic total occlusion (CTO) which could result in serious lack of blood perfusion and oxygenation to heart tissue, resulting in myocardial infarction and heart failure. For example, it is estimated that approximately 15-20% of patients with coronary artery disease have a CTO. Potential treatments for CTO include medication, angioplasty and/or bypass surgery. As the artery is fully occluded, medication may be minimally effective, while bypass surgery has significantly higher morbidity and mortality rate.

Angioplasty and stenting provide a minimally invasive approach to re-vascularize blocked arteries with good patient outcome, but the procedure involves the need to cross the CTO before angioplasty and stenting could be performed. The standard for crossing CTO is utility of a numerous array of guidewires with different stiffness, shapes and forms of tips, etc. The guidewire is typically pushed up against the CTO within the artery, guided by fluoroscopy which offers a 2D image projection without any information of the cross-sectional plane of the internal structure of the diseased artery. The use of guidewires offers a poke-and-hope approach that does not guarantee success, is often time-consuming, results in extensive radiation exposure to the operators and the patient, and excessive anesthesia exposure of the patient under care.

There is a need to provide a solution to visualize the cross-sectional view of the artery while traversing it with clear interpretation of the arterial and disease structures, while having an interventional tool that the operator can steer to stay within the artery or to offer re-entry after being forced into a false lumen within the arterial wall.

For example, a re-entry device consisting of a sensory or imaging element that could visualize the arterial cross-sectional view enable surveying of its surrounding, with high resolution and clear view of the internal and outer boundary of the arterial wall, diseased structure, recognition of false entry into the subluminal space and identification of the true lumen. The re-entry device may then reliably orientate and direct an interventional tool toward the true lumen for re-entry and crossing of the CTO. Such a systematic approach shall significantly improve usability, shorten procedural time, reduce anesthesia exposure to the patient, and minimize radiative exposure to both operators and patients.

As re-entry efforts take up significant procedural time for angioplasty and stenting, a reduction in operation room utility means cost savings and increased patient throughput for the hospitals and care centers.

SUMMARY

Improved devices, systems, and methods for endovascular imaging are disclosed. An imaging apparatus is disclosed comprising an elongate catheter body, a first catheter lumen extending through the catheter body, a second catheter lumen extending through the catheter body and separated from the first catheter lumen by a dividing layer, one or more light transmittable windows defined along the dividing layer, and a catheter outlet port defined along a portion of the catheter body and aligned with at least one of the one or more light transmittable windows.

The elongate catheter body can be configured to be advanced through a body lumen of a patient such as a blood vessel. The catheter body can comprise a dorsal side and a ventral side opposite the dorsal side. The catheter outlet port can be defined along the ventral side of the catheter body.

The first catheter lumen can be configured to house at least part of an imaging component. The second catheter lumen can be configured to house at least part of a guidewire or a guiding needle having a hollow core with an option to house a guidewire within. The one or more light transmittable windows are configured to allow light to be transmitted through the one or more light transmittable windows. In another embodiment, the light transmittable window may stretch the entire length from behind the most proximal outlet port of the guiding needle or guidewire to the most distal extent of travel of the guiding needle or guidewire.

In some embodiments, the one or more light transmittable windows can be made in part of at least one of polymethylmethacrylate (PMMA), polypropylene, polycarbonate, and polyethylene. In these and other embodiments, the one or more light transmittable windows can be made in part of at least one of calcium fluoride, germanium oxide, silicon dioxide, aluminum oxide, and zinc selenide. Furthermore, one or more light transmittable windows can be made in part of at least one or more of Polytetrafluoroethylene (PTFE), Fluorinated ethylene propylene (FEP), Perfluoroalkoxy alkanes (PFA), Ethylene tetrafluoroethylene (ETFE), Polydimethylsiloxane (PDMS), nylon, Polyether block amide (PEBAX®), Polyethylene terephthalate (PET), etc.

The catheter outlet port can be in fluid communication with the second catheter lumen and the guiding needle or guidewire can advance out of the second catheter lumen into the body lumen of the patient, such as a blood vessel of the patient.

The catheter outlet port can be aligned (e.g., longitudinally and laterally such that there is at least partial overlap) with at least one of the one or more light transmittable windows such that the needle guide or guidewire is within a field of view of the imaging component within the first catheter lumen when the guiding needle or guidewire exits the second catheter lumen of the catheter body through the catheter outlet port. For example, the guiding needle or guidewire can be within the field of view of the imaging component when the guiding needle or guidewire extends at least partially through the catheter outlet port. The guiding needle or guidewire can also be within the field of view of the imaging component when at least part of the guiding needle or guidewire intersects a transverse orientation plane positioned along an edge of the catheter outlet port.

A number of additional catheter outlet ports can also be defined along the ventral side of the catheter body. The additional catheter outlet ports can be configured to allow the guiding needle or guidewire to advance or exit out of the second catheter lumen at various positions or locations along the catheter body.

In some embodiments, the longitudinal or axial displacement of the imaging component can be correlated with the longitudinal or axial displacement of the guiding needle or guidewire. For example, the proximal segment of the guiding needle or guidewire can be conjoined with a proximal portion of the imaging component such that the longitudinal or axial displacement of the imaging component also results in the longitudinal or axial displacement of the guiding needle or guidewire, or vice versa. In these or other embodiments, the longitudinal or axial displacement of the imaging component can be tracked by one or more encoders positioned along a proximal portion of the imaging component and the longitudinal or axial displacement of the guiding needle or guidewire can also be tracked by the same or different encoders positioned along or around a proximal segment of the guiding needle or guidewire. Additionally, or alternatively, the rotational motion of the imaging component and the rotational motion of the guiding needle or guidewire can be tracked by one or more rotary encoders.

The imaging component can be configured to be rocked such that the imaging component rotates back-and-forth with respect to a longitudinal axis of rotation at an angle of rotation of less than 180 degrees (e.g., between about 90 degrees and about 180 degrees). In other embodiments, the imaging component can be configured to be rocked such that the imaging component rotates back-and-forth with respect to a longitudinal axis of rotation at an angle of rotation of less than 90 degrees (e.g., between about 30 degrees to about 90 degrees). In further embodiments, the imaging component can be configured to be rocked such that the imaging component rotates back-and-forth with respect to a longitudinal axis of rotation at an angle of rotation of less than 360 degrees but greater than 180 degrees. The imaging component can be part of an optical coherence tomography (OCT) imaging system such that the OCT imaging system is configured to perform image registration on images captured by the imaging component.

The imaging component can be configured to be rotating continuously clockwise or counter-clockwise with respect to a longitudinal axis at a constant speed (or constant target speed) that may be adjusted between 200 rotation per minute (rpm) and 2000 rpm. In another embodiment, the imaging component can be configured to be rotating continuously clockwise or counter-clockwise with respect to a longitudinal axis at a constant speed that may be adjusted between 200 rotation per minute (rpm) and 1000 rpm. In yet another embodiment, the imaging component can be configured to be rotating continuously clockwise or counter-clockwise with respect to a longitudinal axis at a constant speed that may be adjusted between 200 rotation per minute (rpm) and 500 rpm. The imaging component can be part of an optical coherence tomography (OCT) imaging system such that the OCT imaging system is configured to perform image registration on images captured by the imaging component.

The imaging component can be configured to be rotating continuously clockwise or counter-clockwise with respect to a longitudinal axis at a varying speed that may be adjusted during operation between 200 rotation per minute (rpm) and 2000 rpm. In another embodiment, the imaging component can be configured to be rotating continuously clockwise or counter-clockwise with respect to a longitudinal axis at a varying speed that may be adjusted during operation between 200 rotation per minute (rpm) and 1000 rpm. In yet another embodiment, the imaging component can be configured to be rotating continuously clockwise or counter-clockwise with respect to a longitudinal axis at a varying speed that may be adjusted during operation between 200 rotation per minute (rpm) and 500 rpm. The imaging component can be part of an optical coherence tomography (OCT) imaging system such that the OCT imaging system is configured to perform image registration on images captured by the imaging component.

In some embodiments, one or more light transmittable windows can be defined along a ventral side of the catheter body. At least one of such light transmittable windows (i.e., defined along the ventral side of the catheter body) can be aligned with at least one of the one or more light transmittable windows defined along the dividing layer such that the segment of the guiding needle or guidewire extending out of the catheter outlet port and into the vasculature is within the field of view of the imaging component through the aligned (e.g., longitudinally aligned, laterally aligned, or a combination thereof) light transmittable window.

A method of tracking a guiding needle or guidewire is also disclosed. The method comprises advancing an elongate catheter body through the vasculature of a patient. The catheter body comprises a first catheter lumen extending through the catheter body and a second catheter lumen extending through the catheter body and separated from the first catheter lumen by a dividing layer. The first catheter can be configured to house at least part of an imaging component and the second catheter lumen can be configured to house at least part of the guidewire.

The method further comprises advancing a segment of the guiding needle or guidewire out of a catheter outlet port defined along a ventral side of the catheter body and imaging the guiding needle or guidewire displacement using light transmitted from an imaging component extending through the first catheter lumen. The light can be transmitted through one or more light transmittable windows defined along the dividing layer. The catheter outlet port can be aligned with at least one of the one or more light transmittable windows such that the guiding needle or guidewire is within a field of view of the imaging component when the guiding needle or guidewire extends partially though the catheter outlet port.

The method can further comprise correlating a longitudinal or axial displacement of the imaging component with the longitudinal or axial displacement of the guiding needle or guidewire. For example, the proximal segment of the guiding needle or guidewire can be conjoined with a proximal portion of the imaging component such that the longitudinal or axial displacement of the imaging component also results in the longitudinal or axial displacement of the guiding needle or guidewire, or vice versa. The method can also comprise tracking the longitudinal or axial displacement of the imaging component using one or more encoders positioned along a proximal portion of the imaging component and tracking the longitudinal or axial displacement of the guiding needle or guidewire using the one or more encoders positioned along a proximal segment of the guidewire.

The method can also comprise rocking the imaging component within the catheter body such that the imaging component rotates back-and-forth with respect to a longitudinal axis of rotation at an angle of rotation of less than 180 degrees (e.g., between about 90 degrees and about 180 degrees). In other embodiments, the imaging component can be rocked such that the imaging component rotates back-and-forth with respect to a longitudinal axis of rotation at an angle of rotation of less than 90 degrees (e.g., between about 30 degrees to about 90 degrees). In further embodiments, the imaging component can be rocked such that the imaging component rotates back-and-forth with respect to a longitudinal axis of rotation at an angle of rotation of less than 360 degrees but greater than 180 degrees. The imaging component can be part of an optical coherence tomography (OCT) imaging system. The method can further comprise performing image registration on images captured by the imaging component using the OCT imaging system.

The method can also comprise rotating continuously clockwise or counter-clockwise with respect to a longitudinal axis at a constant speed (or preset target speed) that may be adjusted between 200 rotation per minute (rpm) and 2000 rpm. In another embodiment, the imaging component can be configured to be rotating continuously clockwise or counter-clockwise with respect to a longitudinal axis at a constant speed that may be adjusted between 200 rotation per minute (rpm) and 1000 rpm. In yet another embodiment, the imaging component can be configured to be rotating continuously clockwise or counter-clockwise with respect to a longitudinal axis at a constant speed that may be adjusted between 200 rotation per minute (rpm) and 500 rpm. The imaging component can be part of an optical coherence tomography (OCT) imaging system. The method can further comprise performing image registration on images captured by the imaging component using the OCT imaging system.

The method can also comprise rotating continuously clockwise or counter-clockwise with respect to a longitudinal axis at a varying speed that may be adjusted during operation between 200 rotation per minute (rpm) and 2000 rpm. In another embodiment, the imaging component can be configured to be rotating continuously clockwise or counter-clockwise with respect to a longitudinal axis at a varying speed that may be adjusted during operation between 200 rotation per minute (rpm) and 1000 rpm. In yet another embodiment, the imaging component can be configured to be rotating continuously clockwise or counter-clockwise with respect to a longitudinal axis at a varying speed that may be adjusted during operation between 200 rotation per minute (rpm) and 500 rpm. The imaging component can be part of an optical coherence tomography (OCT) imaging system. The method can further comprise performing image registration on images captured by the imaging component using the OCT imaging system.

The method can also comprise advancing the guiding needle or guidewire out of one or more additional catheter outlet ports defined along the ventral side of the catheter body. The additional catheter outlet ports can allow the guiding needle or guidewire to advance out of the second catheter lumen at other positions along the catheter body.

The method can also comprise imaging the guiding needle or guidewire using light transmitted from an imaging component extending through the first catheter lumen. The light can be transmitted through a light transmittable window defined along the dividing layer and a light transmittable window defined along a ventral side of the catheter body. The light transmittable window defined along the ventral side of the catheter body can be aligned with the light transmittable window defined along the dividing layer such that the segment of the guidewire extending out of the catheter outlet port and into the vasculature is within the field of view of the imaging component through the aligned light transmittable windows.

Improved devices, systems, and methods for endovascular debulking are disclosed. An atherectomy device for removing atherosclerotic material within a blood vessel can comprise a tubular housing coupled to or extending from a distal end of a catheter, a collection chamber coupled to the tubular housing, and an inflatable balloon coupled to an exterior side of the tubular housing. The tubular housing can comprise a housing lumen configured to be in fluid communication with a catheter lumen of the catheter. The tubular housing can also comprise a cutting window defined along a portion of the tubular housing.

The tubular housing can further comprise a rotatable cutter configured to debulk the atherosclerotic material extending into the cutting window. The rotatable cutter can be coupled to a drive shaft extending through the catheter and the tubular housing. The rotatable cutter can be translatable longitudinally within the housing lumen via the drive shaft.

The collection chamber can be configured to collect the atherosclerotic material debulked by the rotatable cutter. The collection chamber can be in fluid communication with the housing lumen. In one embodiment, the collection chamber can be a nosecone coupled to a distal end of the tubular housing.

The inflatable balloon can comprise a balloon lumen in fluid communication with the housing lumen such that fluid introduced into the housing lumen via the catheter lumen inflates the inflatable balloon. In some embodiments, the balloon and the tubular housing can substantially restrict fluid flow through the blood vessel when the balloon is inflated.

The tubular housing can further comprise a dorsal side and a ventral side opposite the dorsal side. The tubular housing can comprise a plurality of housing port openings defined along the dorsal side of the tubular housing.

In some embodiments, the fluid can be a saline solution. More specifically, the fluid can be a heparinized saline solution. In other embodiments, the fluid can comprise a contrast agent.

The tubular housing can further comprise an imaging catheter and a fiber optic wire extending at least partially through the imaging catheter. The fiber optic wire can be configured to image the blood vessel and the atherosclerotic material surrounding the tubular housing through optical coherence tomography (OCT).

The inflatable balloon can comprise a valve configured to control fluid entry into the balloon lumen. The inflatable balloon can further comprise one or more weep holes configured to seep fluid out of the balloon lumen.

In some embodiments, the valve can be a unidirectional valve configured to only allow fluid flow into the balloon lumen. In other embodiments, the valve can be a bidirectional valve configured to allow fluid flow into and out of the balloon lumen.

A method of debulking atherosclerotic material within a blood vessel is also disclosed. The method comprises introducing a tubular housing of an atherectomy device into the blood vessel comprising the atherosclerotic material. The tubular housing can be coupled to or extend from a distal end of a catheter. The tubular housing can comprise a housing lumen configured to be in fluid communication with a catheter lumen of the catheter, a cutting window defined along a portion of the tubular housing, and a rotatable cutter.

The method can also comprise inflating a balloon coupled to an exterior side of the tubular housing using a fluid introduced into the housing lumen via the catheter lumen. The balloon lumen can be in fluid communication with the housing lumen. The method can further comprise flushing a segment of the blood vessel in proximity to the tubular housing with the fluid introduced into the housing lumen. Flushing the segment of the blood vessel in proximity to the tubular housing clears a visual field in proximity to the tubular housing. The method can also comprise deflating the balloon in order to rotate the tubular housing of the atherectomy device within the blood vessel.

The method can further comprise cutting the atherosclerotic material extending into the cutting window using the rotatable cutter. The rotatable cutter can be longitudinally translated by translating a drive shaft coupled to the rotatable cutter. The drive shaft can extend through the catheter and the tubular housing.

The method can also comprise imaging the blood vessel and the atherosclerotic material surrounding the tubular housing through optical coherence tomography (OCT) using an imaging catheter and a fiber optic wire extending at least partially through the imaging catheter. Imaging can be performed after or simultaneously with flushing the blood vessel.

The tubular housing further can comprise a dorsal side and a ventral side opposite the dorsal side, wherein the tubular housing comprises a plurality of housing port openings defined along the dorsal side of the tubular housing, and wherein flushing the segment of the blood vessel in proximity to the tubular housing with the fluid further comprises directing the fluid through the plurality of housing port openings.

In one embodiment, an imaging apparatus is provided, comprising an elongate catheter body configured to be advanced through a vasculature of a patient, the catheter body comprising a dorsal side and a ventral side opposite the dorsal side, a first catheter lumen extending through the catheter body, wherein the first catheter lumen may be configured to house at least part of an imaging component, a second catheter lumen extending through the catheter body, wherein the second catheter lumen may be configured to house at least part of a guidewire, and wherein the second catheter lumen may be separated from the first catheter lumen, one or more windows defined between the first and second catheter lumens, wherein the one or more windows are configured to allow light to be transmitted through the one or more windows, and a catheter outlet port defined along the ventral side of the catheter body and in fluid communication with the second catheter lumen, wherein the catheter outlet port may be configured to allow the guidewire to advance out of the second catheter lumen, and wherein the catheter outlet port may be aligned with at least one of the one or more windows such that the guidewire may be within a field of view of the imaging component when the guidewire extends partially though the catheter outlet port. The apparatus may further comprise a guiding needle slidably located in the second catheter lumen, the guiding needle comprising a needle lumen configured to slidably receive a guidewire. The guiding needle may comprise a beveled distal end with a beveled face. The beveled face may be orthogonal to a longitudinal axis of the elongate catheter body. The apparatus may further comprise a needle lock that may be configured to reversibly lock the movement of the OCT imaging to the movement of the guiding needle. A longitudinal or axial displacement of the imaging component may be correlated with the longitudinal or axial displacement of the guidewire. A proximal segment of the guidewire may be conjoined with a proximal portion of the imaging component. The longitudinal or axial displacement of the imaging component may be tracked by one or more encoders positioned along a proximal portion of the imaging component and wherein the longitudinal or axial displacement of the guidewire may be tracked by the one or more encoders positioned along a proximal segment of the guidewire. The imaging component may be configured to be rocked such that the imaging component rotates back-and-forth with respect to a longitudinal axis of rotation at an angle of rotation of less than 180 degrees. The imaging component may be configured to be rotated at constant speed during operation that may be adjustable with respect to a longitudinal axis of rotation at less than 2000 rpm. The imaging component may be configured to be rotated at varying speed during operation with respect to a longitudinal axis of rotation at less than 2000 rpm. The apparatus may further comprise additional catheter outlet ports defined along the ventral side of the catheter body, wherein the additional catheter outlet ports are configured to allow the guidewire to advance out of the second catheter lumen at various positions along the catheter body. The apparatus may further comprise one or more windows defined along a ventral side of the catheter body, wherein at least one of the one or more windows defined along the ventral side of the catheter body may be aligned with at least one of the one or more windows defined along the dividing layer such that the segment of the guidewire extending out of the catheter outlet port and into the vasculature may be within the field of view of the imaging component through the windows. One or more windows may be made in part of at least one of polymethylmethacrylate (PMMA), polypropylene, polycarbonate, and polyethylene. One or more windows may be made in part of at least one of calcium fluoride, germanium oxide, silicon dioxide, aluminum oxide, and zinc selenide. One or more windows may be made in part of at least one of polytetrafluoroethylene (PTFE), Fluorinated ethylene propylene (FEP), perfluoroalkoxy alkanes (PFA), ethylene tetrafluoroethylene (ETFE), polydimethylsiloxane (PDMS), nylon, polyether block amide (PEBAX®) and Polyethylene terephthalate (PET). The apparatus of claim 1, wherein the imaging component may be part of an optical coherence tomography (OCT) imaging system and wherein the OCT imaging system may be configured to perform image registration on images captured by the imaging component.

In another embodiment, an imaging apparatus is provided, comprising an elongate catheter body configured to be advanced through a vasculature of a patient, the catheter body comprising a dorsal side and a ventral side opposite the dorsal side, a first catheter lumen extending through the catheter body, wherein the first catheter lumen is configured to house at least part of an imaging component, a second catheter lumen extending through the catheter body, wherein the second catheter lumen is configured to house at least part of a guidewire, and wherein the second catheter lumen is separated from the first catheter lumen, one or more windows defined between the first and second catheter lumens, wherein the one or more windows are configured to allow light to be transmitted through the one or more windows, and a catheter outlet port in fluid communication with the second catheter lumen, wherein the catheter outlet port comprises an orthogonal orientation relative to a longitudinal axis of the elongate catheter body and a longitudinal position that may be proximally spaced apart from a distal end of the first catheter lumen, and wherein the catheter port may be configured to allow the guidewire to advance out of the second catheter lumen, and wherein the catheter outlet port may be aligned with at least one of the one or more windows such that the guidewire may be within a field of view of the imaging component when the guidewire extends partially though the catheter outlet port. The apparatus may further comprise a guiding needle slidably located in the second catheter lumen, the guiding needle comprising a needle lumen configured to slidably receive a guidewire.

In another embodiment, a method of tracking a guidewire is provided, comprising advancing an elongate catheter body through a vasculature of a patient, the catheter body comprising a first catheter lumen extending through the catheter body, wherein the first catheter lumen is configured to house at least part of an imaging component, and a second catheter lumen extending through the catheter body, wherein the second catheter lumen is configured to house at least part of the guidewire, and wherein the second catheter lumen is separated from the first catheter lumen by a dividing layer, advancing a segment of the guidewire out of a catheter outlet port defined along a ventral side of the catheter body, and imaging the guidewire using light transmitted from an imaging component extending through the first catheter lumen, wherein the light is transmitted through one or more windows defined along the dividing layer, and wherein the catheter outlet port is aligned with at least one of the one or more windows such that the guidewire is within a field of view of the imaging component when the guidewire extends partially though the catheter outlet port. The method may further comprise advancing a guiding needle from the second catheter port, wherein advancing the segment of the guidewire out of the catheter outlet port comprises advancing the segment of the guidewire out of the catheter outlet port through the lumen of the guiding needle and out of a distal opening of the guiding needle. The method may further comprise engaging a guiding needle lock to tie movement of the guiding needle and the imaging component together. The guiding needle lock may provide a 1:1 movement ratio between the guiding needle and the imaging component. The guiding needle lock may provide a predetermined variable movement ratio between the guiding needle and the imaging component. The method may further comprise correlating a longitudinal or axial displacement of the imaging component with the longitudinal or axial displacement of the guidewire. A proximal segment of the guidewire may be conjoined with a proximal portion of the imaging component. The method may further comprise tracking the longitudinal or axial displacement of the imaging component using one or more encoders positioned along a proximal portion of the imaging component and tracking the longitudinal or axial displacement of the guidewire using the one or more encoders positioned along a proximal segment of the guidewire. The method may further comprise rocking the imaging component within the catheter body such that the imaging component rotates back-and-forth with respect to a longitudinal axis of rotation at an angle of rotation of less than 180 degrees, or rotating the imaging component at constant speed during operation that may be adjustable with respect to a longitudinal axis of rotation at less than 2000 rpm. The method may further comprise rotating the imaging component at varying speed during operation with respect to a longitudinal axis of rotation at less than 2000 rpm. The method may further comprise advancing the guidewire out of an additional catheter outlet port defined along the ventral side of the catheter body, wherein the additional catheter outlet port may be configured to allow the guidewire to advance out of the second catheter lumen at another position along the catheter body. The method may further comprise one or more windows defined along a ventral side of the catheter body, wherein at least one of the one or more windows defined along the ventral side of the catheter body may be aligned with at least one of the one or more windows defined along the dividing layer such that the segment of the guidewire extending out of the catheter outlet port and into the vasculature may be within the field of view of the imaging component through the windows. The one or more light transmittable windows may be made in part of at least one of polymethylmethacrylate (PMMA), polypropylene, polycarbonate, and polyethylene. The one or more windows are made in part of at least one of calcium fluoride, germanium oxide, silicon dioxide, aluminum oxide, and zinc selenide. The one or more windows are made in part of at least one of polytetrafluoroethylene (PTFE), fluorinated ethylene propylene (FEP), perfluoroalkoxy alkanes (PFA), ethylene tetrafluoroethylene (ETFE), polydimethylsiloxane (PDMS), nylon, polyether block amide (PEBAX®) and polyethylene terephthalate (PET). The imaging component may be part of an optical coherence tomography (OCT) imaging system and wherein the method further comprises performing image registration on images captured by the imaging component using the OCT imaging system.

In another embodiment, an atherectomy device for removing atherosclerotic material within a blood vessel is provided, comprising a tubular housing coupled to or extending from a distal end of a catheter, wherein the tubular housing comprises a housing lumen configured to be in fluid communication with a catheter lumen of the catheter, a cutting window defined along a portion of the tubular housing, and a rotatable cutter configured to debulk the atherosclerotic material extending into the cutting window, a collection chamber coupled to the tubular housing, wherein the collection chamber is configured to collect the atherosclerotic material debulked by the rotatable cutter, wherein the collection chamber is in fluid communication with the housing lumen, and an inflatable balloon coupled to an exterior side of the tubular housing, wherein the inflatable balloon comprises a balloon lumen in fluid communication with the housing lumen such that fluid introduced into the housing lumen via the catheter lumen clears a field in proximity to the cutting window and inflates the inflatable balloon. The tubular housing further comprises a dorsal side and a ventral side opposite the dorsal side, wherein the tubular housing comprises a plurality of housing port openings defined along the dorsal side of the tubular housing. The fluid may be a saline solution or contrast agent. The saline solution may be a heparinized saline solution. The tubular housing may further comprise an imaging catheter and a fiber optic wire extending at least partially through the imaging catheter, and wherein the fiber optic wire may be configured to image the blood vessel and the atherosclerotic material surrounding the tubular housing through optical coherence tomography (OCT). The inflatable balloon may further comprise a valve configured to control fluid entry into the balloon lumen. The valve may be a unidirectional valve configured to only allow fluid flow into the balloon lumen. The valve may be a bidirectional valve configured to allow fluid flow into and out of the balloon lumen. The inflatable balloon may further comprise one or more weep holes configured to seep fluid out of the balloon lumen. The rotatable cutter may be coupled to a drive shaft extending through the catheter and the tubular housing, and wherein the rotatable cutter may be translatable longitudinally within the housing lumen via the drive shaft. The balloon and tubular housing may be configured to substantially restrict fluid flow through the blood vessel when the balloon may be inflated.

In still another embodiment, a method of debulking atherosclerotic material within a blood vessel is provided, comprising introducing a tubular housing of an atherectomy device into the blood vessel and into proximity to the atherosclerotic material, wherein the tubular housing is coupled to or extending from a distal end of a catheter, and wherein the tubular housing comprises a housing lumen configured to be in fluid communication with a catheter lumen of the catheter, a cutting window defined along a portion of the tubular housing, and a rotatable cutter, inflating a balloon coupled to an exterior side of the tubular housing using a fluid introduced into the housing lumen via the catheter lumen, wherein a balloon lumen of the balloon is in fluid communication with the housing lumen, and flushing a field in proximity to the tubular housing with the fluid introduced into the housing lumen. The method may further comprise deflating the balloon in order to rotate the tubular housing of the atherectomy device within the blood vessel. The method may further comprise imaging the blood vessel and the atherosclerotic material surrounding the tubular housing through optical coherence tomography (OCT) using an imaging catheter and a fiber optic wire extending at least partially through the imaging catheter. Flushing the field in proximity to the tubular housing may clear a visual field in proximity to the tubular housing and wherein the imaging may be performed after flushing with the fluid. The tubular housing may further comprises a dorsal side and a ventral side opposite the dorsal side, wherein the tubular housing comprises a plurality of housing port openings defined along the dorsal side of the tubular housing, and wherein flushing the segment of the blood vessel in proximity to the tubular housing with the fluid further comprises directing the fluid through the plurality of housing port openings. The fluid may be a saline solution or contrast agent, and the saline solution may be a heparinized saline solution. The balloon further comprises a valve configured to control fluid entry into the balloon lumen. The valve may be a unidirectional valve configured to only allow fluid flow into the balloon lumen. The valve may be a bidirectional valve configured to allow fluid flow into and out of the balloon lumen. The balloon may further comprise one or more weep holes configured to seep fluid out of the balloon lumen. The method may further comprise longitudinally translating the rotatable cutter within the tubular housing by translating a drive shaft coupled to the rotatable cutter, wherein the drive shaft extends through the catheter and the tubular housing. The method may further comprise cutting the atherosclerotic material extending into the cutting window using the rotatable cutter.

BRIEF DESCRIPTION OF THE DRAWINGS

FIGS. 9A and 9B depicts various catheter lumen configurations for the hollow needle guide and/or guidewire, and the orientation of exit and angular range of the guiding needle and/or guidewire relative to the location of the imaging element or lumen.

FIG. 10A depicts an alternate embodiment comprising an imaging apparatus with an offset needle guide or guidewire lumen;

In FIG. 10C, the guidewire has retracted into the guiding needle after the catheter is in position of the target artery just prior to intervention; after which the guiding needle is deployed for intervention.

DETAILED DESCRIPTION

Imaging System and CTO Re-Entry Device

Figure 1A:
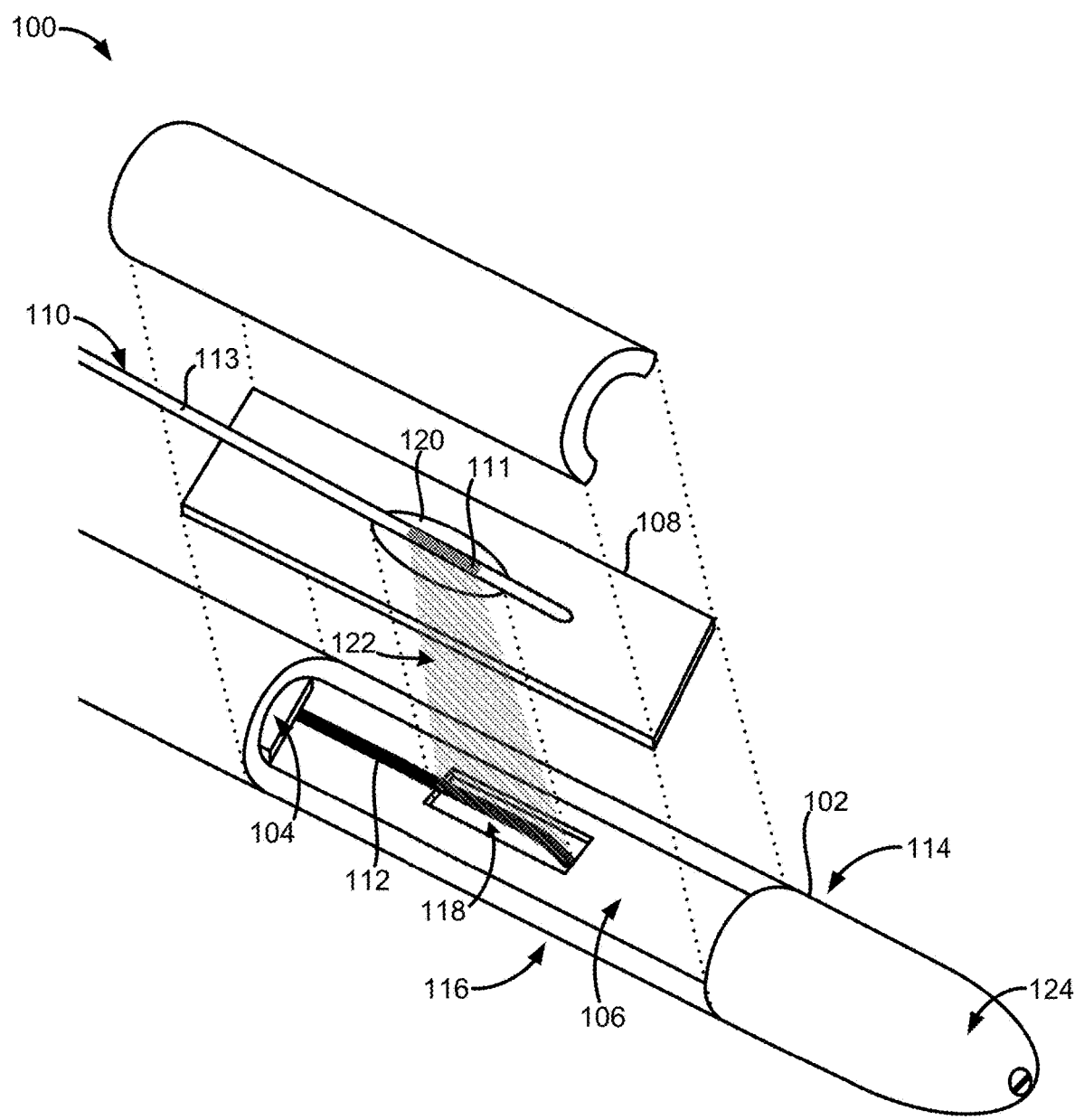
FIG. 1A illustrates a partial exploded perspective view of an embodiment of an imaging apparatus or a CTO re-entry device.

FIG. 1A illustrates a partial exploded perspective view of an embodiment of an imaging apparatus 100. The imaging apparatus 100 can comprise an elongate catheter body 102, a first catheter lumen 104 (see, also, FIG. 5A and FIGS. 6A-6E) or passage extending through the catheter body 102, and a second catheter lumen 106 (see, also, FIG. 5A and FIGS. 6A-6E) or passage extending through the catheter body 102. The first catheter lumen 104 can be separated from the second catheter lumen 106 by at least one dividing layer 108 (a portion of which is shown in FIGS. 1A, 1B, 5A, and 6A-6E). The elongate catheter body 102 can be configured to be advanced through a body lumen of a patient such as a blood vessel of the patient. In another embodiment, the imaging apparatus 100 can be a CTO re-entry device.

As will be discussed in more detail in the following sections, the imaging apparatus 100 can be used to safely deliver a guidewire 112 or another minimally-invasive surgical tool to a target site within a body lumen of the patient under real-time imaging guidance. The imaging apparatus 100 can track the position of the guidewire 112 even after the guidewire 112 has left a lumen of the catheter body 102. In some embodiments, the imaging apparatus 100 can be adapted or configured to work with or be integrated with an endovascular surgical device such as an atherectomy device. In other variations, the imaging apparatus 100 may be supplied in a kit with a guidewire 112, or supplied separately from the guidewire 112 either as a separate accessory or selected from an off-the-shelf guidewire that the user may utilize the imaging apparatus 100. In further embodiments described below, the, the imaging apparatus 100 or CTO re-entry device may further comprise a guiding needle that is integrated with or preinstalled in a second catheter lumen 106, e.g. a movable hollow guiding needle or hollow needle guide 700, 1020 (FIGS. 7A-7B and 10A-10C) which may be used in conjunction with a guidewire 112, 1022. The hollow guiding needle or hollow needle guide may also be supplied as a separate component in a kit with the imaging apparatus 100 or CTO re-entry device, or as a separate optional accessory to the imaging apparatus 100 or CTO re-entry device.

The catheter body 102 can be a long flexible hollow tube configured to allow the guidewire 112, drive shafts, pusher elements, wires, cables, imaging fibers, or a combination thereof to pass through one or more catheter lumens within the catheter body 102. The catheter lumens can also be used to delivery or otherwise introduce fluids, pharmaceutical compositions, contrast media, or a combination thereof to a target site within a body lumen.

The catheter body 102 and/or catheter nose 124 can be made in part of a biocompatible polymeric material, a biocompatible metallic material, or a combination thereof. In some embodiments, the catheter body 102, or parts therein, can be made of a polyamide (e.g., Nylon 6, 11, 12, etc.) or polyether block amide (e.g., PEBAX™), polytetrafluoroethylene (PTFE), polycarbonate (PC), polyetherketone (PEEK), polyethersulfone (PES), polyethylene (PE), polypropylene (PP), polyvinylchloride (PVC), polyvinylidene fluoride (PVDF), perfluoroalkoxy alkane (PFA), or a combination thereof. In alternative embodiments, the catheter body 102, portions thereof, or parts therein can be made in part of stainless steel. In some variations, the catheter body 102 and nose cone 124 may comprise an optically transparent polymer with a refractive index of less than 1.60 may be used. Such materials include polyethylene terephthalate (PET) (n=1.575), a polyamide such as nylon (n=1.565), polydimethylsiloxane (PDMS)(n=1.4118), fluorinated ethylene propylene (FEP), ethylene tetrafluoroethylene (ETFE)(n=1.403), and PFA. In some further embodiments, an optically transparent polymer with a refractive index of less than 1.45 may be used, including ETFE, PDMS, PTFE, FEP and PFA. In still other embodiments, an optically transparent polymer with a refractive index of less than 1.40, is used such as PTFE (n=1.35-1.38), FEP (n=1.344) and PFA (n=1.344) may be used.

The catheter body 102 can have a catheter diameter and a catheter length. In some embodiments, the catheter diameter can be about 2.0 mm. In other embodiments, the catheter diameter can be between about 1.50 mm to about 2.0 mm or between about 2.0 mm to about 2.5 mm. The catheter length can be between about 30.0 cm to about 170.0 cm.

In some embodiments, the first catheter lumen 104 can take up a portion of the interior space within the catheter body 102 and the second catheter lumen 106 can take up the remaining portion of the interior space. For example, the first catheter lumen 104 can occupy or take up half the interior space within the catheter body 102 and the second catheter lumen 106 can occupy or take up the other half of the interior space within the catheter body 102.

In alternative embodiments, the first catheter lumen 104 and the second catheter lumen 106 can be lumens of separate catheters or tubes extending through the catheter body 102. In these embodiments, the dividing layer 108 can be one or more layers or portions of such separate catheters.

The first catheter lumen 104 can be configured to house or contain at least part of an imaging component 110. The second catheter lumen 106 can be configured to house or contain at least part of a guidewire 112. The imaging component 110 can be part of an optical coherence tomography (OCT) imaging system. The imaging component 110 can comprise an imaging sensor 111 coupled or otherwise attached to a distal portion of a sensor cable 113 or wire. In some embodiments, the imaging sensor 111 can comprise a segment of an optical fiber, a gradient index lens, and a micro-prism configured to produce a focused output beam of light (an interrogating beam) that propagates transversely to the longitudinal axis of the catheter body 102. In some embodiments, the sensor cable 113 or wire can be configured to rotate (e.g., rotate back-and-forth) with respect to a longitudinal axis of the sensor cable 113 or wire. In other embodiments, only the distal portion of the sensor cable 113 can be configured to rotate back-and-forth with respect to the longitudinal axis of the sensor cable 113 or wire. As will be discussed in more detail in the following sections, the sensor cable 113, the imaging sensor 111, or a combination thereof can be configured to rock or rotate back-and-forth with respect to a longitudinal axis of rotation at an angle of rotation of less than 360 degrees (more specifically, e.g., less than 180 degrees, less than 90 degrees, or less than 45 degrees).

In other embodiments, the sensor cable 113 may be configured to rotate continuously clockwise or counter-clockwise with respect to a longitudinal axis at a constant speed that may be adjusted between 200 rotation per minute (rpm) and 2000 rpm. In another embodiment, the imaging component can be configured to be rotating continuously clockwise or counter-clockwise with respect to a longitudinal axis at a constant speed that may be adjusted between 200 rotation per minute (rpm) and 1000 rpm. In yet another embodiment, the imaging component can be configured to be rotating continuously clockwise or counter-clockwise with respect to a longitudinal axis at a constant speed that may be adjusted between 200 rotation per minute (rpm) and 500 rpm.

In other embodiments, the sensor cable 113 may be configured to rotate continuously clockwise or counter-clockwise with respect to a longitudinal axis at a varying speed that may be adjusted during operation between 200 rotation per minute (rpm) and 2000 rpm. In another embodiment, the imaging component can be configured to be rotating continuously clockwise or counter-clockwise with respect to a longitudinal axis at a varying speed that may be adjusted during operation between 200 rotation per minute (rpm) and 1000 rpm. In yet another embodiment, the imaging component can be configured to be rotating continuously clockwise or counter-clockwise with respect to a longitudinal axis at a varying speed that may be adjusted during operation between 200 rotation per minute (rpm) and 500 rpm.

The guidewire 112 can be a steerable guidewire. The guidewire 112 can have a guidewire diameter of about 0.85 mm. In some embodiments, the guidewire 112 can have a guidewire diameter of between about 0.35 mm to about 0.85 mm. In other embodiments, the guidewire 112 can have a guidewire diameter of greater than 0.85 mm. As noted previously, the imaging apparatus 100 may be supplied in a kit with a guidewire 112, or supplied separately from the guidewire 112 either as a separate accessory or selected from an off-the-shelf guidewire that the user may utilize the imaging apparatus 100. In other examples, the imaging apparatus 100 or CTO re-entry device may further comprise a guiding needle that is integrated with or preinstalled in second catheter lumen 106, e.g. a movable hollow guiding needle or hollow needle guide 700, 1020 (FIGS. 7A-7B and 10A-10C) which may be used in conjunction with a guidewire 112, 1022. The hollow guiding needle or hollow needle guide may be integrated with or pre-installed in the imaging apparatus 100, or may also be supplied as a separate component in a kit with the imaging apparatus 100 or CTO re-entry device, or as a separate optional accessory to the imaging apparatus 100 or CTO re-entry device. One or more light transmittable windows 120 can be defined along the dividing layer 108 such that light (e.g., infrared or near-infrared light waves) emitted by the imaging component 110 within the first catheter lumen 104 can be transmitted through the one or more light transmittable windows 120. The light transmittable windows 120 can be embedded or integrated with the dividing layer 108. In other embodiments, one or more ports or openings can be made along the dividing layer 108 and the one or more light transmittable windows 120 can be affixed to the ports or openings using adhesives (e.g., light transmittable epoxies or resins), fasteners, clips, clasps, an interference fit, or a combination thereof. The longitudinal length of the light transmittable window may be in the range of 5 mm to 150 mm or more, up to the length of the elongate catheter body, or 30 mm to 100 mm, or 60 mm to 90 mm.

In some embodiments, the one or more light transmittable windows 120 can be made in part of at least one of a transparent polymeric material. For example, the one or more light transmittable windows 120 can be made in part of at least one of polymethylmethacrylate (PMMA), polypropylene, polycarbonate, and polyethylene. In these and other embodiments, the one or more light transmittable windows 120 can be made in part of a ceramic material such as fused silica or quartz. In some embodiments, the one or more light transmittable windows 120 can be made in part of at least one of calcium fluoride, germanium oxide, silicon dioxide, aluminum oxide, and zinc selenide. In other embodiments, the one or more light transmittable windows can be made in part of at least one or more of Polytetrafluoroethylene (PTFE), Fluorinated ethylene propylene (FEP), Perfluoroalkoxy alkanes (PFA), Ethylene tetrafluoroethylene (ETFE), Polydimethylsiloxane (PDMS), nylon, Polyether block amide (PEBAX®) and Polyethylene terephthalate (PET).

The catheter body 102 can comprise a dorsal side 114 and a ventral side 116 opposite the dorsal side 114. A catheter outlet port 118 or access port can be defined along the ventral side 116 of the catheter body 102. The catheter outlet port 118 can be in fluid communication with the second catheter lumen 106 and allow the guidewire 112 within the second catheter lumen 106 to advance out of the second catheter lumen 106 and into the body lumen (e.g., a blood vessel) of the patient.

The catheter outlet port 118 can be aligned or overlap with at least one of the one or more light transmittable windows 120. The catheter outlet port 118 can be aligned (e.g., aligned longitudinally and laterally) or overlap with at least one of the one or more light transmittable windows 120 such that a catheter component extending through the catheter outlet port 118 or a portion of an environment external to the catheter outlet port 118 is optically visible when viewed from the first catheter lumen 104.

For example, the catheter outlet port 118 can be aligned (e.g., aligned longitudinally and laterally) or overlap, at least partially, with at least one of the one or more light transmittable windows 120 such that a catheter component extending through the catheter outlet port 118 or a portion of an environment external to the catheter outlet port 118 is within a field of view 122 of the imaging component 110 positioned over (or in close proximity to) the light transmittable window 120 aligned with the catheter outlet port 118. In this example embodiment, the imaging component 110 can be positioned within the first catheter lumen 104. More specifically, the catheter outlet port 118 can be aligned or overlap with at least one of the one or more light transmittable windows 120 such that the guidewire 112 is within the field of view 122 of the imaging component 110 within the first catheter lumen 104 when the guidewire 112 exits the second catheter lumen 106 through the catheter outlet port 118. Moreover, the guidewire 112 or another catheter component can be in the field of view 122 of the imaging component 110 positioned over the light transmittable window 120 aligned with the catheter outlet port 118 when the guidewire 112 or the other catheter component intersects a transverse orientation plane positioned along an edge of the catheter outlet port 118.

The catheter body 102 can also comprise a tapered or substantially conical-shaped catheter nose 124 at a distal end of the catheter body 102. The tapered or substantially conical-shaped catheter nose 124 can converge into a rounded nose end or blunted tip so that the catheter nose 124 can translate or migrate through the patient's blood vessels or other body lumen without causing trauma. The catheter nose 124 can be made of a relatively soft or deformable material to allow the catheter nose 124 to bend or flex. In some embodiments, catheter nose 124 can be made in part of nylon, silicone rubber, polyurethane, polyethylene terephthalate (PET), Polytetrafluoroethylene (PTFE), Fluorinated ethylene propylene (FEP), Perfluoroalkoxy alkanes (PFA), Ethylene tetrafluoroethylene (ETFE), Polydimethylsiloxane (PDMS), latex, thermoplastic elastomers, or a combination thereof.

Figure 1B:
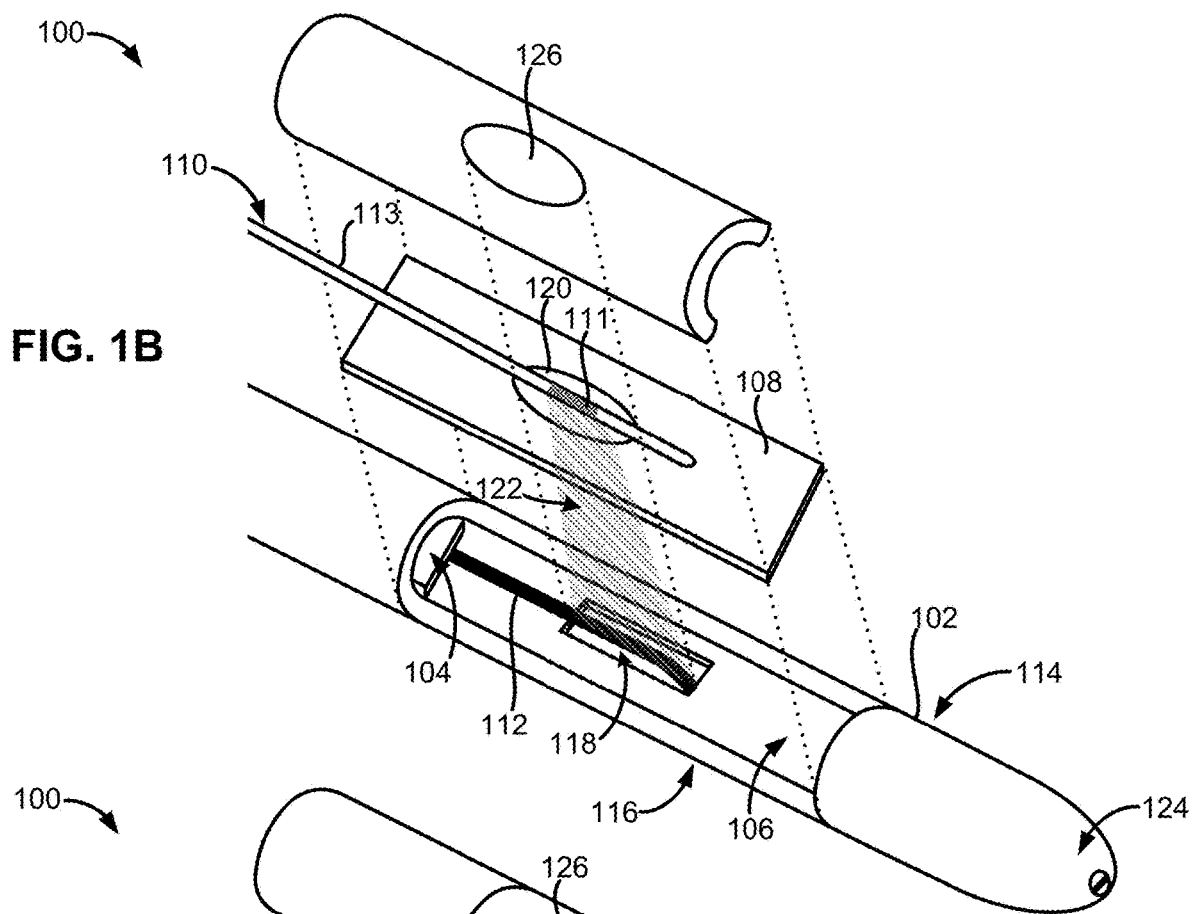
FIG. 1B illustrates a partial exploded perspective view of another embodiment of the imaging apparatus or CTO re-entry device.

FIG. 1B illustrates a partial exploded perspective view of another embodiment of the imaging apparatus 100 comprising a dorsal catheter window 126 defined along a dorsal wall of the catheter body 102. As shown in FIG. 1B, the dorsal catheter window 126 can be aligned (e.g., longitudinally and laterally such that there is partial overlap) with at least one of the light transmittable windows 120 and a catheter outlet port 118. The dorsal catheter window 126 can also be a light transmittable window such that interrogating light beams or imaging light beams can be transmitted through the dorsal catheter window 126. In some embodiments, the dorsal catheter window 126 can be made of the same material as the light transmittable windows 120.

For example, the dorsal catheter window 126 can be made in part of at least one of a transparent polymeric material. For example, the dorsal catheter window 126 can be made in part of at least one of polymethylmethacrylate (PMMA), polypropylene, polycarbonate, and polyethylene. In these and other embodiments, the dorsal catheter window 126 can be made in part of a ceramic material such as fused silica or quartz. In some embodiments, the dorsal catheter window 126 can be made in part of at least one of calcium fluoride, germanium oxide, silicon dioxide, aluminum oxide, and zinc selenide. In other embodiments, the dorsal catheter window 126 can be made in part of at least one or more of Polytetrafluoroethylene (PTFE), Fluorinated ethylene propylene (FEP), Perfluoroalkoxy alkanes (PFA), Ethylene tetrafluoroethylene (ETFE), Polydimethylsiloxane (PDMS), nylon, Polyether block amide (PEBAX®) and Polyethylene terephthalate (PET).

The dorsal catheter window 126 can allow the imaging component 110 to image a portion of the patient's vasculature external to the dorsal catheter window 126. For example, the dorsal catheter window 126 can allow the imaging component 110 to image atherosclerotic material deposited within a patient's blood vessel in proximity to the dorsal catheter window 126. As previously discussed, the sensor cable 113 of the imaging component 110, the imaging sensor 111 coupled to a distal portion of the sensor cable 113, or a combination thereof can be allowed to rotate (e.g., rotate back-and-forth or continuously rotate clockwise or counter-clockwise) with respect to a longitudinal axis of rotation such that both the ventral catheter outlet port 118 (and any guidewires 112 extending through the catheter outlet port 118) and the body lumen environment outside of the dorsal catheter window 126 can be imaged together.

Figure 1C:
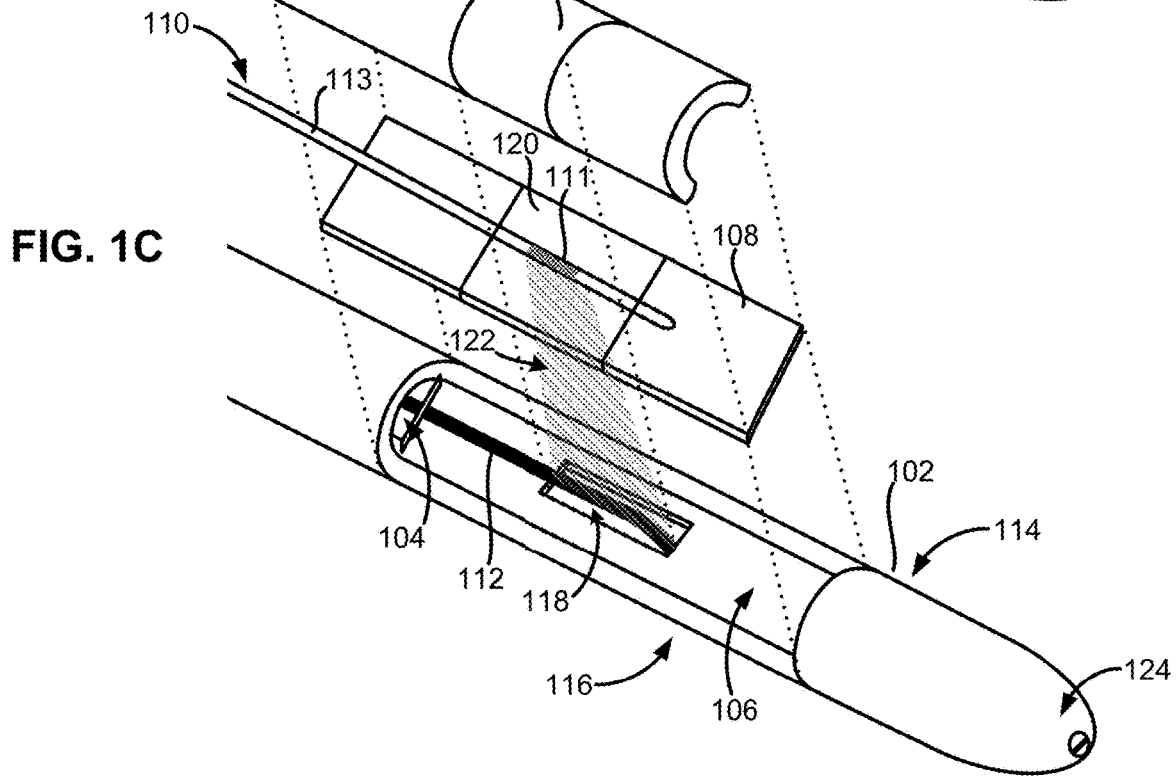
FIG. 1C illustrates a partial exploded perspective view of yet another embodiment of the imaging apparatus or CTO re-entry device.

FIG. 1C illustrates a partial exploded perspective view of yet another embodiment of the imaging apparatus 100 comprising a larger dorsal catheter window 126 than that shown in FIG. 1B. In this embodiment, a segment of the dorsal side of the catheter body 102 can be configured as the dorsal catheter window 126. For example, a segment of the dorsal catheter wall of the catheter body 102 can be made of a light transmittable material such as any of the materials used to make the light transmittable windows 120 or the dorsal catheter window 126 of FIG. 1B.

The dorsal catheter window 126 of FIG. 1C can allow the imaging component 110 to more accurately image a patient's vasculature environment in proximity and external to the dorsal catheter window 126. In alternative embodiments contemplated by this disclosure, one or more circumferential segments of the catheter body 102 including portions of the dorsal and ventral catheter walls can be made in part of a light transmittable material or be substituted with a light transmittable material.

Also, as shown in FIG. 1C, a segment of the dividing layer 108 can be made of a light transmittable material such that the light transmittable window 120 is enlarged relative to the light transmittable windows 120 shown in FIGS. 1A and 1B. In some embodiments, the light transmittable window 120 shown in FIG. 1C can also be used or adapted to the imaging apparatus 100 shown in FIGS. 1A and 1B.

Figure 2A:
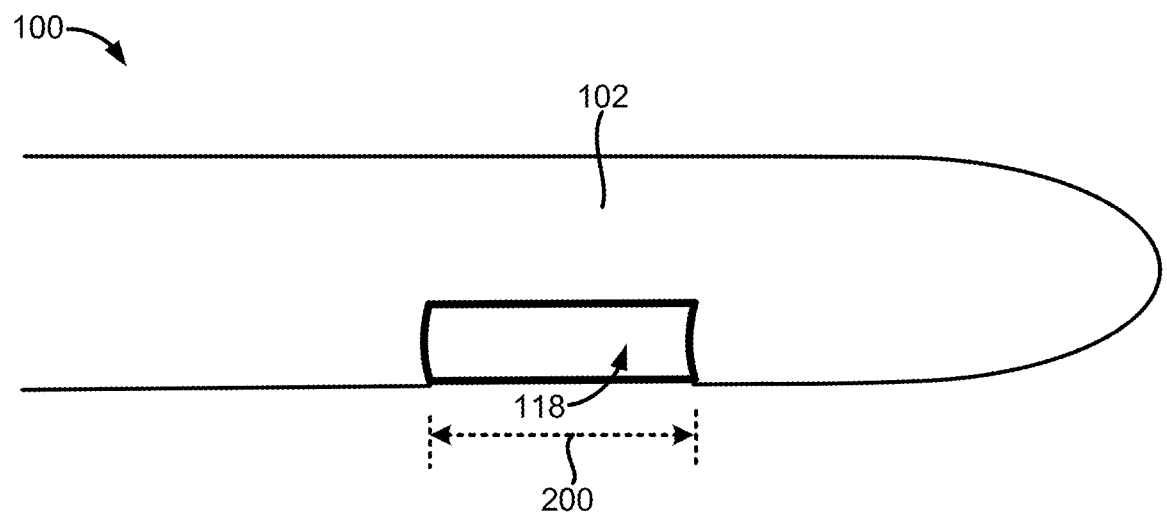
FIG. 2A illustrates a bottom perspective view of an embodiment of the imaging apparatus or CTO re-entry device with a substantially rectangular ventral outlet port.

FIG. 2A illustrates a bottom perspective view of an embodiment of the imaging apparatus 100 with a substantially rectangular ventral outlet port 118 defined along the ventral side 116 of the catheter body 102. The ventral outlet port 118 can be sized to allow the guidewire 112 to easily extend through the ventral outlet port 118 and out of the second catheter lumen 106. For example, the ventral outlet port 118 can have a port footprint or a port profile area. The port footprint or profile area can be greater than the window area of the light transmittable window 120 aligned with the ventral outlet port 118.

The ventral catheter outlet port 118 can have a port length 200. In some embodiments, the port length 200 can be between about 2.0 mm to about 5.0 mm. In other embodiments, the port length 200 can be between about 5.0 mm to about 10.0 mm. In additional embodiments, the port length 200 can be greater than 10.0 mm. When the ventral catheter outlet port 118 is substantially rectangular-shaped, the outlet port 118 can have a port width. The port width can be less than a diameter of the catheter body 102. More specifically, the port width can be less than half the diameter of the catheter body 102.

Figure 2B:
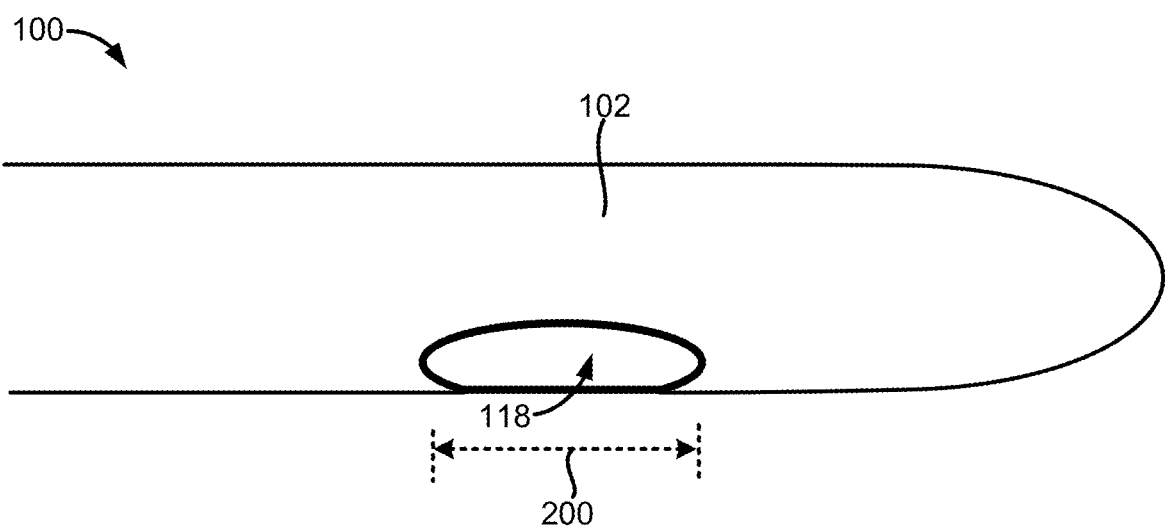
FIG. 2B illustrates a bottom perspective view of an embodiment of the imaging apparatus or CTO re-entry device with a substantially oval ventral outlet port.

FIG. 2B illustrates a bottom perspective view of an embodiment of the imaging apparatus 100 with a substantially oval ventral outlet port 118 defined along the ventral side 116 of the catheter body 102. In some embodiments, the oval ventral outlet port 118 can be substantially elliptical-shaped.

The oval ventral outlet port 118 can have a port footprint or port profile area. The port footprint or profile area can be greater than the window area of the light transmittable window 120 aligned with the oval ventral outlet port 118.

The ventral outlet port 118 can be made by laser-cutting, machine puncturing, or a combination thereof. The edges defining or surrounding the ventral outlet port 118 can be lined or reinforced. In some embodiments, the edges defining or surrounding the ventral outlet port 118 can be beveled or rounded so as to prevent scratching or snagging of the guidewire 112 as the guidewire 112 exits through the ventral outlet port 118.

Figure 3A:
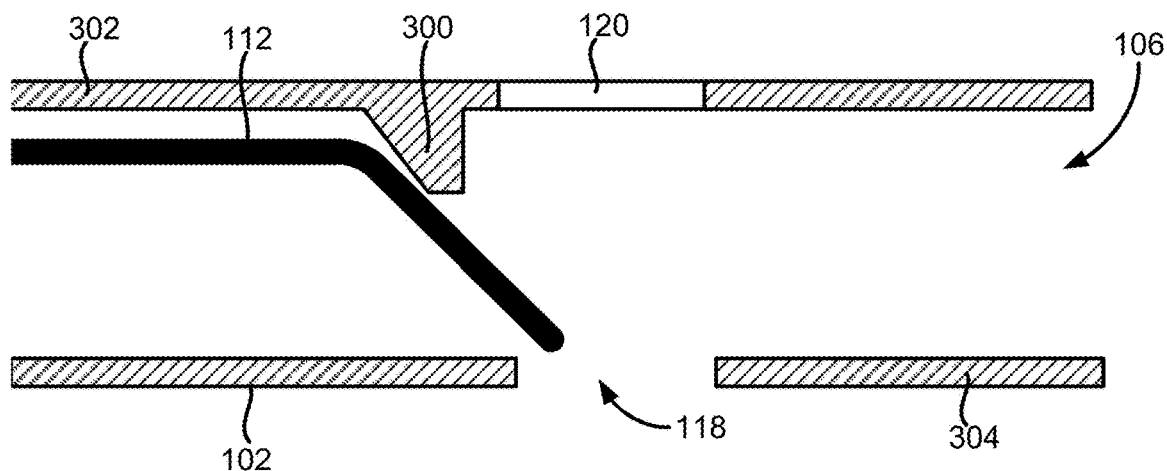
FIG. 3A illustrates a side cross-sectional view of an embodiment of the imaging apparatus or CTO re-entry device having an inclined feature positioned proximal to the catheter outlet port and the light transmittable window.
Figure 3B:
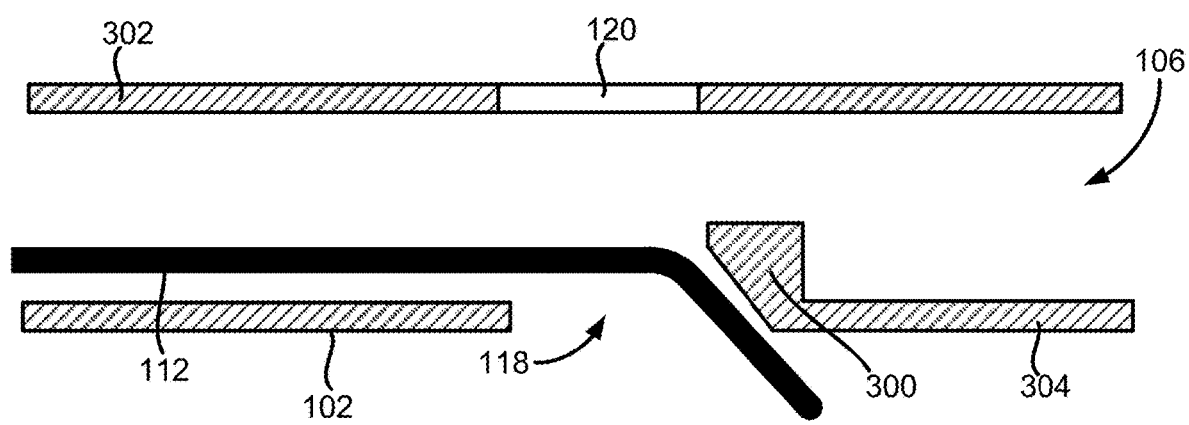
FIG. 3B illustrates a side cross-sectional view of an embodiment of the imaging apparatus or CTO re-entry device having an inclined feature positioned distal to the catheter outlet port and the light transmittable window.

FIGS. 3A-3B illustrate side cross-sectional views of embodiments of a second catheter lumen 106 comprising an inclined feature 300 positioned in proximity to a ventral catheter outlet port 118. As shown in FIG. 3A, the inclined feature 300 can be positioned proximal to the ventral catheter outlet port 118, the light transmittable window 120, or a combination thereof. The inclined feature 300 can protrude or project out into the second catheter lumen 106 from a dorsal lumen wall 302 of the second catheter lumen 106.

FIG. 3B illustrates that the inclined feature 300 can be positioned distal to the ventral catheter outlet port 118, the light transmittable window 120, or a combination thereof. In this embodiment, the inclined feature 300 can protrude or project out into the second catheter lumen 106 from a ventral lumen wall 304 of the second catheter lumen 106.

The inclined feature 300 can be a ramp or sloped structure affixed to the dorsal lumen wall 302, the ventral lumen wall 304, or a combination thereof. The inclined feature 300 can also be a part of the lumen wall of the second catheter lumen 106 or be integrated with the lumen wall.

The inclined feature 300 can act as an obstacle, impediment, or guide that directs or forces the guidewire 112 to advance in a different direction. For example, the inclined feature 300 can act as an obstacle or guide that deflects or otherwise biases the guidewire 112 in a different direction when the guidewire 112 is translated or displaced longitudinally in a distal direction. For example, the inclined feature 300 can act as an obstacle or guide that deflects or otherwise biases the guidewire 112 toward the ventral catheter outlet port 118 so that the guidewire 112 advances out of the catheter outlet port 118.

Figure 3C:
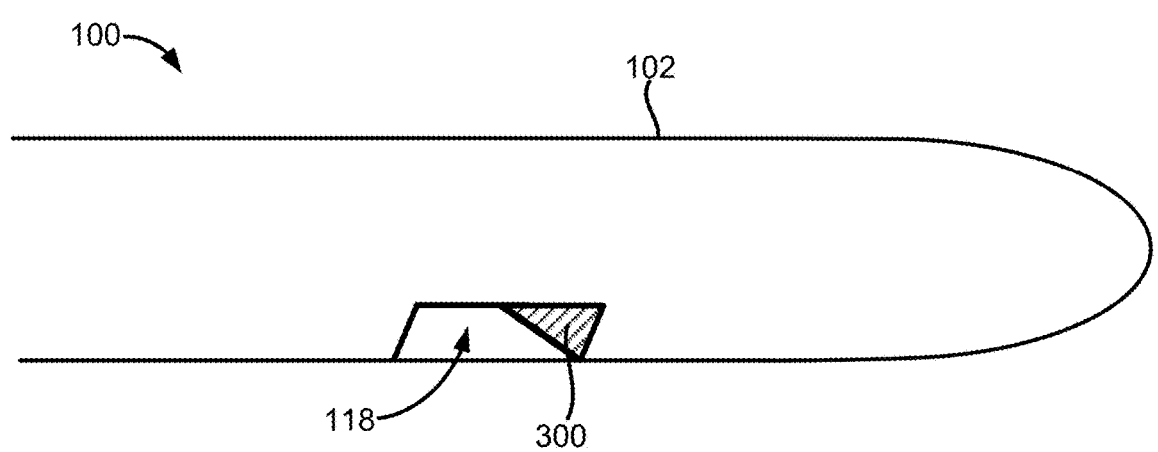
FIG. 3C illustrates a bottom perspective view of an embodiment of the imaging apparatus or CTO re-entry device comprising an inclined feature positioned in proximity to the catheter outlet port.

FIG. 3C illustrates a bottom perspective view of an embodiment of the imaging apparatus 100 comprising an inclined feature 300 (e.g., the inclined feature 300 shown in FIG. 3B) positioned in proximity to the ventral catheter outlet port 118. Although FIGS. 3A-3C illustrate the catheter body 102 comprising only one ventral catheter outlet port 118 and one inclined feature 300, it is contemplated by this disclosure that the catheter body 102 of the imaging apparatus 100 can comprise multiple catheter outlet ports 118 and multiple inclined features 300 positioned in proximity to the catheter outlet ports 118.

In some embodiments, the inclined features 300 can be replaced or supplemented with markers defined along the ventral lumen wall 304. For example, the markers can be fiducial markers made in part of at least one of a metallic material, a polymeric material, or a combination thereof. As a more specific example, the markers can be made in part of at least one of gold, platinum, stainless steel, titanium, Nitinol, carbon-coated polymers, or a combination thereof. The markers can be positioned such that the markers are visible through the one or more light transmittable windows 120. The markers can alert an operator of the apparatus 100 that the guidewire 112 is close to a catheter outlet port 118 or is about to exit through the catheter outlet port 118.

Figure 4:
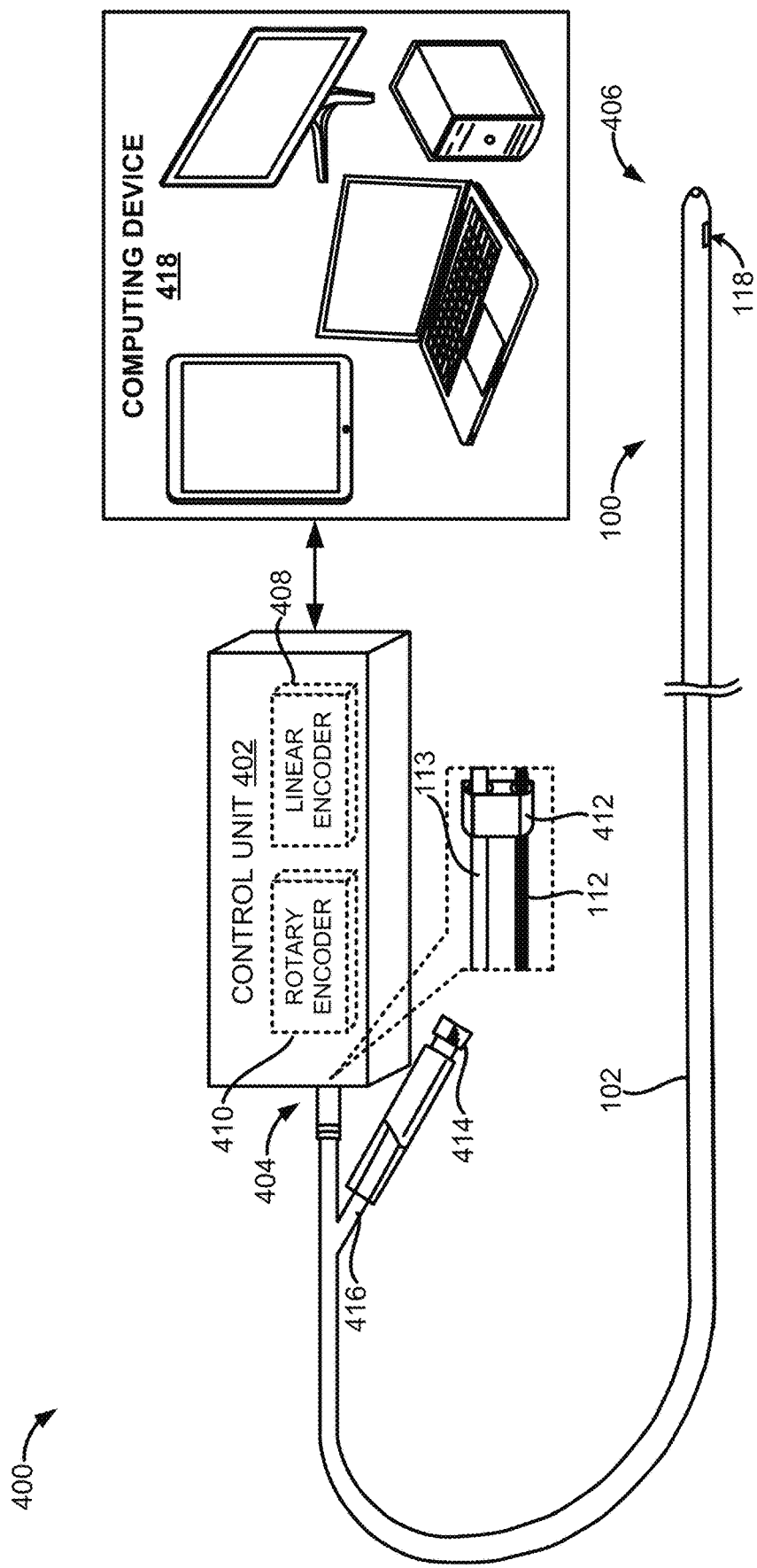
FIG. 4 illustrates an embodiment of an imaging system or a CTO re-entry device comprising the imaging apparatus.

FIG. 4 illustrates an embodiment of an imaging system 400 comprising the imaging apparatus 100. As shown in FIG. 4, the catheter body 102 of the imaging apparatus 100 can be a long flexible tube configured to allow the guidewire 112, the imaging component 110, a drive shaft, sensor wires or fibers, imaging wires or fibers, cables, protective sheaths, parts therein, or a combination thereof to extend or pass through the catheter lumens of the catheter body 102.

The elongate catheter body 102 can also be coupled to a control unit 402 at a proximal end 404 of the elongate catheter body 102. In this embodiment, a distal end 406 of the elongate catheter body 102 can be part of the imaging apparatus 100.

The control unit 402 can comprise a number of electro-mechanical devices or sensors that convert the translational or angular/rotational motion of the guidewire 112, the imaging component 110, or a combination thereof into digital signals or data. For example, the control unit 402 can comprise one or more linear encoders 408, rotary encoders 410, or a combination thereof.

The one or more linear encoders 408 can be optical linear encoders, mechanical linear encoders, magnetic linear encoders, inductive linear encoders, capacitive linear encoders, or a combination thereof. The linear encoders 408 can be absolute encoders, incremental encoders, or a combination thereof. The one or more linear encoders 408 can track or encode the longitudinal movement/translation or displacement of the guidewire 112, the imaging component 110, or a combination thereof through the catheter lumens of the elongate catheter body 102. For example, the one or more linear encoders 408 can track or encode the longitudinal movement/translation or displacement of the proximal segments of the guidewire 112 and the imaging component 110 (or the sensor cable 113 of the imaging component 110).

When both the longitudinal movement or displacement of the guidewire 112 and the imaging component 110 are encoded or tracked by the same liner encoder 408 or separate linear encoders 408 connected to the same controller, the longitudinal movement or displacement of the guidewire 112 and the imaging component 110 can be correlated or associated with one another. For example, the imaging component 110 (or the sensor cable 113 of the imaging component 110) can be translated longitudinally (e.g., in a distal direction) a distance through the first catheter lumen 104 as tracked or encoded by the linear encoder 408 and the guidewire 112 can be subsequently or simultaneously translated longitudinally (e.g., in the same distal direction) the same distance through the second catheter lumen 106 as tracked or encoded by the same linear encoder 408 or another linear encoder 408 within the control unit 402. In some embodiments, the guidewire 112 can be translated a distance out of the catheter body 102 (for example, through the ventral catheter outlet port 118) as tracked or encoded by the linear encoder 408 and the imaging component 110 can be simultaneously or subsequently translated the same distance longitudinally through the first catheter lumen 104 as tracked or encoded by the same linear encoder 408 or another linear encoder 408.

In these and other embodiments, the control unit 402 can also comprise one or more rotary encoders 410. The one or more rotary encoders 410 can be absolute rotary encoders, incremental rotary encoders, or a combination thereof. The one or more rotary encoders 410 can be optical rotary encoders, mechanical rotary encoders, magnetic rotary encoders, capacitive rotary encoders, or a combination thereof. The one or more rotary encoders 410 can track or encode the rotation or angular position of the guidewire 112, the imaging component 110, or a combination thereof. When both the angular position or rotation of the guidewire 112 and the imaging component 110 are encoded or tracked by the same rotary encoder 410 or separate rotary encoders 410 connected to the same controller, the angular position or rotation of the guidewire 112 and the imaging component 110 can be correlated or associated with one another as the guidewire 112 and the imaging component 110 moves through the catheter lumens of the catheter body 102.

As shown in the inset in FIG. 4, a proximal segment of the guidewire 112 can also be conjoined with a proximal segment of the imaging component 110 (such as the sensor cable 113 of the imaging component 110). For example, a proximal segment of the guidewire 112 can be physically conjoined with a proximal segment of the sensor cable 113 with a clamp 412, a clasp, a clip, or other mechanical fasteners. Conjoining the guidewire 112 to the imaging component 110 can facilitate the correlation of the longitudinal translation of the guidewire 112 with the longitudinal translation of the imaging component 110. Although FIG. 4 shows the guidewire 112 conjoined to the imaging component 110 within the control unit 402, it is contemplated by this disclosure that the guidewire 112 can be conjoined to the imaging component 110 outside of the control unit 402 or even proximal to the control unit 402.

In some embodiments, the control unit 402 can be configured as a handle or handheld unit. In other embodiments, the control unit 402 can be configured as a control box or tabletop unit. The control unit 402 can also comprise a motor and drive assembly.

The motor and drive assembly can be configured to translate the guidewire 112, the imaging component 110, or a combination thereof in a longitudinal direction (e.g., in a distal direction, a proximal direction, or a combination thereof). The motor and drive assembly can provide torque or rotate a proximal segment of the imaging component 110 (or the proximal segment of the sensor cable 113). For example, the motor and drive assembly can be configured to rock the imaging component 110 by partly rotating the imaging component 110 with respect to a longitudinal axis of rotation back-and-forth. The motor and drive assembly can also provide torque or rotate a proximal segment of the guidewire 112.

The elongate catheter body 102 can also be used to deliver or otherwise introduce fluids, pharmaceutical compositions, contrast media, or a combination thereof to the imaging apparatus 100, a target treatment site in proximity to the imaging apparatus 100 (e.g., a target vessel site within the patient's body), or a combination thereof.

In some embodiments, such fluids, pharmaceutical compositions, and/or contrast media can be introduced through a fluid entry port 414 of a Y-fitting or Y-connector 416 defined along, coupled to, or in fluid communication with the catheter body 102. In other embodiments, such fluids, pharmaceutical compositions, and/or contrast media can be introduced through other connections or ports along the catheter body 102.

The control unit 402 can also be coupled to a computing device 418. The computing device 418 can be part of the imaging system 400. In some embodiments, the computing device 418 can be a desktop computer, a laptop computer, a tablet device, or a combination thereof. The computing device 418 can comprise a central processing unit (CPU) and a number of memory units. The CPU can have a 32-bit processor data bus or a 64-bit processor data bus. The CPU can be a dual core, quad core, or other multi-core processors. The CPU can operate at speeds of 3 GHz or more. The memory units can comprise random access memory (RAM) and read-only memory (ROM). More specifically, the memory units can comprise dynamic RAM (DRAM), static RAM (SRAM), sync DRAM (SDRAM), double data rate (DDR) SDRAM, double data rate 2 (DDR2) SDRAM, or a combination thereof. The computing device 418 comprise a graphical processing unit (GPU) to provide for additional and supplementary image processing power. The GPU may comprise a frame buffer or memory of at least 4 GB, a base clock of at least 1 GHz, a boost clock of at least 1 GHz, a tensor core count of more than 250, and a Compute Unified Device Architecture (CUDA) core count of more than 2000. In another embodiment, the CPU and/or the GPU may further comprise an Advanced RISC Machine (ARM). In another embodiment, the computing device 418 comprise of the data acquisition board having a sampling rate of at least 150 mega-samples per second. The computing device 418 may also comprise an FPGA or ASIC in conjunction or in lieu of the CPU and/or GPU.

The computing device 418 can process and store images captured by the imaging component 110. The imaging component 110 and the computing device 418 can be combined with other devices to make up part of an OCT imaging system. For example, the OCT imaging system can be a common-path OCT system, a time domain OCT system, a spectral domain OCT system, or a combination thereof. The computing device 418 can be coupled to a light detector configured to detect light reflected back from a target. The light detector can be housed within the control unit 402 along with a light source.

The computing device 418 can also be configured to perform image registration on images captured by the imaging component 110. For example, image registration can involve establishing correspondence between features in sets of images and using one or more transformation models to infer correspondence of additional features away from such features. Imaging registration can also be referred to as image alignment. Image registration can also be done to align or map images obtained from different imaging modalities (e.g., OCT with intravascular ultrasound (IVUS) or OCT with X-ray fluoroscopy).

Figure 5A:
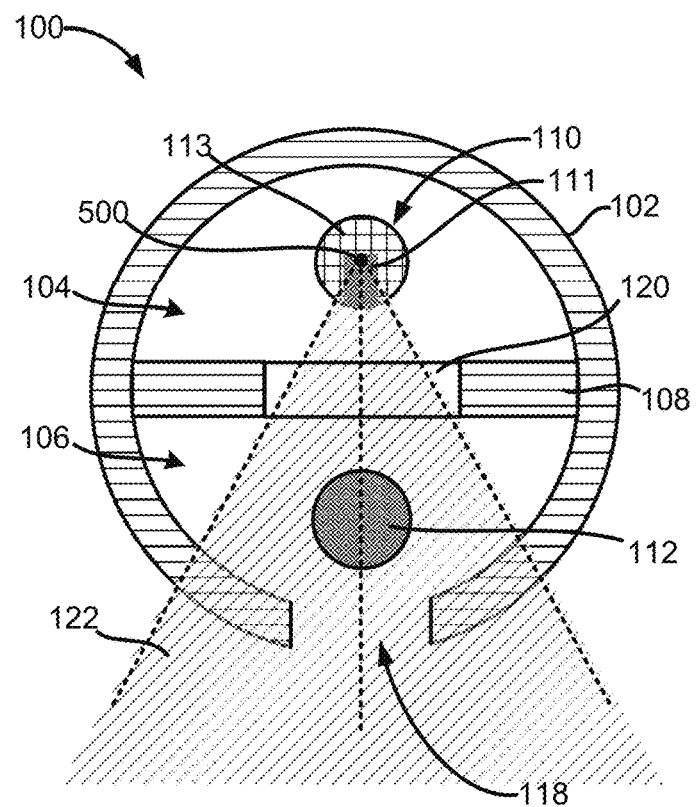
FIG. 5A illustrates a transverse cross-sectional view of an embodiment of the imaging apparatus or CTO re-entry device.

FIG. 5A illustrates a transverse cross-sectional view of an embodiment of the imaging apparatus 100 comprising an imaging component 110 configured to be rocked with respect to a longitudinal axis of rotation 500.

As previously discussed, the imaging component 110 can be part of an OCT imaging system. The imaging component 110 can comprise an imaging sensor 111 coupled or otherwise attached to a distal portion or segment of a sensor cable 113 or wire. In some embodiments, the imaging sensor 111 can comprise a segment of an optical fiber, a gradient index lens, and a micro-prism configured to produce a focused output beam of light (an interrogating beam) that propagates transversely to the longitudinal axis of the catheter body 102.

OCT is an infrared light-based imaging modality that can be used to generate cross-sectional images of the blood vessel walls and/or deposited plaque with sufficient resolution and contrast to allow a clinician or surgeon to identify features associated with the plaque. For example, such features can include fibrous plaque, lipid-rich plaque, calcium deposits, macrophages, cholesterol crystals, red/white thrombus, or a combination thereof. OCT imaging can be done in situ and in real-time.

The images obtained through OCT can have axial resolutions of between about 1 µm to 15 µm, which is one to two orders of magnitude higher than conventional ultrasound (e.g., intravascular ultrasound (IVUS)). The imaging component 110 can generate an interrogating beam of light and cast the beam of light into tissue or on other objects within the field of view 122 of the imaging component 110. In some embodiments, a technique known as interferometry is utilized to determine the path length traveled by the interrogating beam of light incident on the tissue or object to be imaged. A light source (housed, for example, within the control unit 402) can generate near infrared or infrared light having a wavelength between about 800 nm to about 1.5 µm. The light source can be connected to the imaging sensor 111 or light emitter via a fiber optic cable or wire such as a single mode optical fiber. In some embodiments, the fiber optic cable can be part of the sensor cable 113, be wound around the sensor cable 113, or extend through a lumen of the sensor cable 113. In certain embodiments, an interferometer can divide the light generated by the light source into two beams and then direct one of the beams into the tissue or object to be imaged and the other beam to a reference mirror positioned at a known location relative to the beam source. The light which returns from both the tissue and the reference mirror enters a detector (positioned, for example, within the control unit 402) where it is recombined and the interference between the two beams is determined. A property of light known as the light's "coherence length" determines the depth resolution of the OCT imaging system.

Figure 5B:
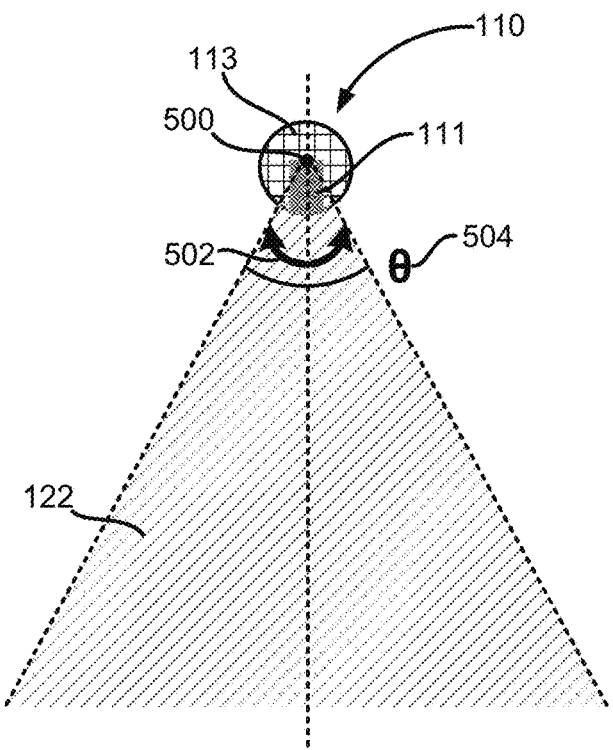
FIG. 5B illustrates an example rocking motion undertaken by an imaging component of the imaging apparatus or CTO re-entry device.

FIG. 5B illustrates an example rocking motion 502 undertaken by the imaging component 110 of the imaging apparatus 100. For example, the sensor cable 113 having the imaging sensor 111 coupled to the distal portion of the sensor cable 113 can be rotated with respect to a longitudinal axis of rotation 500. The sensor cable 113 can be rocked such that the sensor cable 113 and the imaging sensor 111 rotates back-and-forth at an angle of rotation 504 of less than 180 degrees. For example, the sensor cable 113 can be rocked such that the sensor cable 113 and the imaging sensor 111 rotates back-and-forth at an angle of rotation 504 of between about 30 degrees to about 90 degrees. In other embodiments, the sensor cable 113 can be rocked such that the sensor cable 113 and the imaging sensor 111 rotates back-and-forth at an angle of rotation 504 of between about 90 degrees and 180 degrees. In further embodiments, the sensor cable 113 can be rocked such that the sensor cable 113 and the imaging sensor 111 rotates back-and-forth at an angle of rotation 504 of between about 180 degrees and 360 degrees. Rocking the imaging component 110 rather than continuously rotating the imaging component 110 fully (i.e., 360 degrees) can reduce the wear and tear on the imaging component 110 (including wear and tear on the fiber optic wires or cables and other components of the imaging component 110).

As shown in FIGS. 5A and 5B, the interrogating beam of light can be directed at or aimed toward the ventral side 116 of the catheter body 102. In these embodiments, the guidewire 112 and the catheter outlet port 118 can be within the field of view 122 of the imaging component 110 as the interrogating beam of light sweeps over the guidewire 112 and the catheter outlet port 118. As illustrated in FIG. 5A, the interrogating beam of light can pass through the light transmittable window 120 defined along the dividing layer 108. In other embodiments (for example, as shown in FIG. 6E), the imaging component 110 (including the sensor cable 113 and the imaging sensor 111) can be rotated 180 degrees or more such that the interrogating beam of light is directed at or aimed toward the dorsal side 114 of the catheter body 102. In these embodiments, the catheter body 102 can have a dorsal catheter window 126 (see FIGS. 1B, 1C, and 6E) positioned along the dorsal side 114 of the catheter body 102. Once the interrogating beam of light is directed or aimed toward the dorsal side 114 of the catheter body 102, the imaging component 110 (including the sensor cable 113 and the imaging sensor 111) can be rocked such that the sensor cable 113 and the imaging sensor 111 rotates back-and-forth at an angle of rotation 504 of between about 30 degrees and 180 degrees (but now with the light directed generally toward the dorsal side 114 of the catheter body 102).

Figure 6A:
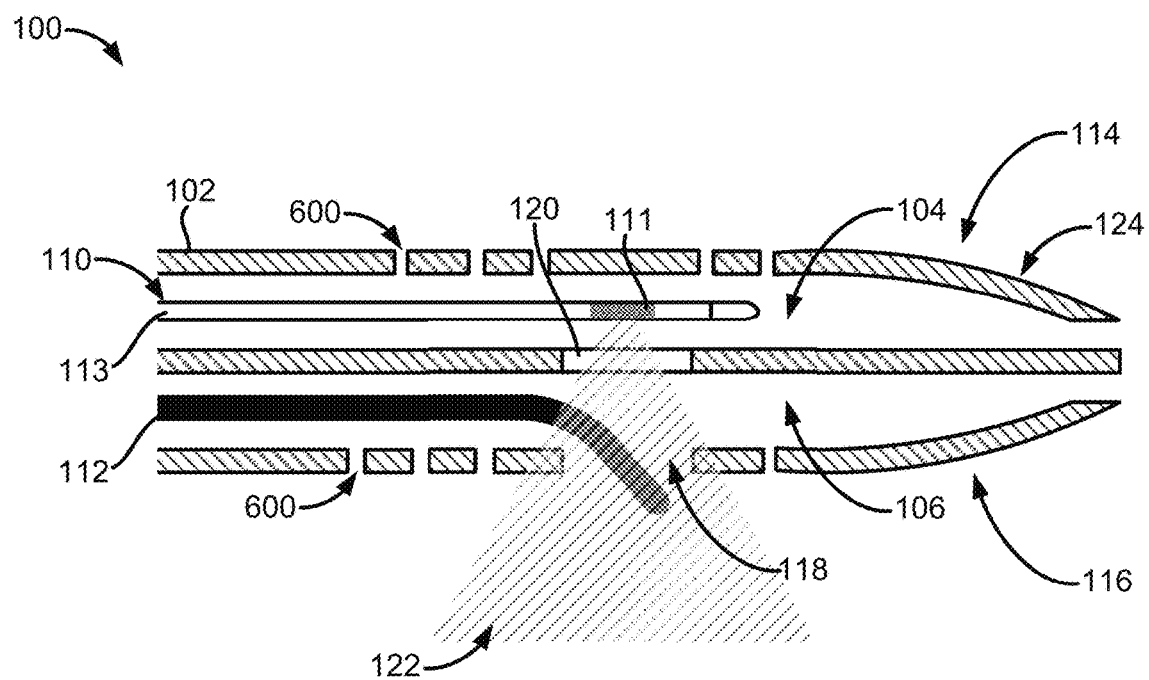
FIG. 6A illustrates a side cross-sectional view of an embodiment of the imaging apparatus or CTO re-entry device comprising a light transmittable window aligned with a catheter outlet port.

FIG. 6A illustrates a side cross-sectional view of an embodiment of the imaging apparatus 100 comprising a light transmittable window 120 aligned (e.g., longitudinally and laterally such that there is at least partial overlap) with a ventral catheter outlet port 118. As shown in FIG. 6A, the imaging apparatus 100 can comprise an elongate catheter body, a first catheter lumen 104 extending through the catheter body 102, and a second catheter lumen 106 extending through the catheter body 102. The second catheter lumen 106 can be separated from the first catheter lumen 104 by a dividing layer 108. The light transmittable window 120 can be defined along the dividing layer 108. The catheter outlet port 118 can be defined along a ventral side 116 of the catheter body 102 and allow a guidewire 112 housed (or at least partially housed) within the second catheter lumen 106 to advance through the catheter outlet port 118 and exit (at least partially) out of the catheter body 102.

As illustrated in FIG. 6A, alignment of the light transmittable window 120 (e.g., alignment longitudinally and laterally such that there is at least partial overlap) with the ventral catheter outlet port 118 can allow light (e.g., near infrared or infrared light) emitted by the imaging component 110 to pass through the light transmittable window 120 such that the catheter outlet port 118 and any components passing through the catheter outlet port 118 (e.g., the guidewire 112) is within the field of view 122 of the imaging component 110.

In some embodiments, the imaging component 110 can be configured to be rocked such that the imaging component 110 rotates back-and-forth with respect to a longitudinal axis of rotation 500 at an angle of rotation 504 (see FIGS. 5A and 5B) of less than 180 degrees (e.g., between about 30 degrees and about 180 degrees). As previously discussed, the imaging component 110 can be part of an optical coherence tomography (OCT) imaging system and the part of the imaging component 110 rocked or rotated can be a sensor cable 113 of the imaging component 110 such as a fiber optic cable or a cable/wire protecting or housing the fiber optic cable. In certain embodiments, a distal end of the sensor cable 113 can be rocked or rotated.

As previously discussed, the light transmittable window 120 can be made in part of at least one of polymethylmethacrylate (PMMA), polypropylene, polycarbonate, and polyethylene. In these and other embodiments, the light transmittable window 120 can be made in part of at least one of calcium fluoride, germanium oxide, silicon dioxide, aluminum oxide, and zinc selenide. In other embodiments, the light transmittable window can be made in part of at least one or more of polytetrafluoroethylene (PTFE), fluorinated ethylene propylene (FEP), perfluoroalkoxy alkanes (PFA), ethylene tetrafluoroethylene (ETFE), polydimethylsiloxane (PDMS), nylon, polyether block amide (PEBAX®) and polyethylene terephthalate (PET).

FIG. 6A also illustrates that the imaging apparatus 100 can comprise a plurality of perfusion ports 600 defined along a length of the catheter body 102. The perfusion ports 600 can be positioned in proximity to the catheter outlet port 118. The perfusion ports 600 can also be positioned in proximity to any light transmittable windows (e.g., dorsal catheter windows 126 or ventral catheter windows 606, see FIGS. 6D and 6E) defined along the catheter body 102.

Figure 6B:
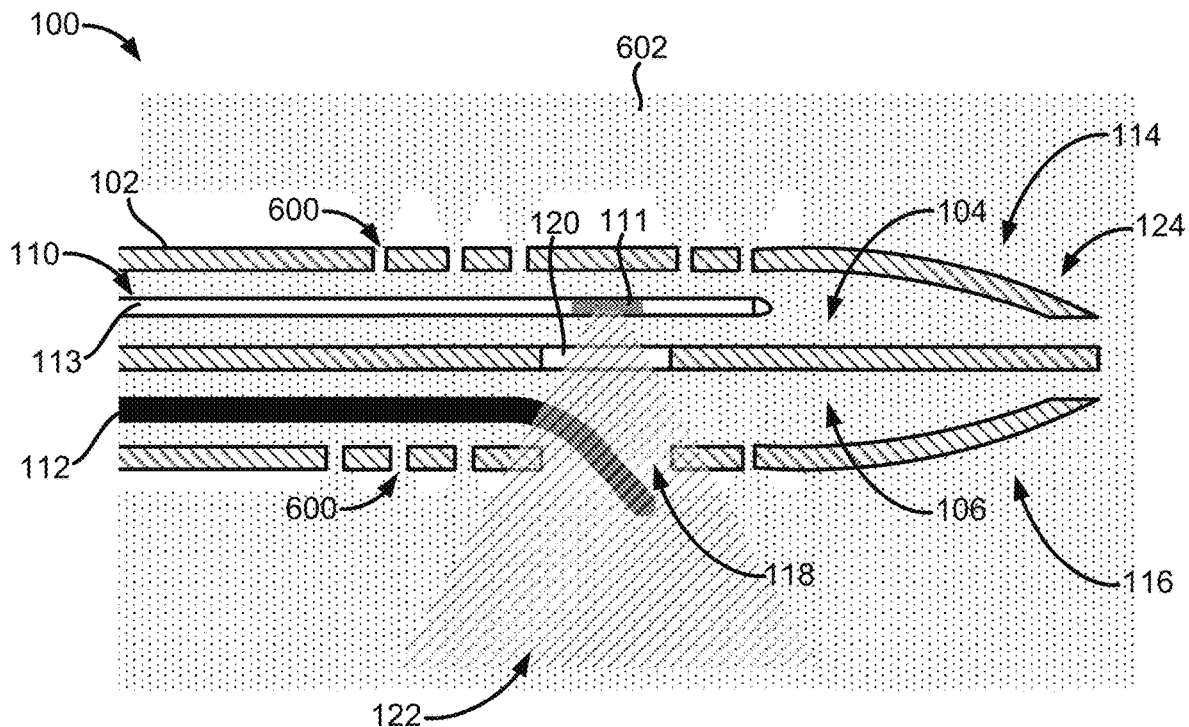
FIG. 6B illustrates a side cross-sectional view of an embodiment of the imaging apparatus or CTO re-entry device with a light transmittable fluid being perfused through perfusion ports defined along a segment of the imaging apparatus.

FIG. 6B illustrates a side cross-sectional view of an embodiment of the imaging apparatus 100 with a light transmittable fluid 602 being perfused through the plurality of perfusion ports 600 defined along the ventral side 116 and the dorsal side 114 of the catheter body 102.

The perfusion ports 600 can be in fluid communication with one or more lumens within the catheter body 102. For example, the perfusion ports 600 can be in fluid communication with the first catheter lumen 104, the second catheter lumen 106, or a combination thereof. In some embodiments, a subset or a few of the perfusion ports 600 can be in fluid communication with the first catheter lumen 104 and another subset or the remainder of the perfusion ports 600 can be in fluid communication with the second catheter lumen 106.

As illustrated in FIG. 6B, the fluid 602 can fill or at least partially fill the first catheter lumen 104, the second catheter lumen 106, or a combination thereof and perfuse out of the catheter body 102 through the perfusion ports 600 into a target vessel site surrounding the imaging apparatus 100. Moreover, the fluid 602 can exit the catheter body 102 through the catheter outlet port 118.

As previously discussed, the imaging component 110 can be part of an OCT imaging system. OCT is an infrared light-based imaging modality. A major challenge faced when conducting intravascular OCT is the high light scattering property of blood which causes significant attenuation of the OCT imaging signal and inhibits clear imaging of the vessel walls. To overcome this challenge, blood within the imaging field of view 122 must first be cleared with a light transmittable fluid or media. The plurality of perfusion ports 600 can allow the light transmittable fluid 602 to more evenly distribute into the blood vessel to flush out or otherwise displace the blood within the imaging field of view 122. The plurality of perfusion ports 600 can also help to regulate pressure within the catheter body 102.

Imaging of the guidewire 112 or a target vessel site (including atherosclerotic material deposited within the target vessel site) can be done after flushing the target vessel site with the light transmittable fluid 602. In addition, imaging of the guidewire 112 or the target vessel site (including the atherosclerotic material deposited within the target vessel site) can be done simultaneously or contemporaneously with the flushing.

In some embodiments, the light transmittable fluid 602 can be a saline solution. For example, the fluid 602 can be 0.90% sodium chloride (NaCl) solution. Alternatively, the fluid 602 can be a 0.45% NaCl solution or a solution comprising between about 0.45% to about 0.90% NaCl. In other embodiments, the fluid 602 can be a heparinized saline solution or a saline solution comprising the anticoagulant Heparin. The heparinized saline solution can be used to prevent clotting or prevent occlusions from being formed at the target vessel site or within the blood vessel.

In further embodiments, the fluid 602 can be or comprise a Ringer's lactate solution (also known as RL or LR solution). The Ringer's lactate solution can comprise a mixture of sodium chloride, sodium lactate, potassium chloride, and calcium chloride in water. In additional embodiments, the fluid 602 can comprise a radiographic contrast agent or dye. For example, the fluid 602 can be or comprise 30% or 60% Iodixanol in a Ringer's lactate solution or another type of saline solution (for example, a 0.90% NaCl solution). Furthermore, the fluid 602 can be or comprise 30% Iohexol in a Ringer's lactate solution or another type of saline solution (for example, a 0.90% NaCl solution). In other embodiments, the fluid 602 can be or comprise 5% Dextran in Ringer's lactate solution or another type of saline solution (for example, a 0.90% NaCl solution).

Figure 6C:
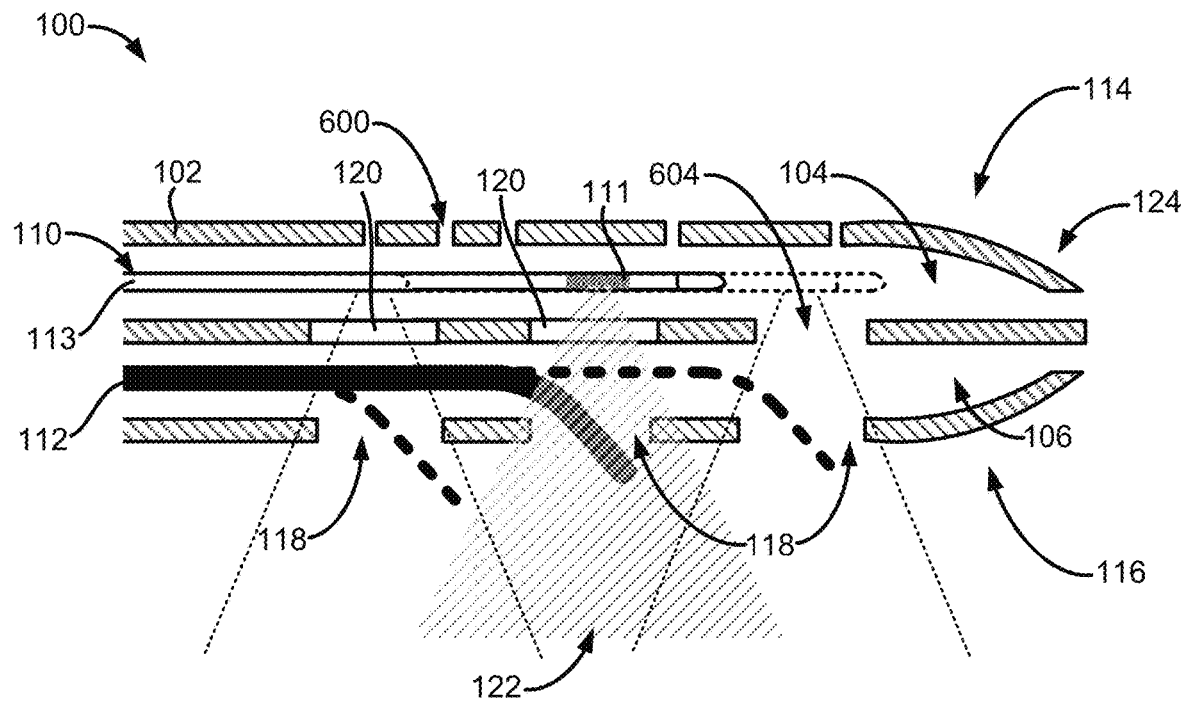
FIG. 6C illustrates a side cross-sectional view of another embodiment of the imaging apparatus or CTO re-entry device comprising multiple catheter outlet ports and at least one of the catheter outlet ports aligned with a light transmittable window defined along a dividing layer.

FIG. 6C illustrates a side cross-sectional view of another embodiment of the imaging apparatus 100 comprising multiple ventral catheter outlet ports 118. At least one of the ventral catheter outlet ports 118 can be aligned with at least one of the light transmittable windows 120 defined along the dividing layer 108. The additional outlet ports 118 can allow the guidewire 112 to advance or exit out of the second catheter lumen 106 at different locations along the catheter body 102. An operator of the imaging component 110, the guidewire 112, or a combination thereof (e.g., a surgeon or other medical professional) can select which of the catheter outlet ports 118 the guidewire 112 will advance through to exit the catheter body 102.

FIG. 6C also illustrates that the imaging apparatus 100 can comprise a layer opening 604 defined along the dividing layer 108. The layer opening 604 can serve the same function as the light transmittable window 120 but allow fluids or other components or wires/cables extending through the first catheter lumen 104 to reach the second catheter lumen 106 (or vice versa).

Figure 6D:
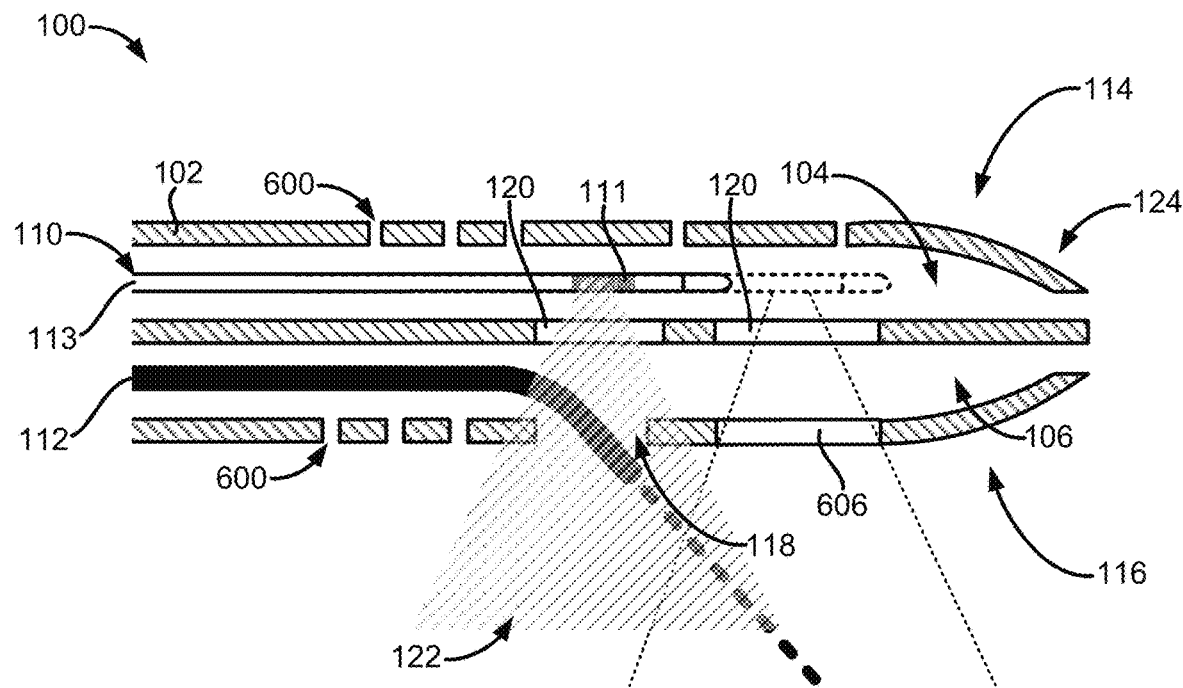
FIG. 6D illustrates a side cross-sectional view of another embodiment of the imaging apparatus or CTO re-entry device comprising a ventral catheter outlet port and at least one ventral window.
Figure 6E:
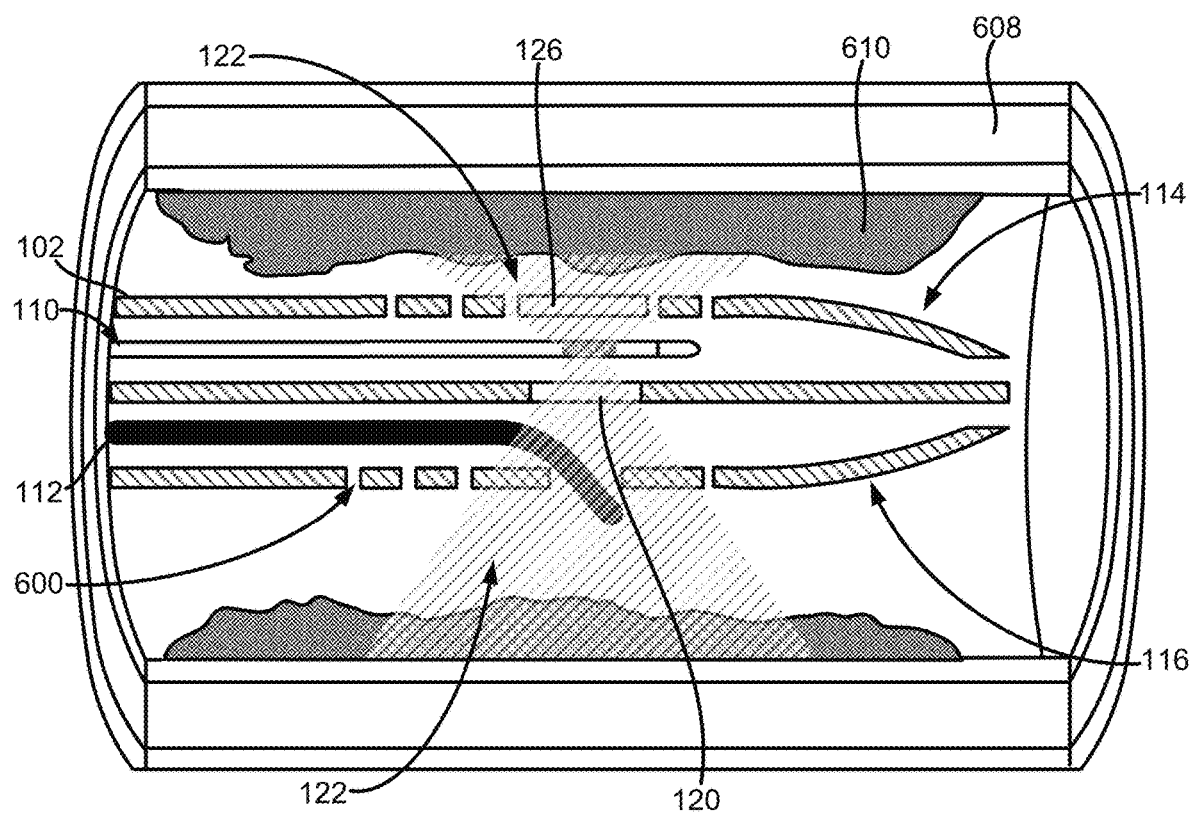
FIG. 6E illustrates a side cross-sectional view of another embodiment of the imaging apparatus or CTO re-entry device comprising a ventral catheter outlet port, at least one light transmittable window aligned with the ventral catheter outlet port, and a dorsal catheter window aligned with the light transmittable window.

FIG. 6D illustrates a side cross-sectional view of another embodiment of the imaging apparatus 100 comprising a ventral catheter outlet port 118 and at least one ventral catheter window 606. In some embodiments, the ventral catheter window 606 can be made in part of the same materials as the light transmittable window(s) 120 defined along the dividing layer 108. In other embodiments, the ventral catheter window 606 can be made in part of a different material from the light transmittable window(s) 120 defined along the dividing layer 108. The ventral catheter window 606 can be aligned (longitudinally and laterally such that there is at least some overlap) with at least one of the light transmittable windows 120 or the layer opening 604 defined along the dividing layer 108. This can allow the imaging component 110 to image the guidewire 112 as the guidewire 112 exits the catheter body 102 and advances away from the ventral catheter outlet port 118.

FIG. 6E illustrates a side cross-sectional view of another embodiment of the imaging apparatus 100 extending into a body lumen (e.g., a blood vessel 608) of a patient. As shown in FIG. 6E, the blood vessel 608 can have atherosclerotic material 610 (e.g., calcified plaque) deposited along the walls of the blood vessel 608.

The imaging apparatus 100 can comprise a dorsal catheter window 126 defined along the dorsal side 114 of the catheter body 102. The dorsal catheter window 126 can allow the imaging component 110 to image the blood vessel wall or the atherosclerotic material 610 external to the dorsal catheter window 126. As previously discussed, the imaging component 110 (including the sensor cable 113 and the imaging sensor 111) can be rotated 180 degrees or more such that the interrogating beam of light is directed or aimed toward the dorsal side 114 of the catheter body 102. Once the interrogating beam of light is directed or aimed toward the dorsal side 114 of the catheter body 102, the imaging component 110 (including the sensor cable 113 and the imaging sensor 111) can be rocked such that the sensor cable 113 and the imaging sensor 111 rotates back-and-forth at an angle of rotation 504 of between about 30 degrees and 180 degrees (but now with the light directed generally toward the dorsal side 114 of the catheter body 102). The imaging component 110 can then be rotated once again (e.g., 180 degrees) and the interrogating beam of light can once again be directed or aimed toward the ventral side 116 of the catheter body 102 to image an opposite blood vessel wall and the atherosclerotic material 610 deposited on the opposite blood vessel wall. In this manner, the imaging apparatus 100 can be adapted to image concentric plaque buildup as well as eccentric plaque buildup.

Figure 7A:
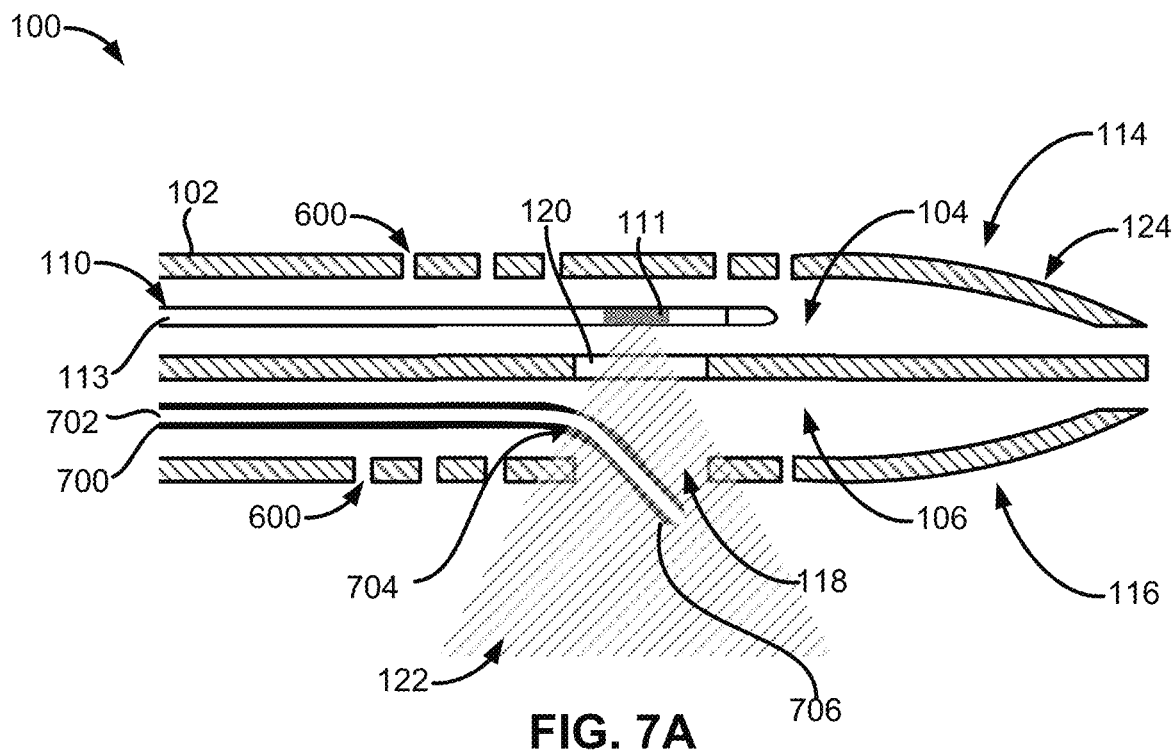
FIG. 7A is a side cross-sectional view of another embodiment of the imaging apparatus or CTO re-entry device comprising an extendable hollow guiding needle.
Figure 7B:
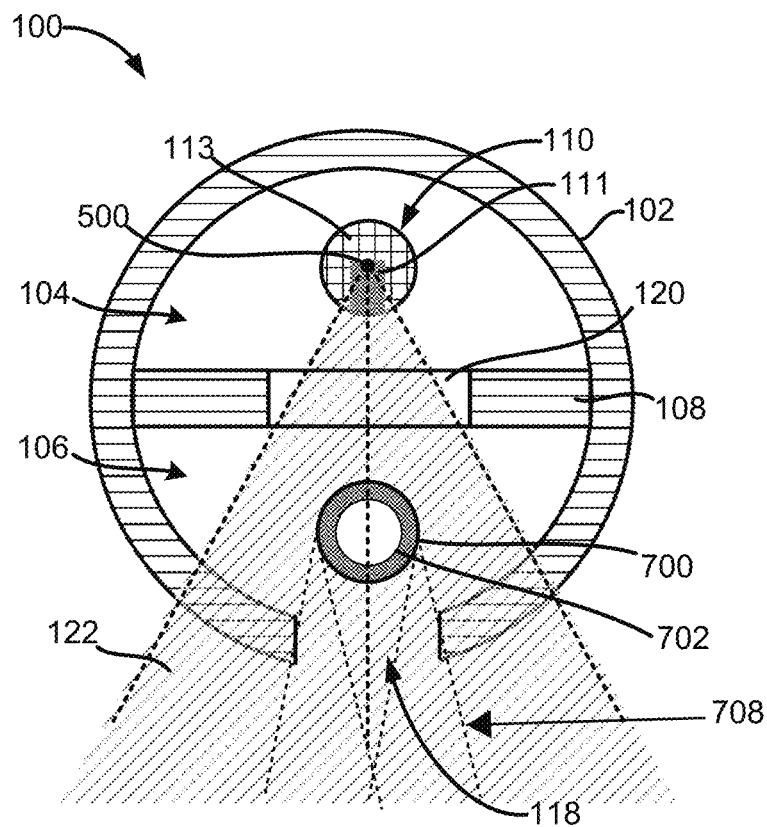
FIG. 7B illustrates an example rocking or rotating motion undertaken by an imaging component of the imaging apparatus or CTO re-entry device that provides a wide angle view to monitor the angular moving range of a guiding needle or a guidewire as it exit the outlet port.

In another embodiment of the imaging apparatus 100, depicted in FIGS. 7A and 7B, the imaging apparatus comprises an optional guiding needle 700, which may be used to facilitate re-entry of the guidewire back into the true lumen of the vascular lumen or other anatomical location. In this embodiment, imaging apparatus 100 may comprise a similar catheter body 102, first catheter lumen 104, and second catheter lumen 106 as with the embodiments generally described with regards to FIGS. 1A to 6E, except that the imaging apparatus further comprises a guiding needle 700 that is slidably located in the second catheter lumen 106. The guiding needle 700 may comprise a retracted configuration in which its distal tip 706 is at or proximal to the catheter outlet port 118, and an extended configuration in which its distal tip is extending from the catheter outlet port 118. The guiding needle 700 may comprise a metal such as stainless steel (SS304 or SS316) or nitinol or a combination thereof, and comprise a guidewire lumen 702 in which the guidewire 112 may slidably reside. The guidewire lumen 702 may have a diameter of 0.10" or more, or 0.014" or more, up to 0.035", ±0.02" or ±0.04". The guiding needle 700 may comprise a generally straight configuration but with an angled distal segment 704, which may facilitate exit of the needle tip 706 from the catheter outlet port 118. The angled distal segment 705 may comprise an angle in the range of about 1-90 degrees, 5-45 degrees, or 10-20 degrees form the longitudinal axis of the needle body. The needle tip 706 may be a beveled needle tip with a beveled face that may be oriented either in parallel or orthogonal to the longitudinal axis of the catheter body 102. An orthogonal bevel face may facilitate penetration of the needle tip 706 into the adjacent tissue, while a parallel bevel face may facilitate blunt dissection through the adjacent tissue. The needle tip 706 may also be a blunt end configuration. The guiding needle 702 may be configured with a mechanical stop to limit the distance that the guiding needle 700 may be extended from the catheter outlet port 118. The mechanical stop may be user-adjustable to set the extension limit for each procedure. Measurement indicia may be provided on the proximal end of the guiding needle 700 to indicate the extension distance from the catheter outlet port 118. In some variations, the guiding needle 700 may be pre-installed in the second catheter lumen 106 at the point of manufacture or point of use, but in other embodiments, the guiding needle 700 may be inserted into the second catheter lumen 106 after the procedure has been started and after the imaging apparatus 100 has been inserted. A stiff insertion guidewire may be inserted into the guiding needle 700, in order to straighten out the angled distal segment 704 during the loading or insertion into the imaging apparatus 100, in order to reduce the risk of damage to the second catheter lumen 106 from the angled distal segment 704. The angled distal segment 704 may comprise a longitudinal length in the range of about 3-15 mm, 5-10 mm, or 4-8 mm.

In some variations, because of the length of the imaging apparatus 100 and the corresponding length of the guiding needle 700, the guiding needle 700 may have a tendency to rotatably torque or whip to an angular orientation that is different than the desired orientation by the user. In some further variations the guiding needle 700 may be provided with a non-circular outer perimeter, e.g. an oval, square, rectangular, triangle, trapezoidal or other polygonal shape along its catheter body or a distal portion thereof, with a complementary interfit in the second catheter lumen 106 or catheter outlet port 118, to help maintain the guiding needle 700 within a predictable angular orientation range. Alternatively, in some variations, a groove or notch in the second catheter lumen 106 or catheter outlet port 118, in conjunction with the angled distal segment 706 may be sufficient to maintain the angular orientation of the guiding needle 700 within a desired range, while still having a circular cross-sectional shape. The acceptable range of angular orientation 708 of the guiding needle 700 has it exits the catheter outlet port 118 may configured such that the range of angular orientation 708 resides within the field of view 122 of the imaging component 110, as depicted in FIG. 7B.

In some further variations, the angled distal segment 704 and/or distal tip 706 of the guiding needle 700, and optionally a portion of the main needle body, may comprise a gold or other radiopaque coating. The gold coating may facilitate the visibility of the angled distal segment 704 and/or distal tip 706. In some embodiments, the gold coating may have a thickness in the range of 50-5000 nm, 50-1000 nm, or 50-100 nm, in order to provide visibility using an OCT imaging system, or in the range of 3-30 microns, 3-10 microns or 3-5 microns for visibility using fluoroscopy and OCT.

In some variations, the proximal end of the guiding needle 700 may be configured with a connector so that the guiding needle 700 may be flushed with saline or other biocompatible fluid. The fluid selected for flushing may have a refractive index in the range of 1.3 to 1.7, or 1.3 to 1.5 or 1.3 to 1.4.

During a procedure, the guiding needle 700 and the imaging component 110 may be separately advanced or retracted independently from each other. The guiding needle 700 or the imaging component 110 may be advanced by translating rotational motion to longitudinal motion via a gearing system. The gearing system can be designed such that the longitudinal displacement may differ for each full rotation. For example, the imaging component 110 may displace longitudinally between 3 mm and 10 mm for each full rotation, while the guiding needle may displace longitudinally between 1 mm and 5 mm for each full rotation. The rotational motion may be performed manually with a turn knob or with a motor. For a motor control approach, forward and backward switches or buttons may be used to actuate the motor. The guiding needle 700 and the imaging component 110 may have separate motorized actuators. In one embodiment, the longitudinal velocity for the guiding needle and the imaging component may be different. The imaging component 110 may run between 3 mm/sec and 10 mm/sec, while the guiding needle may run between 1 mm/sec to 5 mm/sec. In another embodiment, when the guiding needle is ready to be deployed outside the catheter as described in FIG. 8C, the guiding needle 700 and the imaging component 110 may be selectively locked prior to deployment. The locking function enables or commands the imaging component 110 and the guiding needle 700 to be advanced and retracted at a fixed movement ratio. The guiding needle 700 and the imaging component 110 may advance or retract at the same velocity. The imaging component 110 may monitor the direction of motion of the tip or body of the guiding needle 700. In other variations, to facilitate keeping the needle tip 706 in the field of view of the imaging component 110, a mechanical movement lock, such as a clamp, may be selectively or reversibly engaged at the proximal ends of the guiding needle 700 and the imaging component 110, so that movement of the guiding needle 700 will also move the imaging component 110, to simplify the alignment of the field of view and the needle. A mechanical movement lock, such as a clamp, may provide 1:1 correspondence between the movement of the two components, but in another example, a gear and tooth track system may be provided to provide a pre-determined mechanical variable ratio of movement between the two components. A variable ratio movement lock may further facilitate alignment of the two components when the needle tip 706 moves at an angle, such as when the longitudinal distance per unit of linear movement is reduced, while the imaging component 110 is only displaced longitudinally. For example, in some embodiments, the longitudinal range of the guiding needle 700 may be configured to be less than 30 mm, less than 20 mm, or less than 15 mm, while the corresponding movement range of the imaging component may be less than 50 mm, less than 40 mm, or less than 35 mm, respectively, while the movement of the guidewire 112 is free to move longitudinally without constraint by the imaging apparatus 100. In other embodiments, however, the guidewire 112 may also be reversibly or selectively locked with the guiding needle 700 and/or imaging component 110.

Figure 8A:
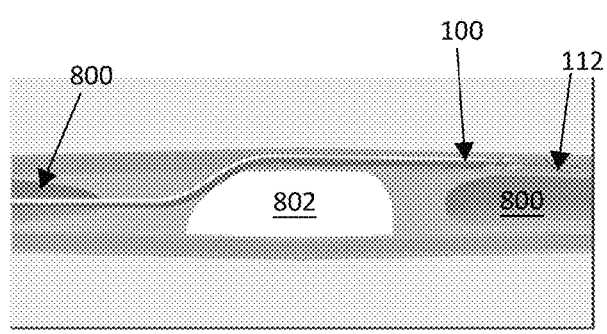
FIGS. 8A to 8F illustrates the use of the imaging apparatus or CTO re-entry device in FIGS. 7A and 7B, as an example of operation.
Figure 8B:
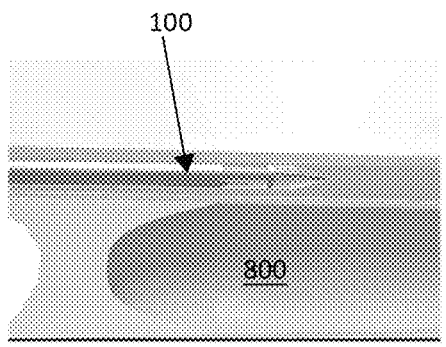
Figure 8C:
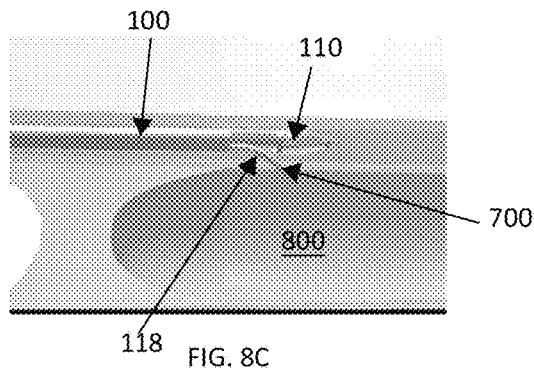
Figure 8D:
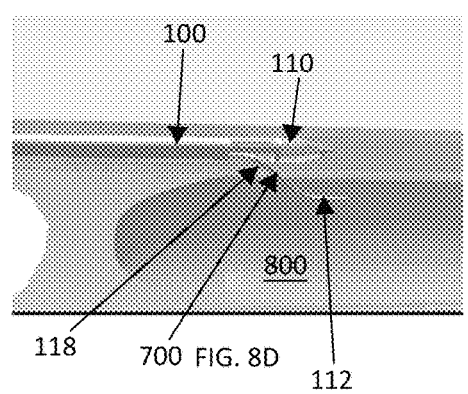
Figure 8E:
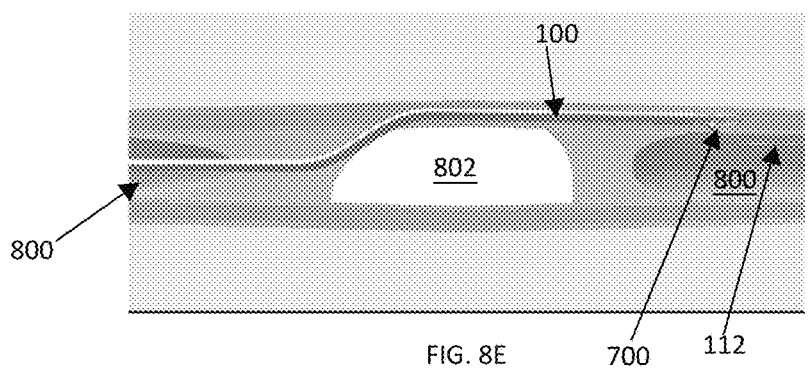
Figure 8F:
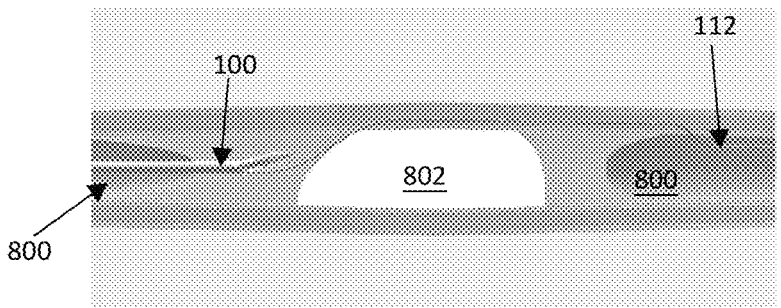

Referring now to FIGS. 8A to 8F, the use of an imaging apparatus 100 with guiding needle 700 is depicted. The patient is prepped and draped in the usual sterile fashion and sedation is achieved. Percutaneous access is achieved (e.g. femoral or radial artery) and an introducer is inserted and a guidewire is advanced toward the target site. As depicted in FIG. 8A, if the guidewire 112 exits the true lumen 800 as a result of plaque or other obstruction 802 and is in the subluminal space or vascular wall 804, the imaging apparatus 100 is advanced over the guidewire 112, while imaging the surrounding anatomy to identify when the true lumen 800 is identified distal to the obstruction 802. In FIG. 8B, the guidewire 112 is withdrawn and retracted back into the guiding needle 700, and in FIG. 8C, the guiding needle 700 is advanced along the second catheter lumen 106 and at an angle out of the catheter outlet port 118 in conjunction with movement of the imaging component 110 in the first catheter lumen until access to the true lumen 800 is re-achieved. As described earlier, the needle 700 and the imaging component 110 may be selectively locked to provide a fixed movement ratio as the needle 700 is advanced. In FIG. 8D, the same or different guidewire 112 is advanced through the lumen 702 of the guiding needle 700 until a desired length of the guidewire 112 is inserted. In FIG. 8E, the needle 700 is then withdrawn back into the imaging apparatus 100, with the imaging component 110 concomitantly also withdrawn to maintain the needle tip 706 in the field of view, to confirm sufficient guiding needle withdrawal. Once the needle 700 is withdrawn sufficiently, the movement lock may be disengaged. While holding the position of the guidewire 112 in place, the imaging apparatus 100 can be withdrawn and removed from the body, as illustrated in FIG. 8F. This portion of the procedure may be repeated as needed for any subsequent obstructions 800 encountered. The guidewire 112 can then continue to be advanced to the target location, and a therapeutic procedure, if any, may then be performed. Upon completion of the procedure, catheters and guidewire may be withdrawn, and hemostasis is achieved at the insertion site.

Figure 9E:
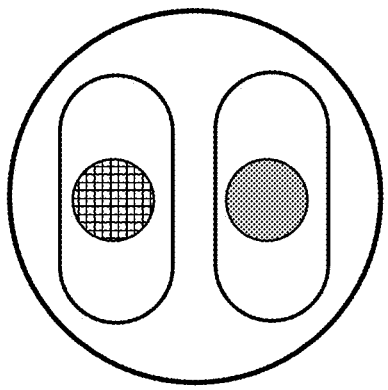
FIGS. 9C to 9N illustrate various lumen sizes, shapes and poses.
Figure 9H:
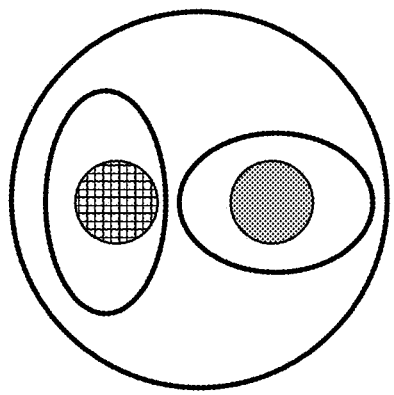
Figure 9D:
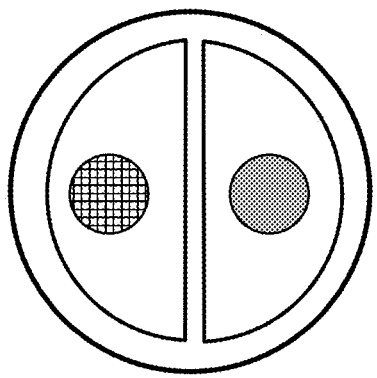
Figure 9G:
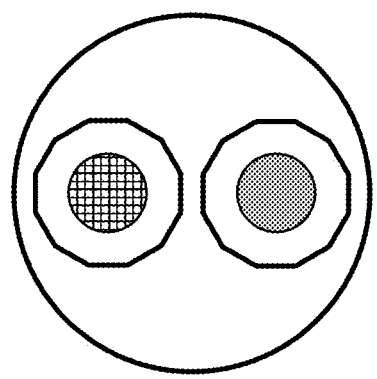
Figure 9C:
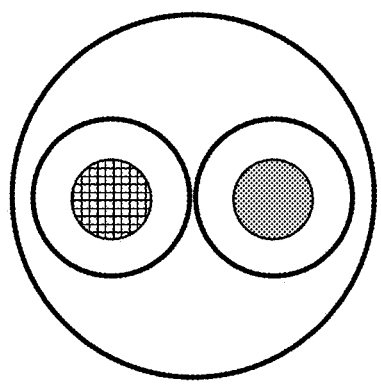
Figure 9F:
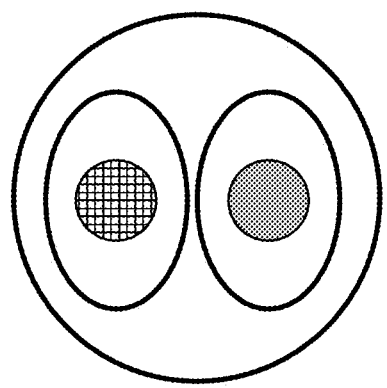
Figure 9J:
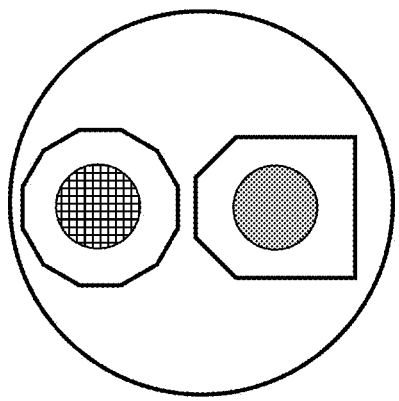
Figure 9K:
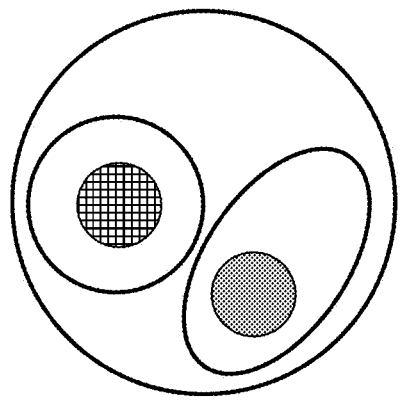
Figure 9I:
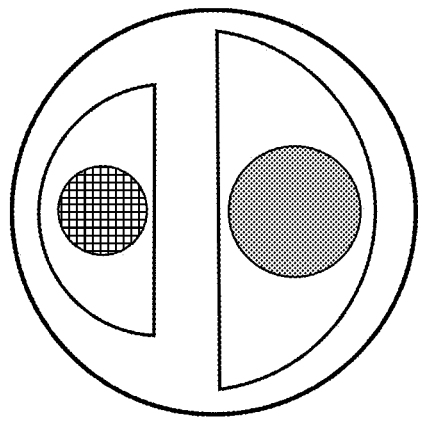
Figure 9M:
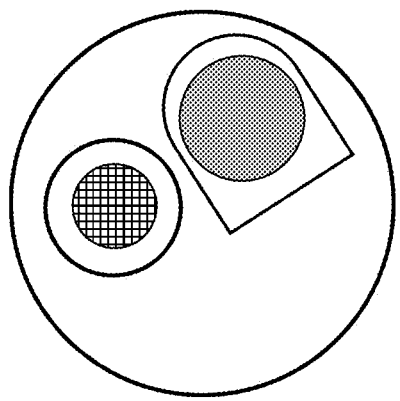
Figure 9L:
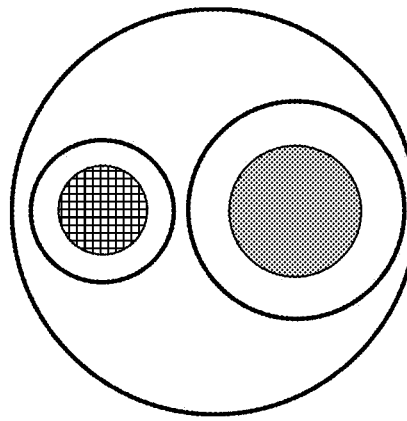
Figure 9N:
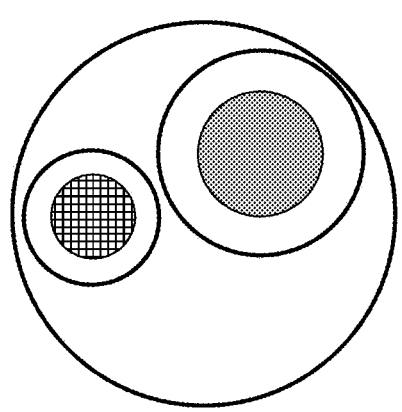

As described previously with regards to FIG. 7B, in some embodiments of the imaging apparatus 100, the first catheter lumen 104 and the second catheter lumen 106 will be symmetrically configured along the midline of the catheter body 102. This is also depicted in FIG. 9A, wherein the catheter body 900a comprises a first catheter lumen 902a for the imaging apparatus, and a second catheter lumen 904a for the guidewire or guiding needle. The catheter outlet port 906b between the second catheter lumen 904a and the exterior surface 908 and the catheter outlet port of the catheter body 900a may also be symmetrically configured on the midline. In other examples, as depicted in FIG. 9s, the catheter body 90b may comprise a second catheter lumen 904b that is offset from the midline and/or rotated in orientation with respect to the first catheter lumen 902b, such that the catheter outlet port 906b is also rotated and off the midline 908b between the center of the first catheter lumen 902b and the catheter body 900b. In contrast to the midline exit direction 910a for the guiding needle or guidewire configured for catheter body 900a in FIG. 9A, the exit direction 91eb for catheter body 90b is 90 degrees or orthogonal to the midline. In other embodiments, other exit angles may be configured in the range of 0-135 degrees, 0-90 degrees, 45-90 degrees, or 0-45 degrees, for example. FIGS. 9C to 9N depict various alternate configurations of the first and second lumens, including different sizes, shapes, orientations and positions:

| FIGURE | SHAPE(S) | SIZE(S) | ORIENTATION(S) |
|---|---|---|---|
| 9C | Circular (both) | Equal | Midline symmetric |
| 9D | D-shaped or semi-circular (both) | Equal | Midline symmetric |
| 9E | Oblong or track-shaped (both) | Equal | Midline symmetric |
| 9F | Oval (both) | Equal | Midline symmetric |
| 9G | Polygonal or dodecagonal (both) | Equal | Midline symmetric |
| 9H | Oval (both) | Equal | Midline symmetric positions but orthogonal or opposite orientations with $1^{st}$ lumen horizontal and $2^{nd}$ lumen vertical |
| 9I | Circular (both) | $1^{st}$ smaller; $2^{nd}$ larger | Midline symmetric |
| 9J | D-shaped or semi-circular (both) | $1^{st}$ smaller; $2^{nd}$ larger | Midline symmetric |
| 9K | $1^{st}$ polygonal or dodecagonal; $2^{nd}$ polygonal or asymmetric hexagonal | — | Midline symmetric |
| 9L | Circular (both) | $1^{st}$ smaller; $2^{nd}$ larger | Relative offset - $2^{nd}$ lumen off axis relative to $1^{st}$ lumen |
| 9M | $1^{st}$ circular; $2^{nd}$ tombstone | $1^{st}$ smaller; $2^{nd}$ larger | Relative offset - $2^{nd}$ lumen off axis and rotated clockwise 45 degrees relative to linear base |
| 9N | $1^{st}$ circular; $2^{nd}$ oval | $1^{st}$ smaller; $2^{nd}$ larger | Relative offset - $2^{nd}$ lumen off axis and rotated 45 degrees relative to vertical or horizontal axis |

As noted elsewhere but not depicted in FIGS. 9C to 9N, the guiding needle and/or an outer sheath of an imaging apparatus spinning inside the outer sheath may comprise a partially or completely complementary shape and size of the lumen in which it resides.

In some other exemplary imaging system embodiments, the nose cone of the imaging apparatus may be further configured to reduce the amount of catheter structure that may be in the field of view of the imaging component, with respect to viewing the guidewire and/or guiding needle as it exits the catheter outlet port of the second catheter lumen. In FIG. 10A, for example, imaging apparatus 1000, comprises a nose cone 1002 with a distal tapered end 1004 and wherein the first catheter lumen 1006 extends into. The first catheter lumen 1006 may terminate at the distal tapered end 1004 at a distal opening 1008. The nosecone 1002 may be tapered along its entire longitudinal length, or may comprise a distal tapered region 1004 and a proximal body 1010 with a constant cross-sectional shape and/or size. Proximal to the proximal body 1010 of the nosecone 1002 is the catheter outlet port 1012 of the second catheter lumen 1014. The catheter outlet port 1012 may also comprise a distal tapered outer surface 1016. In contrast to the catheter outlet port 118 of the imagine apparatus 100 in FIGS. 5A to 6E, the catheter outlet port 1012 has an opening 1018 that is more distal facing rather than side facing. The opening 1018 may be configured to with orientation that is orthogonal to the longitudinal axis of the imaging apparatus 1000 or second catheter lumen 1014, or at an angle to that longitudinal axis that is in the range about 45-135 degrees, 75 to 105 degrees, or 60-90 degrees, for example. This permits the guiding needle 1020 and/or guidewire 1022 to exit the imaging apparatus lateral to the proximal body 1012 of the nosecone 1002. Because of this, the imaging component 110 does not image the guiding needle 1020 and/or guidewire 1022 through the catheter outlet port 1014, but instead has a field of view 1024 with only the wall of the proximal body 1010 between the imaging apparatus 110 and the guiding needle 1020 and/or guidewire 1022, or an anatomical site such as the true lumen. This nosecone configuration may reduce the image distortion introduced by the additional nosecone structures or materials when compared to the embodiment in FIGS. 5A to 6E.

Figure 10B:
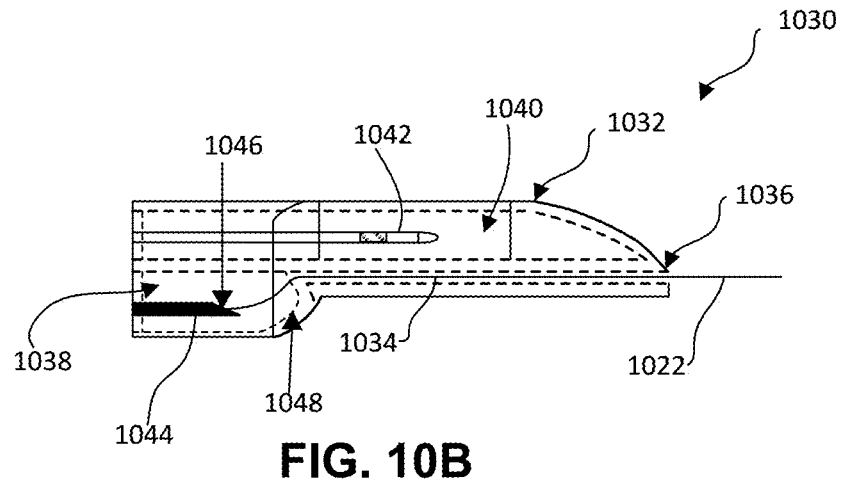
FIGS. 10B and 10C depict an alternate embodiment comprising an imaging apparatus or CTO re-entry device with an offset needle guide or guidewire lumen, with FIG. 10B depicting a guidewire inserted into a monorail lumen at the distal end of the catheter to guide the catheter to the target location before intervention.

In another variation, depicted in FIGS. 10A and 10B, the nosecone 1032 comprises an additional longitudinal or monorail lumen 1034 to permit the guidewire 1022 to exit the distalmost end 1036 of the nosecone 1032. This allows the guidewire 1022 to guide the imaging system or CTO re-entry device 1030 to the target location without interference from the imaging apparatus or suboptimal angle. As depicted in FIG. 10B, the monorail lumen 1034 may be in fluid communication with the second catheter lumen 1038 of the catheter body 1040. In the particular configuration, the monorail lumen 1034 is longitudinally aligned along a ventral perimeter region of the second catheter lumen 1038. The monorail lumen 1034 may be oriented to be parallel to at least a portion of the first catheter lumen 1040 which contains the imaging apparatus 1042.

Figure 10C:
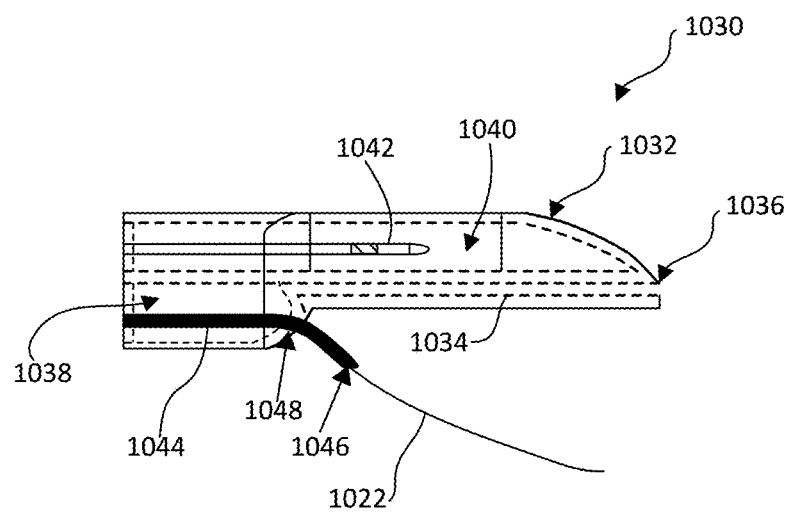

As illustrated in FIG. 10B, the guiding needle 1044 is withdrawn into the second catheter lumen 1038, and optionally rotated or oriented (e.g. the bend of the guiding needle or its bevel face 1046 angled ventrally or toward the imaging apparatus 1042), so that the guidewire 1022 can be inserted into the monorail lumen 1034 and extend out of the distalmost end 1036 of the nosecone 1032. Once a location is reached where deployment of the guiding needle 1044 is desired, the guidewire 1022 is withdrawn back into the guiding needle 1044, and then the guiding needle 1044 is redeployed through the catheter outlet port 1048. This is performed with the imaging apparatus 1042 keeping continuous view of the guiding needle 1040. Once the desired position of the guiding needle 1044 is achieved, e.g. the true lumen of the tubular vessel, the guidewire 1022 is re-advanced through the guiding needle 1044 and toward the desired position, as depicted in FIG. 10C.

Atherectomy System and Balloon-Based Devices

Figure 11:
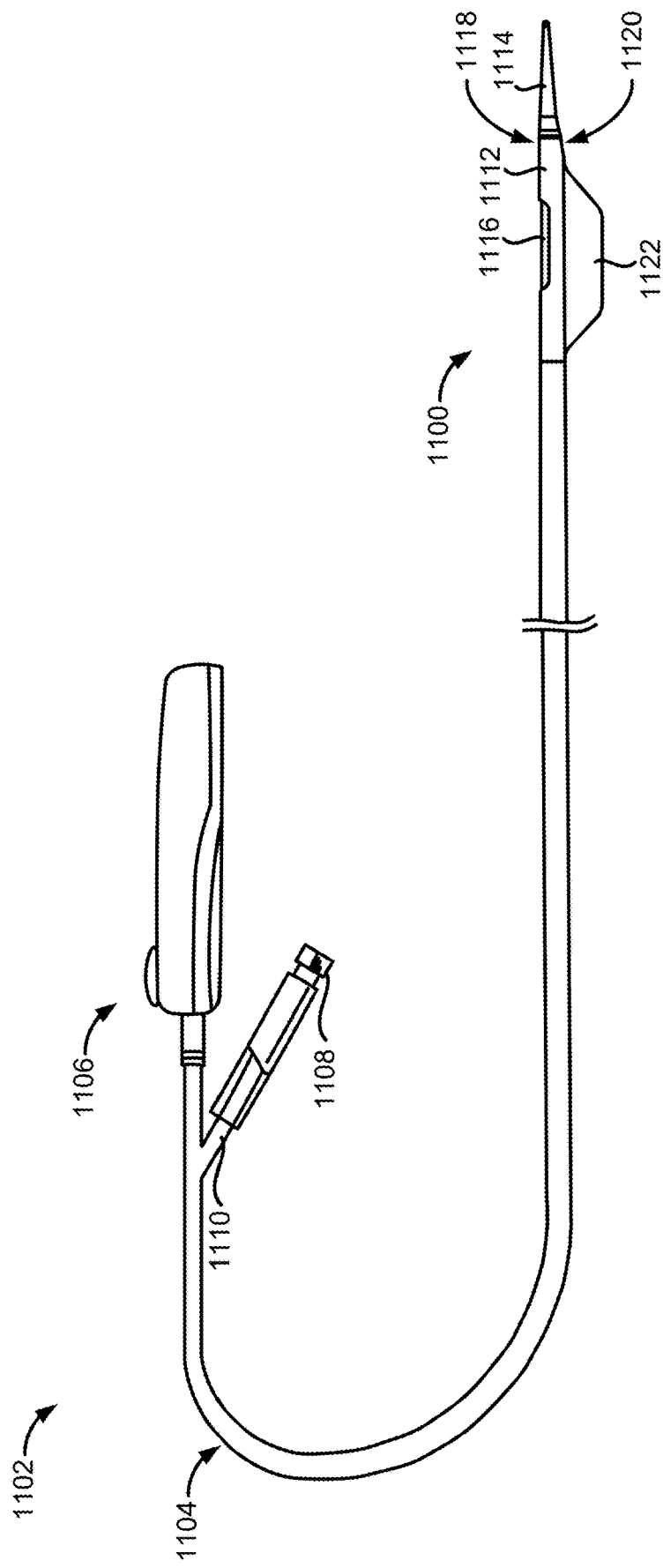
FIG. 11 illustrates an embodiment of an atherectomy system comprising the atherectomy device.

FIG. 11 illustrates an embodiment of an atherectomy system 1102 comprising an embodiment of the atherectomy device 1100 for removing atherosclerotic material within a blood vessel. The atherectomy system 1102 can comprise the atherectomy device 1100 coupled to a distal end of an atherectomy catheter 1104. The atherectomy catheter 1104 can be coupled to a handle 1106 comprising a motor and drive assembly within the handle 1106. The motor and drive assembly can provide torque to a rotatable cutter 1200 (see, for example, FIG. 12) of the atherectomy device 1100. The rotatable cutter 1200 can be coupled to the motor and drive assembly via a drive shaft (e.g., a flexible hollow shaft). The drive shaft can extend through the atherectomy catheter 1104 and can be supported by a brace or bushing to minimize shaft vibrations. The rotatable cutter 1200 will be discussed in more detail in the following sections.

The handle 1106 can also comprise a battery configured to power the motor and one or more sensors within the atherectomy device 1100 or handle 1106. In other embodiments, the handle 1106 can also comprise a torque knob or dial, and a drive control pusher element.

The atherectomy catheter 1104 can be a long flexible tube configured to allow a guidewire, drive shaft, control wires, sensor wires, sensor fibers, imaging fibers or wires, or lumens covering such components to pass through a catheter lumen. The atherectomy catheter 1104 can also be used to deliver or otherwise introduce fluids, pharmaceutical compositions, contrast media, or a combination thereof to the atherectomy device 1100, a target treatment site within the patient, or a combination thereof.

In some embodiments, such fluids, pharmaceutical compositions, and/or contrast media can be introduced through a fluid entry port 1108 of a Y-fitting or Y-connector 1110. In other embodiments, such fluids, pharmaceutical compositions, and/or contrast media can be introduced through other connections or ports along the atherectomy catheter 1104.

The atherectomy catheter 1104 can be made in part of a flexible biocompatible polymer such as nylon, silicone rubber, polyurethane, polyethylene terephthalate (PET), latex, thermoplastic elastomers, or a combination thereof.

FIG. 11 also illustrates that the atherectomy device 1100 can comprise a substantially tubular housing 1112 coupled to or extending from a distal end of the atherectomy catheter 1104. The atherectomy device 1100 can further comprise a collection chamber 114 coupled to a distal end of the tubular housing 1112. The collection chamber 1114 can be configured to collect the atherosclerotic material debulked by the rotatable cutter 1200. In some embodiments, the collection chamber 1114 can be a nosecone coupled to the distal end of the tubular housing 1112. The tubular housing 1112 can be made in part of a substantially rigid material. For example, the tubular housing 1112 can be made in part of a biocompatible metallic material, a polymeric material, or a combination thereof. In some embodiments, the tubular housing 1112, or parts therein, can be made of stainless steel, polycarbonate (PC), polyetherketone (PEEK), polyethersulfone (PES), polyethylene (PE), polypropylene (PP), polytetrafluoroethylene (PTFE), polyvinylchloride (PVC), polyvinylidene fluoride (PVDF), perfluoroalkoxy alkane (PFA), or a combination thereof. In some variations, materials that comprise an optically transparent polymer with a refractive index of less than 1.60 may be used. Such materials include polyethylene terephthalate (PET), a polyamide such as nylon, polydimethylsiloxane (PDMS), fluorinated ethylene propylene (FEP), ethylene tetrafluoroethylene (ETFE), and PFA. In some further embodiments, an optically transparent polymer with a refractive index of less than 1.45 may be used, including ETFE, PDMS, PTFE, FEP and PFA. In still other embodiments, an optically transparent polymer with a refractive index of less than 1.40, is used such as PTFE, FEP and PFA may be used.

The collection chamber 1114 can be configured to have a tapered or substantially conical shape to ensure that the collection chamber 1114 is able to translate or migrate through the patient's blood vessels without causing trauma. The collection chamber 1114 or nosecone can be made of a relatively softer or more deformable material than the tubular housing 1112 to allow the collection chamber 1114 or nosecone to bend or flex. In some embodiments, the collection chamber 1114 can be made in part of nylon, silicone rubber, polyurethane, polyethylene terephthalate (PET), latex, thermoplastic elastomers, or a combination thereof.

As depicted in FIG. 1, the tubular housing 1112 can also comprise a cutting window 116 defined along a portion of the tubular housing 1112. For example, the tubular housing 1112 can be oriented by a dorsal side 1118 and a ventral side 1120 opposite (e.g., circumferentially opposite) the dorsal side 1118. The cutting window 1116 can be defined along a portion of the dorsal side 1118 of the tubular housing 1112.

The atherectomy device 1100 can also comprise an inflatable balloon 1122 coupled in part to an exterior side of the tubular housing 1112. For example, when the cutting window 1116 is positioned along a portion of the dorsal side 1118 of the tubular housing 1112, the inflatable balloon 1122 can be coupled to a ventral side 1120 of the tubular housing 1112.

The balloon 1122 can be made in part from a polyamide (e.g., nylon or nylon elastomers), a polyamide block copolymer, polyethylene terephthalate, polyurethanes, polyolefins, polyolefin copolymers, or blends thereof.

As will be discussed in more detail in the following sections, when the atherectomy device 1100 is deployed within a blood vessel of a patient, inflating the balloon 1122 can push or bias the cutting window 1116 closer to or in contact with atherosclerotic material within the blood vessel. In this manner, the atherosclerotic material (e.g., calcified plaque) can extend, at least partially, into the cutting window 1116 and can be cut or otherwise debulked by the rotatable cutter. In addition, bending or flexing the collection chamber 1114 or nosecone can also assist in pushing or biasing the cutting window 1116 closer to or in contact with the atherosclerotic material.

Figure 12:
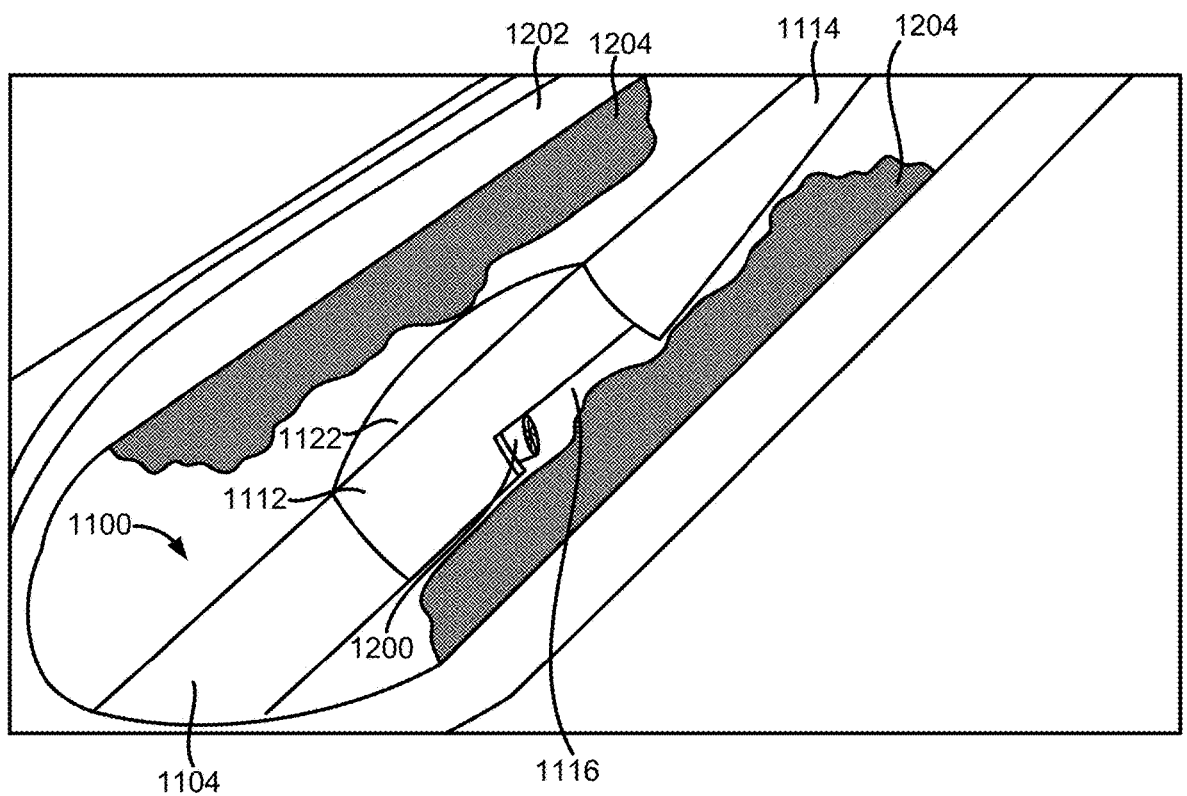
FIG. 12 illustrates a close-up view of a rotatable cutter of the atherectomy device in operation.

FIG. 12 illustrates a close-up view of a rotatable cutter 1200 of the atherectomy device 1100 in operation within a vessel lumen of a blood vessel 1202. As shown in FIG. 12, the blood vessel 1202 can be obstructed with atherosclerotic material 1204 deposited along the vessel walls. The balloon 1122 of the atherectomy device 1100 can be inflated such that the cutting window 1116 is pushed or biased closer to or in contact with the atherosclerotic material 1204. The rotatable cutter 1200 housed, at least partially, within the tubular housing 1112 can be configured to cut, masticate, or otherwise debulk the atherosclerotic material 1204 extending into the cutting window 1116.

The rotatable cutter 1200 can be coupled to a drive shaft extending through the catheter lumen and an interior of the tubular housing 1112. A motor (e.g., a turbine motor) within the handle 1106 can rotate the cutter 1200. The rotatable cutter 1200 can also be configured to translate longitudinally within the tubular housing 1112 in order to cut or masticate the atherosclerotic material 1204 extending into the cutting window 1116.

The rotatable cutter 1200 can comprise a plurality of rotating blades. For example, the rotatable cutter 1200 can comprise four, five, six, seven, eight, or nine or more rotating blades. The rotating blades can be made in part of a rigid radiopaque material. For example, the rotatable cutter 1200, including the rotating blades, can be made in part of a biocompatible metallic alloy. As a more specific example, the rotatable cutter 1200, including the rotating blades, can be made in part of tungsten, tantalum, gold, platinum, palladium, iridium, carbide, or a combination thereof. The rotatable cutter 1200, including the plurality of rotating blades, can also be coated or surface-treated with a biocompatible anti-microbial coating such as a chromium coating (e.g., ME-92®).

The rotating blades can have straight edges, beveled edges, or a combination thereof to prevent damage to the underlying artery walls. The rotatable cutter 1200 can rotate at a rate of between about 2,000 revolutions per minute (rpm) and about 10,000 rpm. For example, the rotatable cutter 1200 can rotate at a rate of about 8,000 rpm.

The rotatable cutter 1200 can have a diameter of between about 0.50 mm and 1.50 mm. In some embodiments, a portion of the rotatable cutter 1200 can extend beyond (e.g., between about 0.01 mm to about 0.50 mm beyond) the cutting window 1116 of the tubular housing 1112 to allow the rotatable cutter 1200 to cut atherosclerotic material 1204 in close proximity to the cutting window 1116.

In some embodiments, the tubular housing 1112 can have a housing length between about 2.5 mm to about 10.0 mm. In these and other embodiments, the cutting window 1116 can have a window length of between about 1.0 mm to about 6.0 mm.

As shown in the example embodiment depicted in FIG. 12, the rotatable cutter 1200 can translate longitudinally from a proximal end of the tubular housing 1112 to a distal end of the tubular housing 1112 toward the collection chamber 1114 coupled to the distal end of the tubular housing 1112. In this manner, the atherectomy device 1100 can be considered a forward-cutting directional atherectomy device. In other embodiments not shown in the figures but contemplated by this disclosure, the rotatable cutter 1200 can translate longitudinally from a distal end of the tubular housing to a proximal end of the tubular housing 1112. In these embodiments, the collection chamber 1114 or another collection chamber can be positioned proximal to the tubular housing 1112.

Figure 13A:
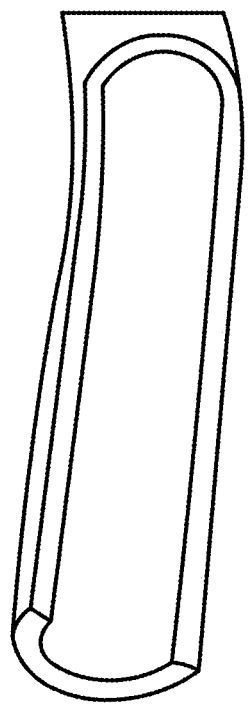
FIGS. 13A, 13B, and 13C illustrate, respectively, a normal blood vessel, a blood vessel occluded by concentric plaque, and a blood vessel occluded by eccentric plaque.
Figure 13B:
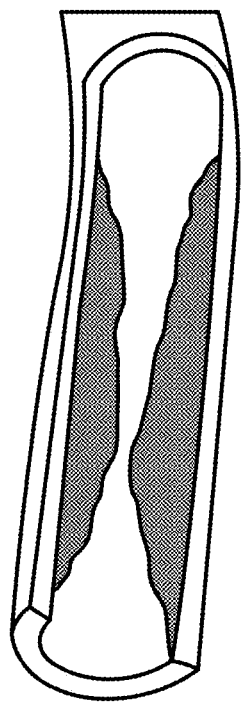
Figure 13C:
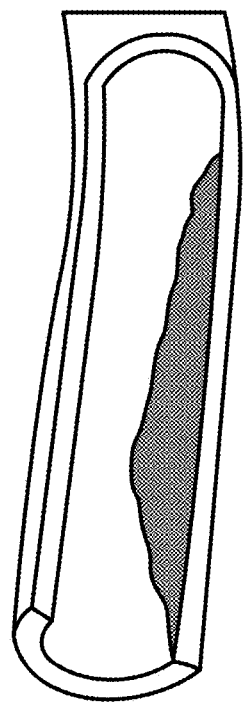

FIGS. 13A, 13B, and 13C illustrate, respectively, a normal blood vessel, a blood vessel occluded by concentric plaque, and a blood vessel occluded by eccentric plaque. The atherectomy device 1100 and methods disclosed herein can be effectively used to debulk arteries occluded by concentric plaque, eccentric plaque, or a combination thereof.

Moreover, the atherectomy device 1100 and methods disclosed herein can be used to debulk blood vessels having a vessel diameter between about 1.5 mm to about 7.0 mm. In addition, the atherectomy device 1100 and methods disclosed herein can be used to debulk atherosclerotic material deposited within peripheral arteries and coronary arteries. Furthermore, the atherectomy device 1100 and methods disclosed herein can be used to excise plaque associated with treatments for femoropopliteal disease or small-vessel infrapopliteal disease.

Figure 14A:
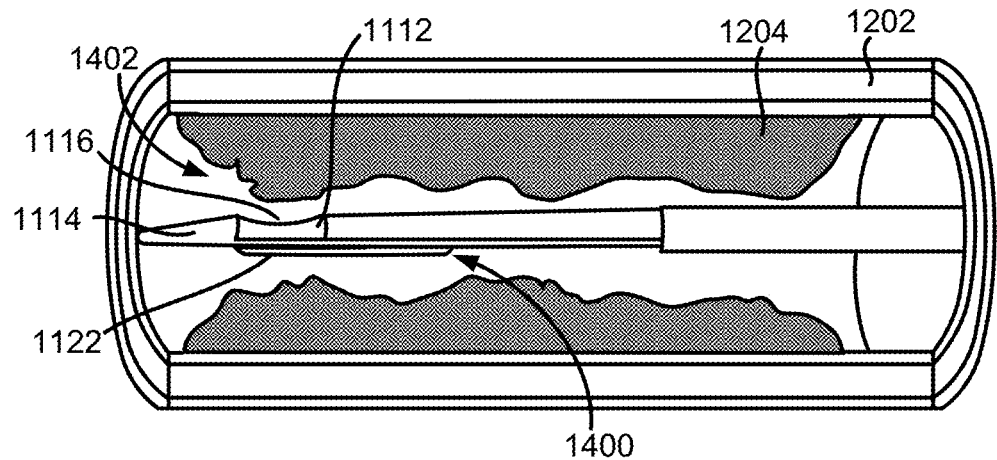
FIG. 14A illustrates an embodiment of the atherectomy device with a balloon of the device in an uninflated configuration.

FIG. 14A illustrates an embodiment of the atherectomy device 1100 with a balloon 1122 of the device in an uninflated configuration 1400. A method of using the atherectomy device 1100 can involve introducing the tubular housing 1112 of the atherectomy device 1100 into an occluded blood vessel 1202 in proximity to a target vessel site 1402. The tubular housing 1112 can comprise a housing lumen 1502 (see, for example, FIGS. 15A-15E and 16A-16B) in fluid communication with a catheter lumen of the atherectomy catheter 1104. The balloon 1122 can initially be in an uninflated configuration 1400 when the atherectomy device 1100 is delivered to the target vessel site 1402 via a delivery catheter/tube or introducer sleeve. Once the atherectomy device 100 is unsheathed or exposed and brought in proximity to the target vessel site 1402, the balloon 1122 can be inflated to temporarily occlude the blood vessel 1202 and push or bias the cutting window 1116 closer to the atherosclerotic material 1204.

Figure 14B:
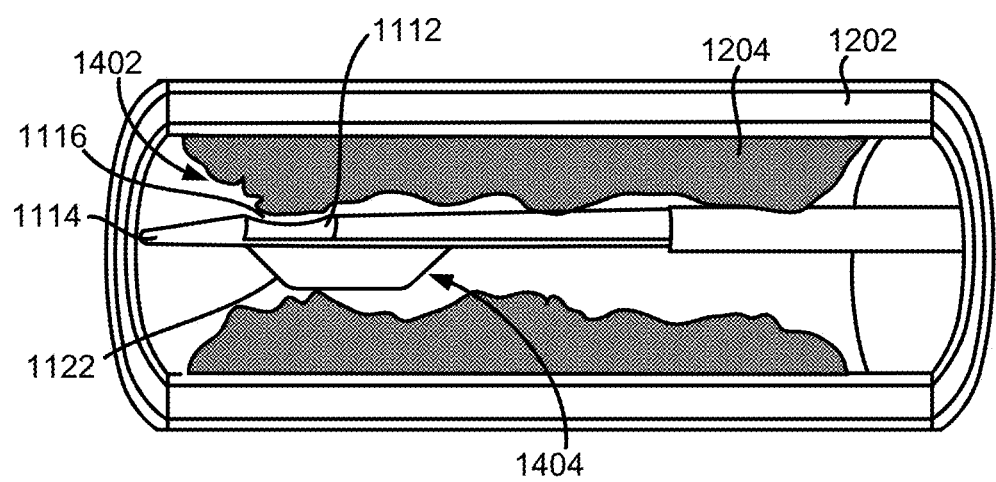
FIG. 14B illustrates an embodiment of the atherectomy device with the balloon of the device in an inflated occluding configuration.

FIG. 14B illustrates an embodiment of the atherectomy device 100 with the balloon 1122 of the device in an inflated occluding configuration 1404. The balloon 1122 can be inflated using a fluid 1506 (see, for example, FIGS. 15A-15E). As will be discussed in more detail in the following sections, the fluid 1506 can be introduced into a balloon lumen 1504 through a housing lumen 1502 of the tubular housing 1112 (see, for example, FIGS. 15A-15E and 16A-16B). In some embodiments, the balloon lumen 1504 can be in direct fluid communication with the housing lumen 1502. In other embodiments, the balloon lumen 1504 can be in fluid communication with the housing lumen 1502 via a valve 1524 (see, for example, FIGS. 15B-15E).

In certain embodiments, the balloon 1122 can be configured to inflate as soon as fluid 506 enters the housing lumen 1502. In other embodiments, the balloon 1122 can be configured to inflate once the fluid pressure within the housing lumen 1502 exceeds a predetermined threshold.

As shown in FIG. 14B, the balloon 1122 and the tubular housing 1112 can substantially restrict fluid flow through the blood vessel 1202 when the balloon 1122 is inflated. As will be discussed in more detail in the following sections, occluding the blood vessel 1202 is necessary to properly image the target vessel site 1402. Once the blood vessel 1202 is temporarily occluded, blood within the imaging field of view must be cleared by flushing away or otherwise displacing the blood with an optically transparent media or fluid. As will be discussed in more detail in the following sections, the same fluid 1506 used to inflate the balloon 1122 can be used to clear the field of view by flushing away or otherwise displacing blood near the target vessel site 1402. Imaging of the target vessel site 1402 (e.g., using OCT) can then be done after the optically transparent media or fluid 1506 flushes away or otherwise displaces the blood.

Once the rotatable cutter 1200 has debulked or masticated at least part of the atherosclerotic material 1204 at the target vessel site 1402, the balloon 1122 can be deflated and the atherectomy device 1100 can be delivered to another target vessel site 1402. When the atherectomy device 1100 is used to treat concentric plaque, deflating the balloon is also necessary to rotate the tubular housing 1112 along its longitudinal axis to position the cutting window 1116 in proximity to additional plaque deposited circumferential to the previously treated target vessel site 1402.

Figure 15A:
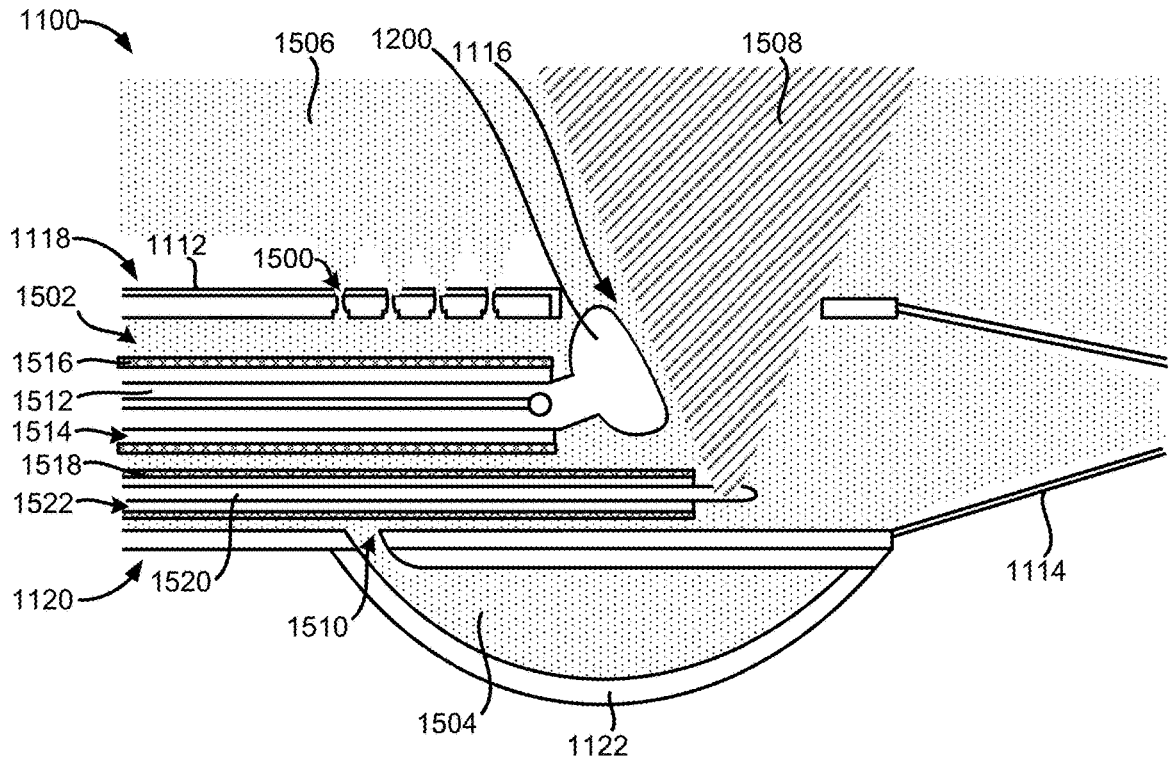
FIG. 15A illustrates a cross-sectional side view of an embodiment of the atherectomy device comprising housing port openings defined along a dorsal side of the atherectomy device.

FIG. 15A illustrates a cross-sectional side view of an embodiment of the atherectomy device 1100 comprising housing port openings 1500 defined along a dorsal side 1118 of the atherectomy device 1100. The housing port openings 5100 can be in fluid communication with a housing lumen 1502 of the tubular housing 1112. The housing lumen 1502 of the tubular housing 1112 can be in fluid communication with a catheter lumen of the atherectomy catheter 1104, a balloon lumen 1504 of the inflatable balloon 1122, and an interior space within the collection chamber 1114. A fluid 1506 introduced into the atherectomy catheter 1104 (such as, for example, through the fluid entry port 1108) can fill or at least partially fill the housing lumen 1502 and perfuse out of the tubular housing 1112 through the housing port openings 1500 into the target vessel site 1402 surrounding the atherectomy device 1100. Moreover, the fluid 1506 can exit the tubular housing 1112 through the cutting window 1116.

The fluid 1506 introduced into the atherectomy catheter 1104 and into the housing lumen 1502 can also inflate the balloon 1122. As will be discussed in more detail in the following sections, the fluid 1506 can also exit the balloon lumen 1504 through one or more balloon egress ports 1526 (see FIG. 15C, 15D, or 15E) or weep holes 1700 (see FIG. 17).

As previously discussed, inflating the balloon 1122 can be done to temporarily occlude the blood vessel 1202 of the patient. Once the blood vessel 1202 is temporarily occluded, blood within the imaging field or field of view 1508 must be cleared by flushing away or otherwise displacing the blood with the fluid 1506 (which is optically transparent).

In certain example embodiments shown in FIGS. 15A-15E and FIGS. 16A-16B, the imaging modality can be optical coherence tomography (OCT). OCT is an infrared light-based imaging modality that can be used to generate cross-sectional images of the blood vessel walls and/or deposited plaque with sufficient resolution and contrast to allow a clinician or surgeon to identify features associated with the plaque. For example, such features can include fibrous plaque, lipid-rich plaque, calcium deposits, macrophages, cholesterol crystals, red/white thrombus, or a combination thereof.

A major challenge faced when conducting intravascular OCT is the high light scattering property of blood which causes significant attenuation of the OCT imaging signal and inhibits clear imaging of the vessel walls. To overcome this challenge, blood within the imaging field of view 1508 must first be cleared with an optically transparent fluid or media.

As shown in FIGS. 15A-15E, the same fluid 1506 used to clear the field of view 1508 can also be used to inflate the balloon 1122. For example, as depicted in FIG. 15A, the balloon lumen 1504 can be in fluid communication with the housing lumen 1502 via a balloon ingress port 1510 or opening. The balloon ingress port 1510 can be sized or configured to allow fluid 1506 to enter the balloon lumen 1504 at a controlled fluid flow rate. For example, the balloon ingress port 1510 opening can be sized or configured to allow the fluid 1506 to bleed into the balloon lumen 1504. As a more specific example, the balloon ingress port 1510 can have a port diameter of between about 100 µm to about 2.0 mm.

As will be discussed in more detail in the following sections, the balloon ingress port 1510 can have a valve 1524 (see, for example, FIGS. 15B-15E) disposed or otherwise positioned in between the balloon lumen 1504 and the housing lumen 1502. In other embodiments, the portion of the balloon 1122 or the tubular housing 1112 surrounding the balloon ingress port 1510 can be reinforced, be made of a shape-memory material, or be made of a deformable or resilient material such that the balloon ingress port 1510 only opens when the fluid pressure is above a threshold pressure amount. In further embodiments, the balloon ingress port 1510 can automatically close and prevent additional fluid 1506 from entering the balloon lumen 1504 once the inflation pressure within the balloon 1122 reaches a predetermined threshold pressure.

Figure 15B:
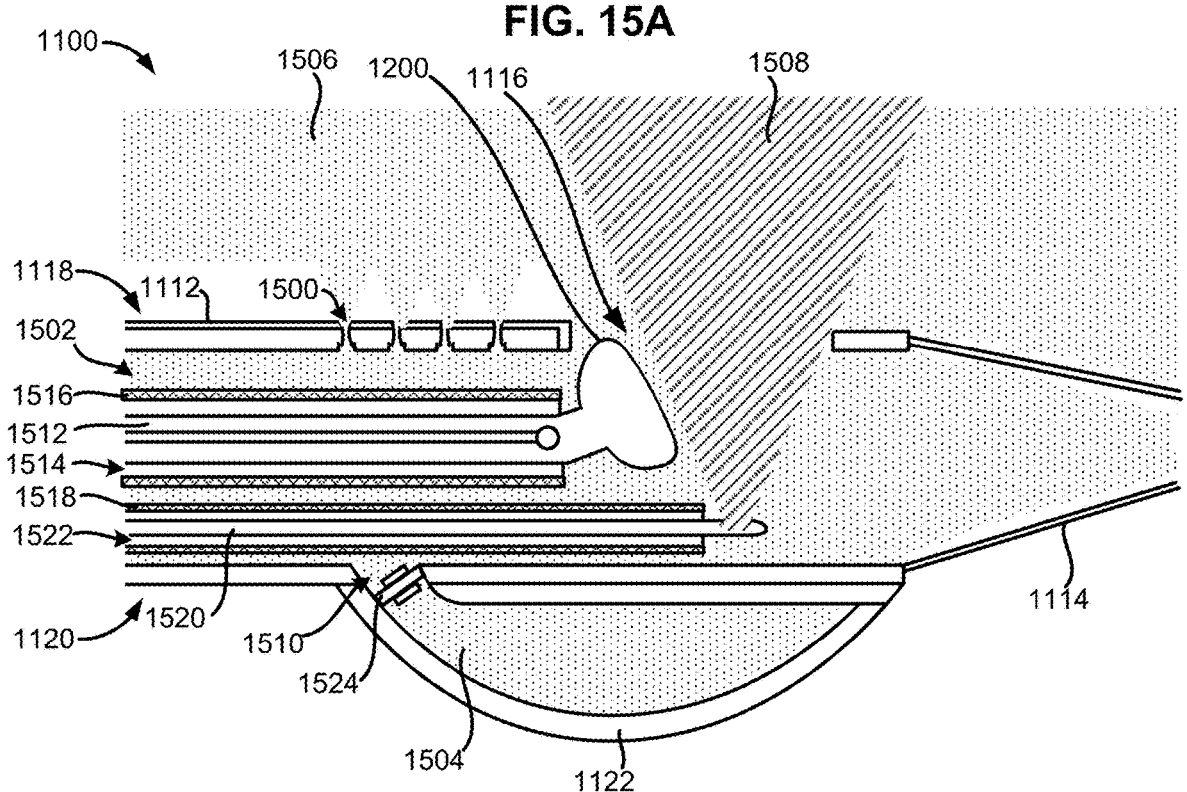
FIG. 15B illustrates a cross-sectional side view of an embodiment of the atherectomy device comprising a valve controlling fluid flow into the balloon of the atherectomy device.

As previously discussed, the tubular housing 1112 can comprise a dorsal side 1118 and a ventral side 1120 opposite the dorsal side 1118. In the embodiments shown in FIGS. 15A and 15B, the plurality of port openings 1500 can be defined along the dorsal side 1118 of the tubular housing 1112. In other embodiments contemplated by this disclosure, the plurality of port openings 1500 can be defined along the ventral side 1120, one or more lateral sides of the tubular housing 1112 in between the dorsal side 1118 and the ventral side 1120, or a combination thereof. As shown in FIGS. 15A, 15B, and 15E, the plurality of port openings 1500 can allow the fluid 1506 to more evenly distribute into the blood vessel 1202 to flush out or otherwise displace the blood within the imaging field of view 1508. The plurality of port openings 1500 can also help to regulate pressure within the tubular housing 1112.

The tubular housing 1112 can also comprise the rotatable cutter 1200 configured to debulk the atherosclerotic material 1204 extending into or in a vicinity of the cutting window 1116. The rotatable cutter 1200 can be coupled to a drive shaft 1512 connected to a motor and drive assembly within the handle 1106 (see FIG. 11). The drive shaft 1512 and at least part of the rotatable cutter 1200 can be housed within a cutting assembly catheter lumen 1514 of a cutting assembly catheter 1516. The cutting assembly catheter 1516 can prevent the rotating drive shaft 1512 from becoming entangled with other components within the tubular housing 1112. The cutting assembly catheter lumen 1514 can be a separate lumen from the housing lumen 1502 such that the fluid 1506 introduced into the housing lumen 1502 does not fill or does not substantially fill the cutting assembly catheter lumen 1514.

FIGS. 15A-15E also illustrate that the tubular housing 1112 can comprise an imaging catheter 1518 and a fiber optic wire 1520 extending through an imaging catheter lumen 1522. The imaging catheter 1518 can be configured to protect the fiber optic wire 1520 from other components within the tubular housing 1112 and to allow the fiber optic wire 1520 to rotate with respect to a longitudinal axis of the fiber optic wire 1520. In addition, the imaging catheter lumen 1522 can be a separate lumen from the housing lumen 1502 such that the fluid 1506 does not fill or does not substantially fill the imaging catheter lumen 1522 when the fluid 1506 is introduced into the housing lumen 1502. Imaging of the target vessel site 1402 or the atherosclerotic material 1204 can be done after flushing the target vessel site 1402 with the optically transparent fluid 1506. In addition, imaging of the target vessel site 1402 or the atherosclerotic material 1204 can be done simultaneously or contemporaneously with the flushing. Moreover, inflation of the balloon 1122 with the fluid 1506 can be done before imaging the target vessel site 1402 or simultaneously or contemporaneously with the imaging.

In some embodiments, the fluid 1506 can be a saline solution. For example, the fluid 506 can be 0.90% sodium chloride (NaCl) solution. Alternatively, the fluid 1506 can be a 0.45% NaCl solution or a solution comprising between about 0.45% to about 0.90% NaCl.

In other embodiments, the fluid 1506 can be a heparinized saline solution or a saline solution comprising the anticoagulant Heparin. The heparinized saline solution can be used to prevent clotting or prevent occlusions from being formed at the target vessel site 1402 or within the blood vessel 1202.

In further embodiments, the fluid 1506 can be or comprise a Ringer's lactate solution (also known as RL or LR solution). The Ringer's lactate solution can comprise a mixture of sodium chloride, sodium lactate, potassium chloride, and calcium chloride in water. In additional embodiments, the fluid 1506 can comprise a radiographic contrast agent or dye. For example, the fluid 1506 can be or comprise 30% or 60% Iodixanol in a Ringer's lactate solution or another type of saline solution (for example, a 0.90% NaCl solution). Furthermore, the fluid 1506 can be or comprise 30% Iohexol in a Ringer's lactate solution or another type of saline solution (for example, a 0.90% NaCl solution). In other embodiments, the fluid 1506 can be or comprise 5% Dextran in Ringer's lactate solution or another type of saline solution (for example, a 0.90% NaCl solution).

FIG. 15B illustrates a cross-sectional side view of another embodiment of the atherectomy device 1100 comprising a valve 1524 configured to control fluid flow into the balloon 1122 of the atherectomy device 1100. The valve 1524 can be positioned at the balloon ingress port 1510. The valve 1524 can be coupled to a surface of at least one of the balloon 1122 and the tubular housing 1112.

In some embodiments, the valve 1524 can be a unidirectional valve configured to only allow the fluid 1506 to flow into the balloon lumen 1504. For example, the valve 1524 can be a unidirectional check valve, a unidirectional disk valve, a unidirectional micro-pump, a unidirectional umbrella check valve, a unidirectional ball and cage valve, a unidirectional tilting disk valve, a unidirectional bi-leaflet valve, or a unidirectional tri-leaflet valve.

In other embodiments, the valve 1524 can be a bidirectional valve configured to allow the fluid 1506 to flow into and out of the balloon lumen 1504. For example, the valve 1524 can be a bidirectional check valve, a bidirectional micro-pump, or a bidirectional butterfly valve. In further embodiments, the valve 1524 can be a pressure sensitive rupture disk that can rupture when the fluid pressure applied to the valve 1524 exceeds a threshold pressure. The valve 1524 can be configured to optimize the rate of fluid flow into or out of the balloon lumen 1504 to control the inflation and/or deflation of the balloon 1122. For example, the valve 1524 can allow fluid 1506 to flow into the balloon lumen 1504 to inflate the balloon 1122 until the fluid pressure within the balloon lumen 1504 reaches a threshold pressure level. At that point, the valve 1524 can be configured to let the fluid 506 out of the balloon lumen 1504 and back into the housing lumen 1502.

Figure 15C:
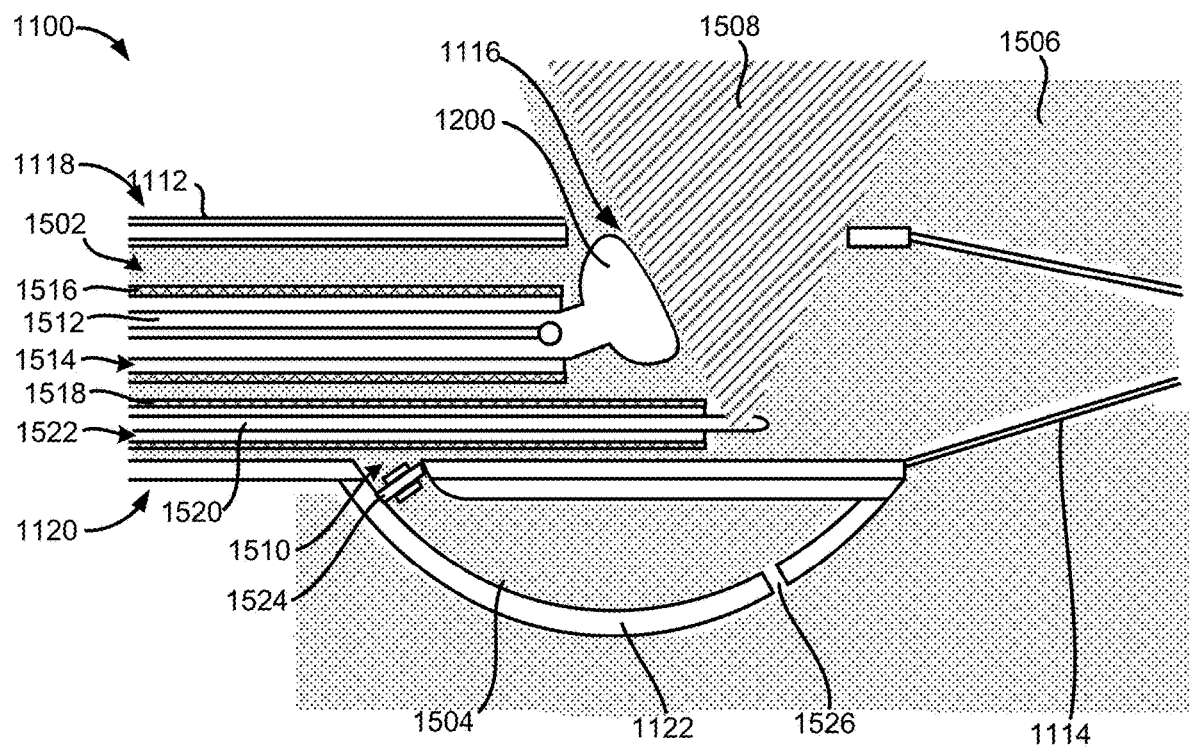
FIG. 15C illustrates a cross-sectional side view of an embodiment of the atherectomy device comprising an inflatable balloon having an opening defined along a surface of the balloon.
Figure 15D:
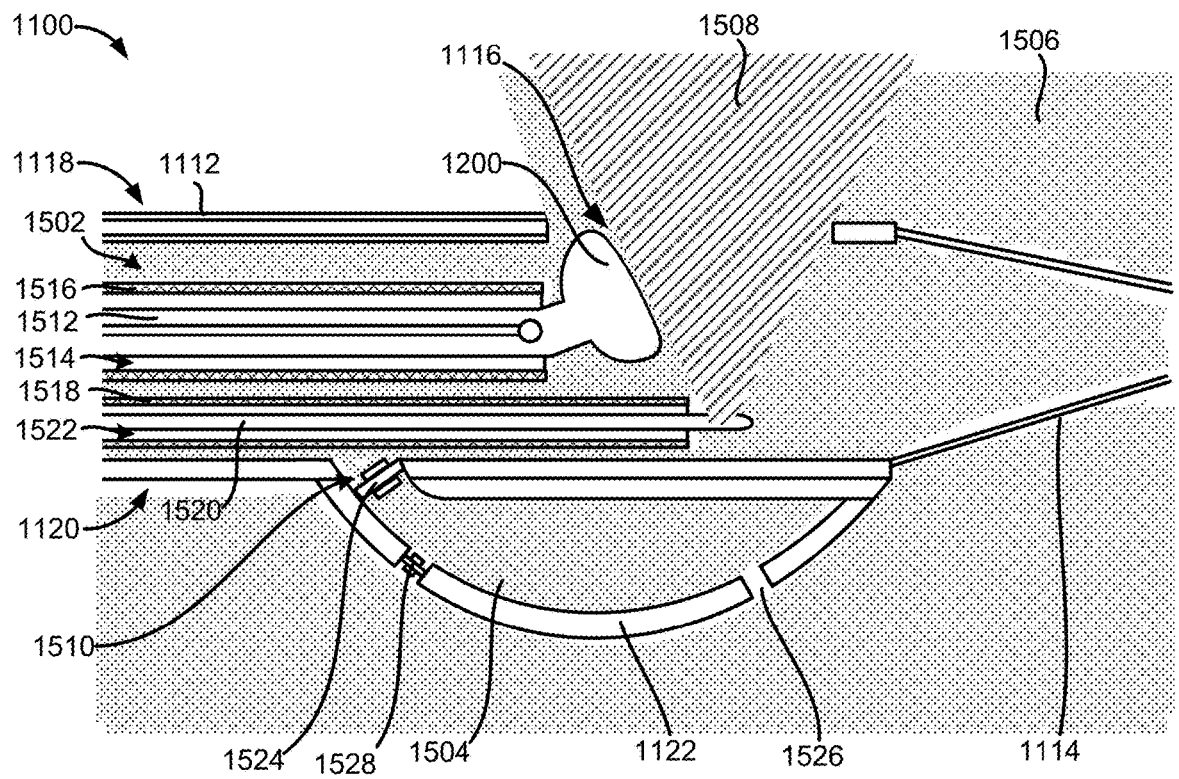
FIG. 15D illustrates a cross-sectional side view of an embodiment of the atherectomy device comprising an inflatable balloon having multiple openings defined along a surface of the balloon.
Figure 15E:
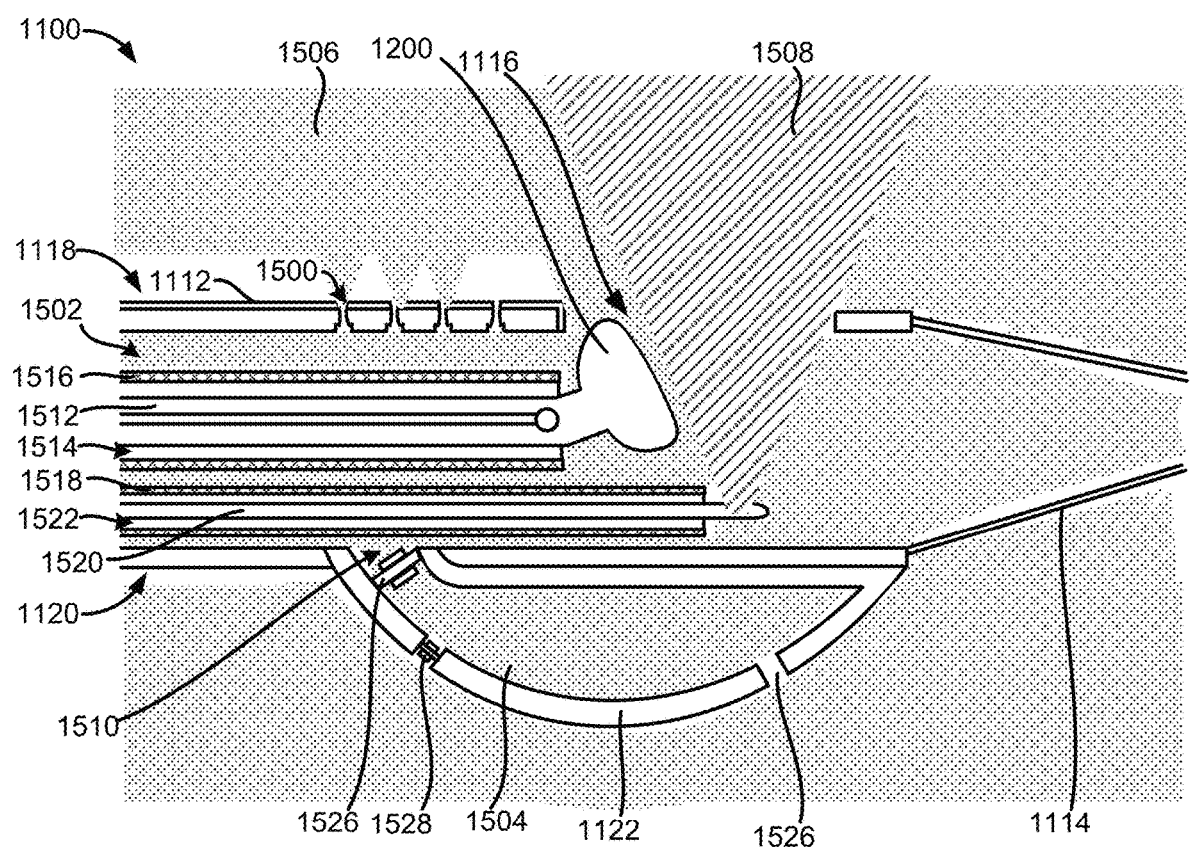
FIG. 15E illustrates a cross-sectional side view of an embodiment of the atherectomy device comprising housing port openings defined along a dorsal side of the atherectomy device and multiple openings defined along a surface of the balloon.

FIGS. 15C-15D illustrate cross-sectional side views of additional embodiments of the atherectomy device 1100 comprising an inflatable balloon 1122 having one or more openings or balloon egress ports 1526 defined along a surface of the balloon 1122. As shown in FIGS. 15C and 15D, the balloon 1122 can have one balloon egress port 1526 defined along the surface of the balloon 1122 or two or more balloon egress ports 1526 defined along the surface of the balloon 1122. When the balloon 1122 has one balloon egress port 1526, the port 1526 can be positioned at a distal end of the balloon 1122, a proximal end of the balloon 1122, or along a surface segment in between the distal end and the proximal end (e.g., along a ventral side or underside of the balloon 1122). When the balloon 1122 has multiple balloon egress ports 1526, the ports 1526 can be spaced longitudinally or laterally from one another. In other embodiments, the multiple balloon egress ports 1526 can be spaced longitudinally apart (e.g., one port 1526 in the front and one port 1526 in the back of the balloon 1122), laterally apart (e.g., one port 1526 on one lateral side and the other port 1526 on the other lateral side of the balloon 1122), or a combination thereof. As a more specific example, each of the balloon egress ports 526 can have a port diameter of between about 100 μm to about 2.0 mm.

As shown in FIG. 15D, at least one of the balloon egress ports 1526 can have a valve 1528 positioned at the balloon egress port 1526 to control fluid flow out of the balloon lumen 1504. For example, the valve 1528 can be a unidirectional valve such as a unidirectional check valve or a unidirectional disk valve. The valve 1528 can allow the fluid 1506 to exit or leak out of the balloon 1122 when the fluid pressure within the balloon 1122 exceeds a predetermined threshold amount (e.g., 4 ATM, 5 ATM, etc.). The valve 1528 and balloon egress port 1526 can prevent inadvertent rupture of the balloon 1122 or prevent an overly-inflated balloon 1122 from harming the blood vessel walls. In addition, the balloon egress port(s) 1526 can be configured to deliver fluid 1506 into a vessel lumen of the patient in order to temporarily flush or displace blood out of the blood vessel so the fiber optic wire 1520 within the atherectomy device 1100 can more effectively image the blood vessel or the atherosclerotic material 1204 deposited within the blood vessel.

FIG. 15E illustrates a cross-sectional side view of another embodiment of the atherectomy device 1100 comprising housing port openings 1500 defined along the dorsal side 1118 of the tubular housing 1112 and multiple openings or balloon egress ports 1526 defined along a surface of the balloon 1122. As shown in FIG. 15E, the atherectomy device 1100 can also comprise a valve 1524 positioned at the balloon ingress port 1510 and a valve 1528 positioned at one of the balloon egress ports 1526. Although FIGS. 15D and 15E show valves 1528 positioned at balloon egress ports 1526, it is contemplated by this disclosure that the balloon egress port(s) 1526 can also be left open or be sized to only allow fluid 1506 introduced into the balloon lumen 1504 to slowly leak or seep out of the balloon 1122.

Figure 16A:
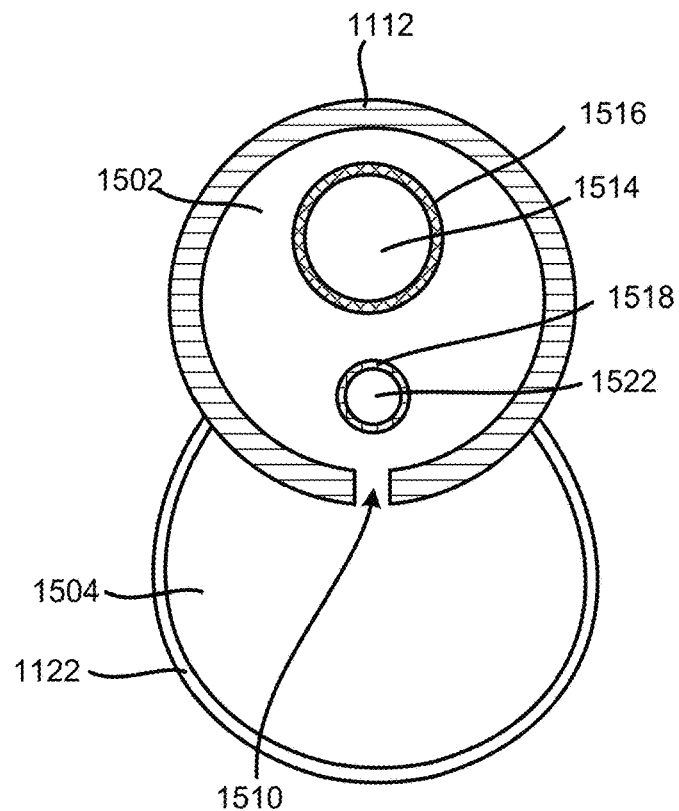
FIG. 16A illustrates a longitudinally transverse cross-sectional view of an embodiment of the atherectomy device comprising a cutting assembly catheter lumen and an imaging catheter lumen.

FIG. 16A illustrates a longitudinally transverse cross-sectional view of an embodiment of the atherectomy device 1100 comprising a housing lumen 1502 having a cutting assembly catheter lumen 1514 and an imaging catheter lumen 1522 extending through the housing lumen 1502. The imaging catheter lumen 1522 can protect the fiber optic wire 1520 from the other components within the housing lumen 1502 and prevent the fiber optic wire 1520 from becoming entangled with other wires (e.g., guidewires) or tubes extending through the housing lumen 1502. Moreover, the cutting assembly catheter lumen 1514 can protect the drive shaft 1512 from the other components within the housing lumen 1502 and prevent the drive shaft 1512 from being entangled with wires (e.g., guidewires) or tubes extending through the housing lumen. As shown in FIG. 16A, the balloon lumen 1504 can be in fluid communication with the housing lumen 1502 such that fluid 1506 entering the housing lumen 1502 also enters the balloon lumen 1504 to inflate the balloon 1122.

Figure 16B:
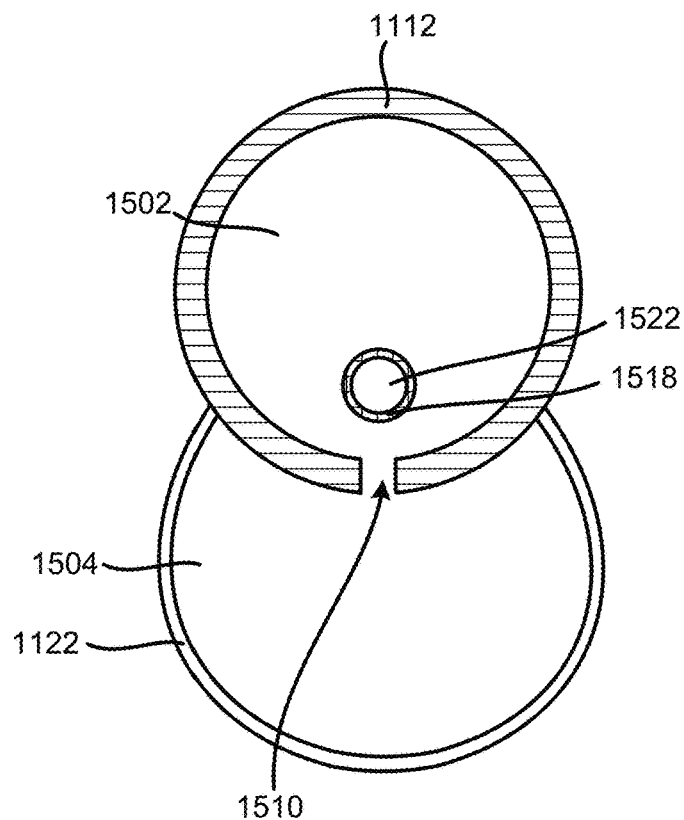
FIG. 16B illustrates a longitudinally transverse cross-sectional view of an embodiment of the atherectomy device comprising only an imaging catheter lumen.

FIG. 16B illustrates a longitudinally transverse cross-sectional view of another embodiment of the atherectomy device 1100 comprising a housing lumen 1502 having only an imaging catheter lumen 1522 extending through the housing lumen 1502. The imaging catheter lumen 1522 can protect the fiber optic wire 1520 from the other components within the housing lumen 1502 and prevent the fiber optic wire 1520 from becoming entangled with other wires (e.g., guidewires) or tubes extending through the housing lumen 1502. In this embodiment, the drive shaft 1512 coupled to the rotatable cutter 1200 can be housed within the housing lumen 1502.

Figure 17:
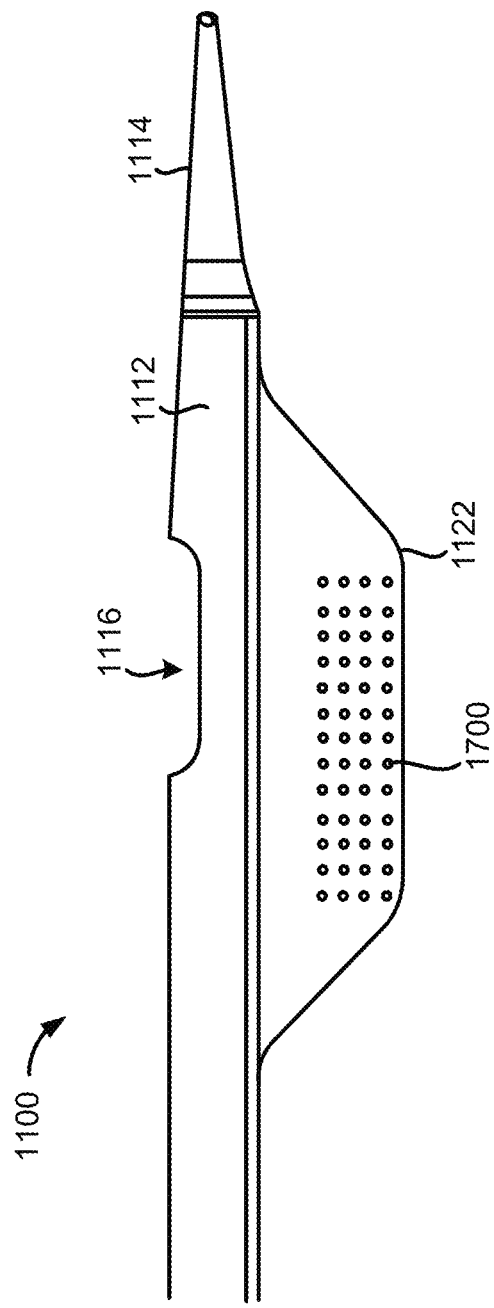
FIG. 17 illustrates the atherectomy device comprising another embodiment of the inflatable balloon having micro-sized weep holes.

FIG. 17 illustrates the atherectomy device 1100 comprising another embodiment of the inflatable balloon 1122 having micro-sized weep holes 1700. The weep holes 1700 can allow the fluid 1506 to seep out of the balloon lumen 1504 once the balloon 1122 has been inflated to a predetermined size or the internal inflation fluid pressure is above a certain threshold. For example, the weep holes 1700 can allow fluid 1506 to seep out of the balloon lumen 1504 once the internal inflation fluid pressure has reached 4 ATM. In other embodiments, the weep holes 1700 can allow fluid 1506 to seep out of the balloon lumen 1504 once the internal inflation fluid pressure has reached 5 ATM or 6 ATM.

The plurality of weep holes 1700 can cover a portion of the balloon 1122 such as an underside or ventral side of the balloon 1122. In other embodiments, the plurality of weep holes 1700 can cover either or both lateral sides of the balloon 1122. In some embodiments, the balloon 1122 can have between about 25 to 50 weep holes 1700. In other embodiments, the balloon 1122 can have between about 50 weep holes 1700 to about 100 weep holes 1700 or more. The weep holes 1700 can be formed by mechanical piercing, laser cutting, or a combination thereof.

Each of the weep holes 1700 can have a hole diameter. The hole diameter can be between about 1.0 micrometers (μm) to about 10.0 μm (e.g., about 5.0 μm). In other embodiments, the hole diameter can be between about 10.0 μm to about 100.0 μm.

The weep holes 1700 can allow more even distribution or release of the fluid 1506 into the target vessel site 1402. The weep holes 1700 can also ensure the balloon 1122 does not burst or puncture inadvertently. Moreover, the weep holes 1700 can be a way to control inflation or deflation of the balloon 1122.

In some embodiments, the balloon 1122 can have weep holes 1700 of different sizes positioned or arranged along different portions of the balloon 1122. In other embodiments, the balloon 1122 can comprise multiple layers with each layer having its own set of weep holes 1700.

FIGS. 18A-18D illustrate various embodiments of the inflatable balloon 1122 of the atherectomy device 1100. For example, FIG. 8A illustrates that the inflatable balloon 1122 can comprise tapered or conical/frustoconical ends on both ends (proximal and distal ends) of the inflatable balloon 1122. The portion of the balloon 1122 in between the tapered or conical/frustoconical ends can have a substantially consistent transverse cross-section (e.g., shaped substantially as a half-cylinder or substantially cuboid when inflated).

Figure 18A:
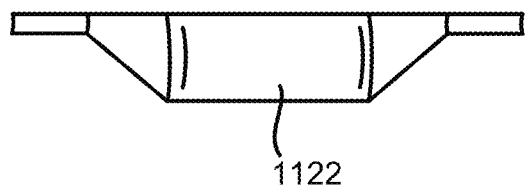
FIGS. 18A-18D illustrate various embodiments of the inflatable balloon of the atherectomy device.
Figure 18B:
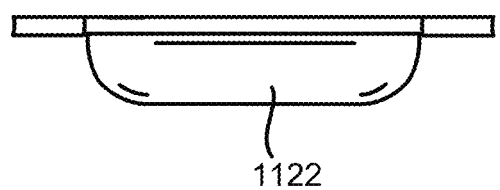

FIG. 18B illustrates that the inflatable balloon 1122 can comprise rounded or bulbous ends on both ends of the inflatable balloon 1122. The portion of the balloon 1122 in between the rounded or bulbous ends can have a substantially consistent transverse cross-section (e.g., shaped substantially as a half-cylinder or substantially cuboid when inflated).

Figure 18C:

FIG. 18C illustrates that the inflatable balloon 1122 can comprise a tapered or conical/frustoconical end on one end (e.g., the proximal or distal end) of the inflatable balloon 1122 and a rounded or bulbous end on the other end of the balloon 1122. The portion of the balloon 1122 in between the tapered or conical/frustoconical end and the rounded or bulbous end can have a substantially consistent transverse cross-section (e.g., shaped substantially as a half-cylinder or substantially cuboid when inflated).

Figure 18D:
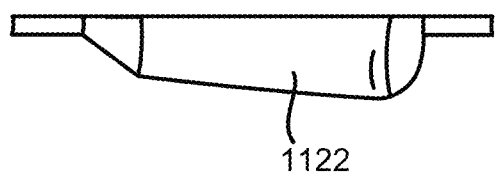

FIG. 18D illustrates that the inflatable balloon 1122 can comprise a tapered or conical end on one end (e.g., a proximal end or distal end) of the inflatable balloon 1122 and a rounded or bulbous end on another end of the balloon 1122. In this embodiment, the portion of the balloon 1122 in between the tapered or conical/frustoconical end and the rounded or bulbous end can have a varying transverse cross-section. For example, the portion of the balloon 1122 in between the tapered or conical/frustoconical end and the rounded or bulbous end can be tapered or narrow/widen along the length of the balloon 1122. In other embodiments, the portion of the balloon 1122 in between the tapered or conical/frustoconical end can have a constricted portion in the middle of the balloon 1122.

An operator of the atherectomy device 1100 or a clinician can select a version of the device 1100 having one of the balloons 1122 disclosed herein based on a size of the vasculature, an extent of the occlusion or blockage, the type of occlusion (e.g., concentric or eccentric), or a combination thereof. In addition, any of the balloons 1122 disclosed herein (including any of the balloons 1122 shown in FIGS. 18A-18D) can comprise any of the balloon features disclosed herein including weep holes 1700 or other type of balloon ports or openings, one or more valves disposed within or on a surface of the balloon 1122, and multiple balloon layers.

Figure 7C:
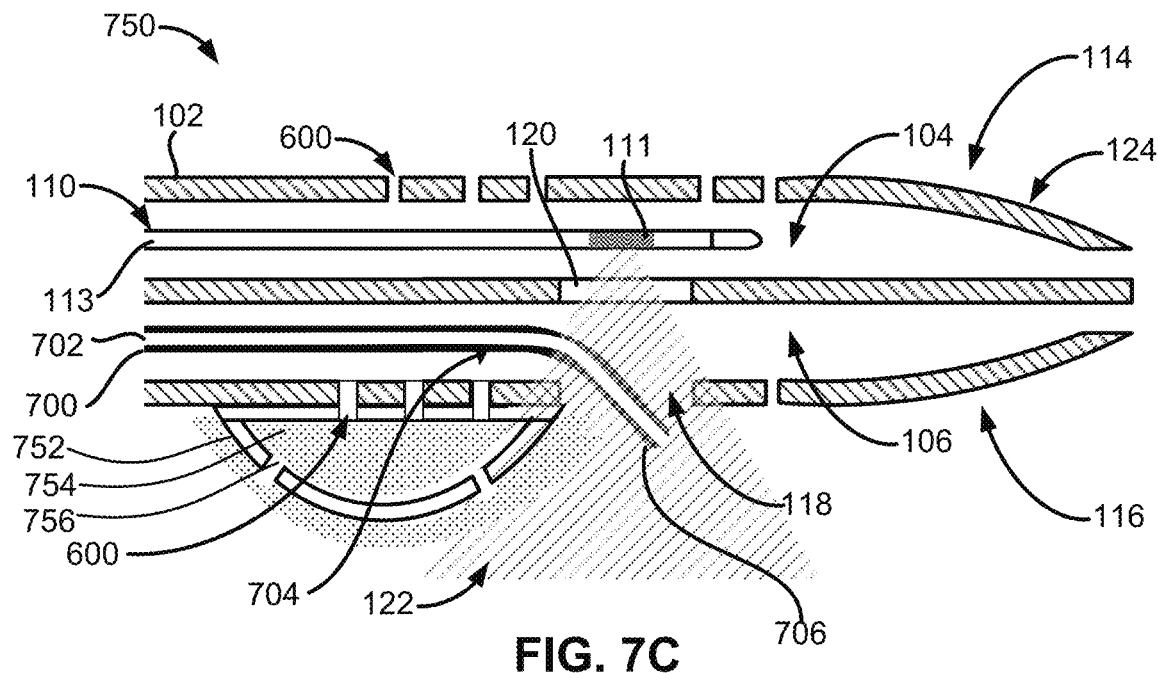
FIGS. 7C and 7D depicts a further embodiment of an imaging apparatus or CTO re-entry device with an inflatable balloon.
Figure 7D:
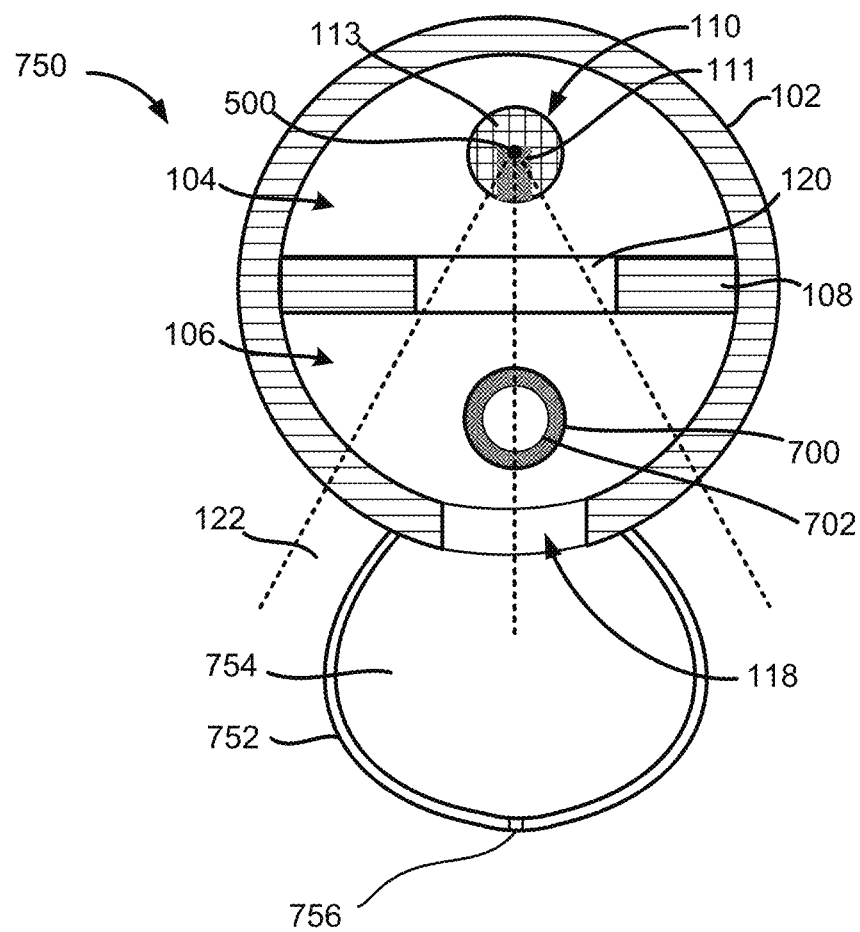

In other embodiments, the inflatable balloon assembly described herein may also be implemented with any of a variety of diagnostic or therapeutic catheter systems. For example, the imaging apparatus or CTO re-entry device as described herein, may be adapted with the inflatable balloon. The inflatable balloon may be inflated using the second catheter lumen of the device or a separate lumen may be provided. In FIGS. 7C and 7D, for example, the imaging apparatus or CTO re-entry device with guiding needle from FIGS. 7A and 7B may be further adapted with the inflatable balloon. In specific example depicted in FIGS. 7C and 7D, the imaging apparatus or CTO re-entry device 750 includes an inflatable balloon 752 on the dorsal side of the device 750. The cavity 754 of the balloon 752 is in fluid communication with the second catheter lumen 106 via one or more perfusion ports 600 for inflation, but in other examples, a separate lumen and other ports are used to inflate the balloon 752. The inflatable balloon 752 may be provided on the ventral side of the imaging apparatus, and is inflated via the first catheter lumen 104 via the ventral perfusion ports 600. The other balloon features as described for the atherectomy device may also be provided with the imaging apparatus or CTO re-entry device, including one or more weep holes 756.

A number of embodiments have been described. Nevertheless, it will be understood by one of ordinary skill in the art that various modifications may be made without departing from the spirit and scope of the embodiments. In addition, the flowcharts or logic flows depicted in the figures do not require the particular order shown, or sequential order, to achieve desirable results. In addition, other steps or operations may be provided, or steps or operations may be eliminated, from the described flows, and other components may be added to, or removed from, the described systems. Accordingly, other embodiments are within the scope of the following claims.

Each of the individual variations or embodiments described and illustrated herein has discrete components and features which may be readily separated from or combined with the features of any of the other variations or embodiments. Modifications may be made to adapt a particular situation, material, composition of matter, process, process act(s) or step(s) to the objective(s), spirit or scope of the present invention.

Methods recited herein may be carried out in any order of the recited events that is logically possible, as well as the recited order of events. Moreover, additional steps or operations may be provided, or steps or operations may be eliminated to achieve the desired result.

Furthermore, where a range of values is provided, every intervening value between the upper and lower limit of that range and any other stated or intervening value in that stated range is encompassed within the invention. Also, any optional feature of the inventive variations described may be set forth and claimed independently, or in combination with any one or more of the features described herein.

All existing subject matter mentioned herein (e.g., publications, patents, and patent applications) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise, all technical and scientific terms used herein have the same meaning as commonly understood by one of ordinary skill in the art to which this invention belongs.

This disclosure is not intended to be limited to the scope of the particular forms set forth, but is intended to cover alternatives, modifications, and equivalents of the variations or embodiments described herein. Further, the scope of the disclosure fully encompasses other variations or embodiments that may become obvious to those skilled in the art in view of this disclosure.

It will be understood by one of ordinary skill in the art that the various methods disclosed herein may be embodied in a non-transitory readable medium, machine-readable medium, and/or a machine accessible medium comprising instructions compatible, readable, and/or executable by a processor or server processor of a machine, device, or computing device. The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

We claim:

1. An imaging apparatus, comprising:
   an elongate catheter body configured to be advanced through a vasculature of a patient, the catheter body comprising a dorsal side and a ventral side opposite the dorsal side;
   a first catheter lumen extending through the catheter body, wherein the first catheter lumen is configured to house at least part of an imaging component;
   a second catheter lumen extending through the catheter body, wherein the second catheter lumen is configured to house at least part of a guidewire, and wherein the second catheter lumen is separated from the first catheter lumen by a dividing layer;
   one or more windows defined between the first and second catheter lumens, wherein the one or more windows are configured to allow light to be transmitted through the one or more windows;
   a catheter outlet port defined along the ventral side of the catheter body and in fluid communication with the second catheter lumen, wherein the catheter outlet port is configured to allow the guidewire to advance out of the second catheter lumen, and wherein the catheter outlet port is aligned with at least one of the one or more windows such that the guidewire is within a field of view of the imaging component when the guidewire extends partially though the catheter outlet port; and
   one or more windows defined along a ventral side of the catheter body, wherein at least one of the one or more windows defined along the ventral side of the catheter body is aligned with at least one of the one or more windows defined along the dividing layer such that the segment of the guidewire extending out of the catheter outlet port and into the vasculature is within the field of view of the imaging component through the windows.

2. The apparatus of claim 1, further comprising a guiding needle slidably located in the second catheter lumen, the guiding needle comprising a needle lumen configured to slidably receive a guidewire.

3. The apparatus of claim 2, wherein the guiding needle comprises a beveled distal end with a beveled face.

4. The apparatus of claim 3, wherein the beveled face is orthogonal to a longitudinal axis of the elongate catheter body.

5. The apparatus of claim 2, further comprising a needle lock that is configured to reversibly lock the movement of the imaging component to the movement of the guiding needle.

6. The apparatus of claim 1, wherein a longitudinal or axial displacement of the imaging component is correlated with the longitudinal or axial displacement of the guidewire.

7. The apparatus of claim 6, wherein a proximal segment of the guidewire is conjoined with a proximal portion of the imaging component.

8. The apparatus of claim 6, wherein the longitudinal or axial displacement of the imaging component is tracked by one or more encoders positioned along a proximal portion of the imaging component and wherein the longitudinal or axial displacement of the guidewire is tracked by the one or more encoders positioned along a proximal segment of the guidewire.

9. The apparatus of claim 1, wherein the imaging component is configured to be rocked such that the imaging component rotates back-and-forth with respect to a longitudinal axis of rotation at an angle of rotation of less than 180 degrees.

10. The apparatus of claim 1, wherein the imaging component is configured to be rotated at constant speed during operation that may be adjustable with respect to a longitudinal axis of rotation at less than 2000 rpm.

11. The apparatus of claim 1, wherein the imaging component is configured to be rotated at varying speed during operation with respect to a longitudinal axis of rotation at less than 2000 rpm.

12. The apparatus of claim 1, further comprising additional catheter outlet ports defined along the ventral side of the catheter body, wherein the additional catheter outlet ports are configured to allow the guidewire to advance out of the second catheter lumen at various positions along the catheter body.

13. The apparatus of claim 1, wherein the one or more windows are made in part of at least one of polymethylmethacrylate (PMMA), polypropylene, polycarbonate, and polyethylene.

14. The apparatus of claim 1, wherein the one or more windows are made in part of at least one of calcium fluoride, germanium oxide, silicon dioxide, aluminum oxide, and zinc selenide.

15. The apparatus of claim 1, wherein the one or more windows are made in part of at least one of polytetrafluoroethylene (PTFE), fluorinated ethylene propylene (FEP), perfluoroalkoxy alkanes (PFA), ethylene tetrafluoroethylene (ETFE), polydimethylsiloxane (PDMS), nylon, a polyether block amide and polyethylene terephthalate (PET).

16. The apparatus of claim 1, wherein the imaging component is part of an optical coherence tomography (OCT) imaging system and wherein the OCT imaging system is configured to perform image registration on images captured by the imaging component.

* * * * *